United States Patent
Zhao et al.

(10) Patent No.: US 11,708,506 B2
(45) Date of Patent: *Jul. 25, 2023

(54) NANO-CELLULOSE COMPOSITIONS, COATINGS, AND USES THEREOF

(71) Applicant: Oregon State University, Corvallis, OR (US)

(72) Inventors: Yanyun Zhao, Beaverton, OR (US);
John Simonsen, Corvallis, OR (US);
George Cavender, Lincoln, NE (US);
Jooyeoun Jung, Lincoln, NE (US);
Leslie H. Fuchigami, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,382

(22) Filed: May 26, 2021

(65) Prior Publication Data
US 2022/0119667 A1 Apr. 21, 2022

Related U.S. Application Data

(63) Continuation of application No. 16/511,999, filed on Jul. 15, 2019, now Pat. No. 11,046,858, which is a
(Continued)

(51) Int. Cl.
*C09D 101/02* (2006.01)
*C09D 5/14* (2006.01)
(Continued)

(52) U.S. Cl.
CPC ............ *C09D 101/02* (2013.01); *A23B 7/154* (2013.01); *A23B 7/16* (2013.01); *A23L 3/3463* (2013.01);
(Continued)

(58) Field of Classification Search
None
See application file for complete search history.

(56) References Cited

U.S. PATENT DOCUMENTS 4,338,342 A 7/1982 Tan
4,572,906 A 2/1986 Sparkes et al.
(Continued)

FOREIGN PATENT DOCUMENTS

CN 1466883 1/2004
CN 1212067 7/2005
(Continued)

OTHER PUBLICATIONS

Office Action issued for Korean Application No. 10-2015-7029325 dated Sep. 29, 2021.
(Continued)

*Primary Examiner* — Stefanie J Cohen
(74) *Attorney, Agent, or Firm* — Klarquist Sparkman, LLP

(57) ABSTRACT

Disclosed herein are embodiments of a composition comprising at least one cellulose material (such as a cellulose nanomaterial) and an optional inorganic salt component. Some embodiments of the composition can further comprise additional components, with some embodiments further comprising a non-starch polysaccharide (e.g., methyl cellulose carboxymethyl cellulose or other cellulose derivative, chitosan, or the like), a surfactant, a plasticizer, an antimicrobial component, or any combination thereof. The disclosed compositions are useful for forming edible coatings/films on plants, plant parts, and other objects. The disclosed compositions and coatings/films made using the compositions are effective at protecting fresh and processed produce
(Continued)

and other substances and products, from various different types of food processing damage (and the deleterious effects associated therewith).

**20 Claims, 48 Drawing Sheets
(22 of 48 Drawing Sheet(s) Filed in Color)**

Related U.S. Application Data continuation of application No. 14/852,341, filed on Sep. 11, 2015, now Pat. No. 10,400,128, which is a continuation-in-part of application No. PCT/US2014/029611, filed on Mar. 14, 2014, and a continuation-in-part of application No. 14/214,145, filed on Mar. 14, 2014, now Pat. No. 9,826,750.

(60) Provisional application No. 62/128,895, filed on Mar. 5, 2015, provisional application No. 61/895,929, filed on Oct. 25, 2013, provisional application No. 61/784,060, filed on Mar. 14, 2013, provisional application No. 61/784,060, filed on Mar. 14, 2013.

(51) Int. Cl.
| | |
|---|---|
| B05D 1/02 | (2006.01) |
| B05D 1/18 | (2006.01) |
| C09D 7/61 | (2018.01) |
| A23B 7/154 | (2006.01) |
| A23B 7/16 | (2006.01) |
| A23L 3/3463 | (2006.01) |
| C09D 7/45 | (2018.01) |
| C08K 3/16 | (2006.01) |
| C08K 3/26 | (2006.01) |

(52) U.S. Cl.
CPC ............... *B05D 1/02* (2013.01); *B05D 1/18* (2013.01); *C09D 5/14* (2013.01); *C09D 7/45* (2018.01); *C09D 7/61* (2018.01); *A23V 2002/00* (2013.01); *C08K 2003/162* (2013.01); *C08K 2003/265* (2013.01)

(56) References Cited

U.S. PATENT DOCUMENTS

| | | | |
|---|---|---|---|
| 4,649,057 A | 3/1987 | Thomson | |
| 4,783,342 A | 11/1988 | Polovina | |
| 5,047,180 A | 9/1991 | Steiner | |
| 6,060,521 A | 5/2000 | Sekutowski et al. | |
| 6,162,475 A | 12/2000 | Hagenmaier et al. | |
| 6,284,278 B1 | 9/2001 | Waldman et al. | |
| 6,312,669 B1 | 11/2001 | Cantiani | |
| 6,348,436 B1 | 2/2002 | Langlois | |
| 6,548,170 B2 | 4/2003 | Perrier et al. | |
| 6,703,340 B2 | 3/2004 | Yang | |
| 6,730,340 B1 | 5/2004 | Macquarrie | |
| 6,857,224 B1 | 2/2005 | Kammereck et al. | |
| 7,105,229 B2 | 8/2006 | Anderson | |
| 7,153,353 B2 | 12/2006 | Ichinohe | |
| 7,157,113 B2 | 1/2007 | Machielse et al. | |
| 7,160,580 B2 | 1/2007 | Hettiasrachchy et al. | |
| 7,222,455 B2 | 5/2007 | Schrader | |
| 8,752,328 B2 | 6/2014 | Kaiser et al. | |
| 10,400,128 B2* | 9/2019 | Zhao ............ | A23L 3/3463 |
| 11,109,602 B2 | 9/2021 | Zhao et al. | |
| 2004/0077498 A1 | 4/2004 | Lynch | |
| 2005/0113255 A1 | 5/2005 | Schrader et al. | |
| 2006/0252649 A1 | 11/2006 | Pluta et al. | |
| 2007/0003711 A1 | 2/2007 | Pluta et al. | |
| 2007/0135312 A1 | 6/2007 | Melbouci | |
| 2007/0190097 A1 | 8/2007 | Schrader | |
| 2009/0196908 A1 | 8/2009 | Lee | |
| 2010/0327215 A1* | 12/2010 | Boluk ............ | C09K 3/00 536/56 |
| 2011/0036522 A1 | 2/2011 | Ankerfors et al. | |
| 2011/0198282 A1 | 8/2011 | Chu et al. | |
| 2011/0223401 A1 | 9/2011 | Harlin et al. | |
| 2012/0015852 A1 | 1/2012 | Quintero et al. | |
| 2012/0042420 A1 | 2/2012 | Kaiser et al. | |
| 2012/0043039 A1 | 2/2012 | Paltakari et al. | |
| 2012/0153214 A1 | 6/2012 | Boluk | |
| 2013/0061774 A1 | 3/2013 | Landry et al. | |
| 2014/0130710 A1 | 5/2014 | Laukkanen et al. | |
| 2014/0272013 A1 | 9/2014 | Zhao et al. | |
| 2016/0002483 A1 | 1/2016 | Zhao et al. | |

FOREIGN PATENT DOCUMENTS

| | | |
|---|---|---|
| EP | 1654933 | 5/2006 |
| JP | 2009509536 | 3/2009 |
| JP | 2013541544 | 11/2013 |
| WO | WO 2009/064450 | 5/2009 |
| WO | WO 2010/066036 | 6/2010 |
| WO | WO 2011/047047 | 4/2011 |
| WO | WO 2011/139749 | 11/2011 |
| WO | WO 2011/141877 | 11/2011 |
| WO | WO 2013/009253 | 1/2013 |
| WO | WO 2013/061266 | 5/2013 |

OTHER PUBLICATIONS

Andrade et al., "Atomizing spray systems for application of edible coatings," *Comprehensive Reviews in Food Science and Food Safety*, vol. 11, pp. 323-337, 2012.
Aulin et al., "Oxygen and oil barrier properties of microfibrillated cellulose films and coatings," *Cellulose*, 17(3): 559-574, Jan. 10, 2010.
Azeredo et al., "Edible films from alginate-acerola puree reinforced with cellulose whiskers," *LWT—Food Science and Technology* 46:294-297, Oct. 5, 2011.
Azeredo et al., "Nanocellulose Reinforced Chitosan Composite Films as Affected by Nanofiller Loading and Plasticizer Content," *J. Food Science* 75(1):N1-N7, Nov. 9, 2009.
Azeredo et al., "Nanocomposite edible films from mango puree reinforced with cellulose nanofibers," *Journal of Food Science*, 74(5): N31-N35, May 18, 2009.
Azeredo et al., "Nanoreinforced alginate-acerola puree coatings on acerola fruits," *J. Food Engineering* 113:505-510, Aug. 11, 2012.
Baldwin, "Surface treatment and edible coatings in food preservation," Handbook of Food Preservation, Boca Raton, LA, USA, CRC Press, Chapter 21, pp. 477-507, 2007.
Belbekhouche et al., "Water sorption behavior and gas barrier properties of cellulose whiskers and microfibrils films," *Carbohydrate Polymers*, 83(4): 1740-1748, Feb. 1, 2011.
Bilbao-Sainz et al., "Composite Edible Films Based on Hydroxypropyl Methylcellulose Reinforced with Microcrystalline Cellulose Nanoparticles," *J. Agric. Food Chem.*, 2010, 58(6), pp. 3753-3760, Feb. 25, 2010.
Brown et al., "Effects of copper-calcium sprays on fruit cracking in sweet cherry (*Prunus avium*)," *Scientia Horticulturae*, 62:75-80, Apr. 1995.
Casariego et al., Chitosan coating surface properties as affected by plasticizer, surfactant and polymer concentrations in relation to the surface properties of tomato and carrot, *Food Hydrocolloids*, 22(8): 1452-1459, Dec. 2008.
Chen et al., "Dispersion Process and Effect of Oleic Acid on Properties of Cellulose Sulfate-Oleic Acid Composite Film," *Materials*, vol. 8, pp. 2346-2360, Apr. 30, 2015.
Choi et al., "Wettability of chitosan coating solution on 'Fuji' apple skin," *Journal of Food Science*, 67(7): 2668-2672, Sep. 2002.
Correa, "Riqueza Quimica Del Mango" *Revista Universidad Y Eafit*, 27(83): 77-82, Aug. 27, 2012.
De Moura et al., "Microfluidizer Technique for Improving Microfiber Properties Incorporated Into Edible and Biodegradable Films," *Advances in Microfluidics*, Dr. Ryan Kelly, Ed., Chapter 10, pp. 219-240, Mar. 2012.

(56) References Cited

OTHER PUBLICATIONS

Fakhouri et al., "Effect of a gelatin-based edible coating containing cellulose nanocrystals (CNC) on the quality and nutrient retention of fresh strawberries during storage," IOP Conf. Series: Materials Science and Engineering, 2014, 64, 012024, Aug. 22, 2014 (7 pages; doi:10.1 088/1757-899X/64/1/012024).
George et al., "High performance edible nanocomposite films containing bacterial cellulose nanocrystals," *Carbohydrate Polymers*, 87(3), 2031-2037, Oct. 14, 2011.
George et al., "High performance edible nanocomposite films containing bacterial cellulose nanocrystals," *Carbohydrate Polymers*, vol. 87, pp. 2031-2037, Oct. 14, 2011.
Hasan, "Development of Chitosan Based Film Enhanced with Nanocellulose Fibre Extracted from Oil Palm Empty Fruit Bunch (OPEFB)," *Thesis submitted in fulfillment of requirement for award of degree Bachelor of Engineering*, Jul. 5, 2013, 17 Pages (Pages ii, vi-viii, ix-xi, 51-60).
Hu et al. "Surfactant-enhanced cellulose nanocrystal pickering emulsions," *Journal of Colloid and Interface Science*, 439 (2015) 139-138, Oct. 29, 2014.
International Preliminary Reporton Patentability for PCT Application No. PCT/US2018/016021, dated Mar. 15, 2019.
International Search Report and Written Opinion issued for International Application No. PCT/US2018/016021 dated Mar. 29, 2018.
International Search Report dated May 19, 2014, from International Application No. PCT/US2014/029611 (6 pages).
Jiang et al., "Effect of chitosan coating on postharvest life and quality of longan fruit," *Food Chemistry*, 73:139-143, Apr. 3, 2001.
Jung et al., "Development and preliminary field validation of water-resistant cellulose nanofiber based coatings with high surface adhesion and elasticity for reducing cherry rain-cracking," *Scientia Horticulturae*, vol. 200, pp. 161-169, Jan. 23, 2016.
Jung et al., "Investigation of the Mechanisms of Using Metal Complexation and Cellulose Nanofiber/Sodium Alginate Layer-by-Layer Coating for Retaining Anthocyanin Pigments in Thermally Processed Blueberries in Aqueous Media," *Journal of Agricultural and Food Chemistry*, 63(11): pp. 3031-3038, Mar. 16, 2015.
Kaiser et al., "A Review of Cherry Fruit Cracking," http://extension.oregonstate.edu/umatilla/mf/sites/default/files/WA_State_Cherry_Crackin_g_Kaiser_Dec._07, published on-line at least as early as Dec. 2007 (26 pages).
Khalifa et al., "Improving the shelf-life stability of apple and strawberry fruits applying chitosan-incorporated olive oil processing residues coating," *Food Packaging and Shelf-Life*, vol. 9, pp. 10-19, Sep. 2016.
Khan et al., "Production and Properties of Nanocellulose-Reinforced Methylcellulose-Based Biodegradable Films," *J. Agric. Food Chem.*, vol. 58, pp. 7878-7885, Jun. 15, 2010.
Khuwijitjaru et al. "Preparation of finely dispersed O/W emulsion from fatty acid solubilized in subcritical water," *Journal of Colloid and Interface Science*, 278 (2004) 192-197, Jun. 19, 2004.
Kim et al., "Dispersion of cellulose crystallites by nonionic surfactants in a hydrophobic polymer matrix," *Polymer Engineering and Science*, 49(10): 2054-2061, Jul. 17, 2009.
Lacroix et al., "Edible films and coatings from non-starch polysaccharides," in *Innovations in Food Pacakaging*, ed. Jung H. Han, p. 338, 2005.
Lalel et al., "Maturity stage at harvest affects fruit ripening, quality and biosynthesis of aroma volatile compounds in 'Kensington Pride' mango," *The Journal of Horticultural Science and Biotechnology*, 78(2): 225-233, 2003.
Maftoonazad et al., "Postharvest shelf-life extension of avocados using methyl cellulose-based coating," *LWT*, vol. 38, pp. 617-624, 2005.
Maftoonazad et al., "Postharvest shelf-life of avocados using methyl cellulose-based coating," *LWT*, 38:617-624, Nov. 17, 2004.
Maqbool et al., "Effect of a novel edible composite coating based on gum Arabic and chitosan on biochemical and physiological responses of banana fruits during cold storage," *Journal of Agricultural and Food Chemistry*, 59(10): 5474-5482, Apr. 8, 2011.
Marathe, "Development of controlled release antimicrobial films from low methoxyl pectin," Jan. 2008.
Marpudi et al., "Enhancement of storage life and quality maintenance of papaya fruits using Aloe vera based antimicrobial coating," *Indian Journal of Biotechnology*, vol. 10, pp. 83-89, 2011.
Martinez-Romero et al., "Postharvest sweet cherry quality and safety maintenance by Aloe vera treatment: A new edible coating," *Postharvest Biology and Technology*, 39(1): 93-100, 2006.
Morris, "Synthesis of an Antimicrobial Coating," Department of Chemistry and Biochemistry, California Polytechnic State University, 2011.
Nabifarkhani et al., "Effect of nano-composite and Thyme oil (*Tymus vulgaris* L) coating on fruit quality of sweet cherry (*Takdaneh* Cv) during storage period," *Food Science & Nutrition*, May 10, 2015 (6 pages, doi: 10.1002/fsn3.226).
Pilon et al., "Chitosan nanoparticle coatings reduce microbial growth on fresh-cut apples while not affecting quality attributes," *Int. J. Food Science and Tech.*, 2015, 50, 440-448, Jul. 15, 2014.
Rao et al., "Composite coating of alginate-olive oil enriched with antioxidants enhances postharvest quality and shelf life of Ber fruit (*Ziziphus mauritiana Lamk.* Var. *Gola*)," *Journal of Food Science and Technology*, 53(1): 748-756, Jan. 2016.
Ruiz-Ramos et al., "Interrelationship between the viscoelastic properties and effective moisture diffusivity of emulsions with the water vapor permeability of edible films stabilized by mesquite gum-chitosan complexes," *Carbohydrate Polymer*, 64(2): 355-363, May 11, 2006.
Sagitani et al. "Making Homogenous and Fine Droplet O/W Emulsions Using Nonionic Surfactants," *JAOCS*, Jun. 1981.
Schrader et al., "Stress-Induced Disorders: Effects on Apple Fruit Quality," *WSU-TFREC Postharvest Information Network*, Dec. 2003 (7 pages).
Shibahara et al., "c/s-Vaccenic acid in mango pulp lipids," *LIPIDS*, 21(6): 388-394, Jun. 1986.
Soradech et al., "Utilization of shellac and gelatin composite film for coating to extend the shelf life of banana," *Food Control*, vol. 73, Part B, pp. 1310-1317, Mar. 2017.
Toğrul et al., "Extending shelf-life of peach and pear by using CMC from sugar beet pulp cellulose as a hydrophilic polymer in emulsions," *Food Hydrocolloids*, 18:215-226, May 29, 2003.
Tzoumaki et al., "Impact of edible coatings and packaging on quality of white asparagus (*Asparagus officinalis*, L.) during cold storage," *Food Chemistry*, 117(1): 55-63, Nov. 1, 2009.
Vigneshwaran et al., "Effect of gum arabic on distribution behavior of nanocellulose fillers in starch film," *Appl. Nanosci.*, vol. 1, pp. 137-142, Aug. 24, 2011.
Vina et al., "Effects of polyvinylchloride films and edible starch coatings on quality aspects of refrigerated Brussels sprouts," *Food Chemistry*, 103(3): 701-709, 2007.
Vu et al., "Development of edible bioactive coating based on modified chitosan for increasing the shelf life of strawberries," *Food Research International*, 44(1): 198-203, Oct. 29, 2010.
Wang et al., "Assessment of film-forming potential and properties of protein and polysaccharide-based biopolymer films," *International Journal of Food Science and Technology*, 42(9): 1128-1138, Jun. 26, 2007.
Written Opinion dated May 19, 2014, from related International Application No. PCT/US2014/029611 (6 pages).
Yaman et al., "Effects of an edible coating and cold storage on shelf-life and quality of cherries, LWT," *Food Science and Technology*, 35(2): 146-150, Mar. 2002.
Khan et al., "Mechanical and barrier properties of nanocrystalline cellulose reinforced chitosan based nanocomposite films," *Carbohydrate Polymers*, vol. 90, pp. 1601-1608, Jul. 16, 2012.

\* cited by examiner

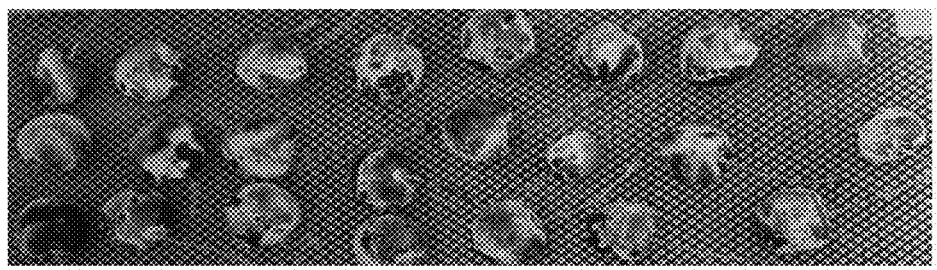
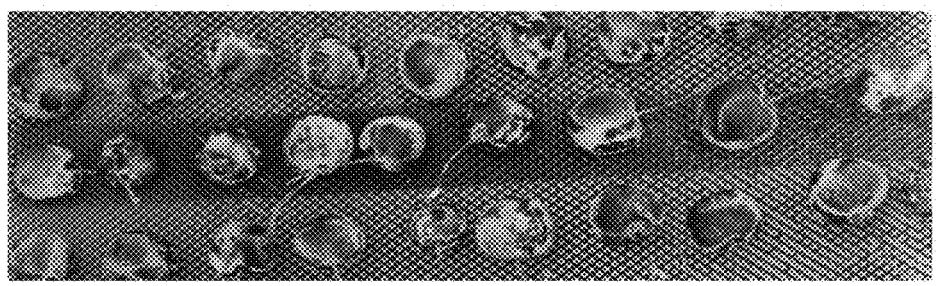
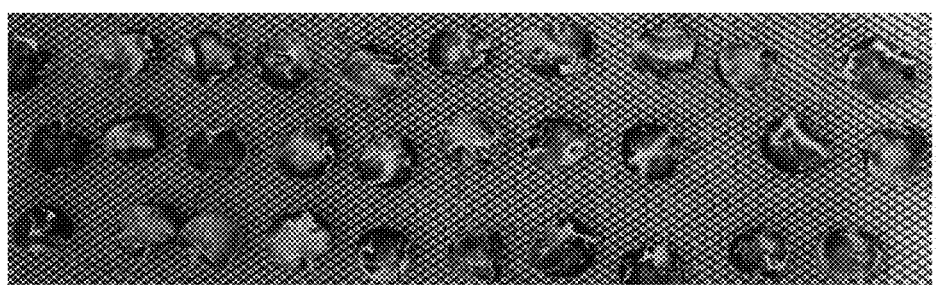
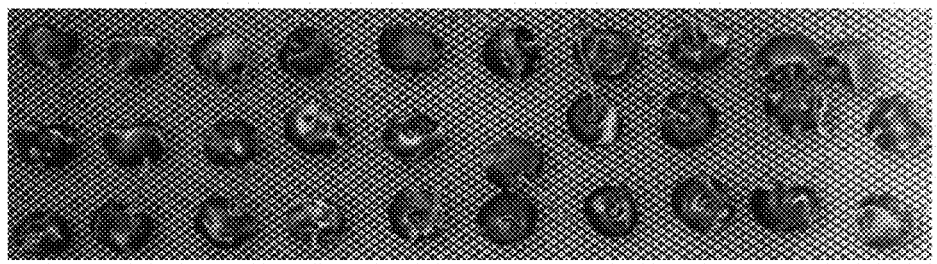
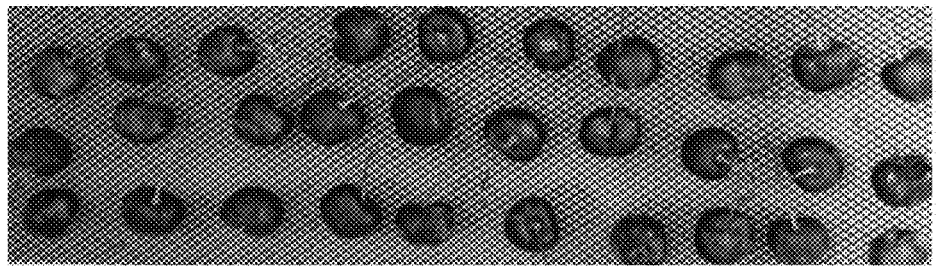
FIG. 20E
FIG. 20D
FIG. 20C
FIG. 20B
FIG. 20A

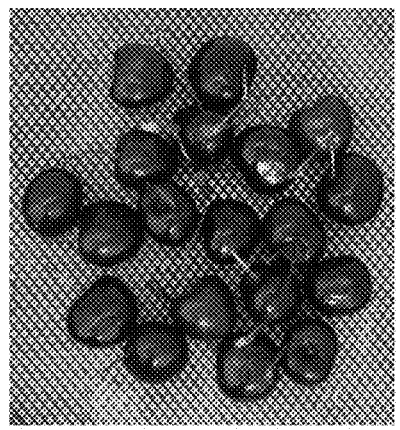 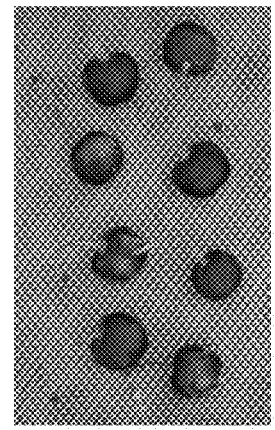 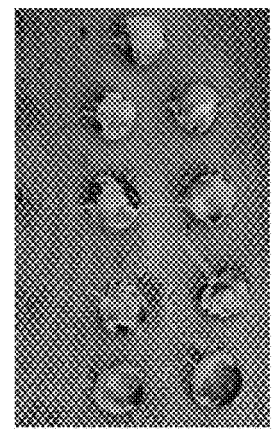
FIG. 22A  FIG. 22B  FIG. 22C
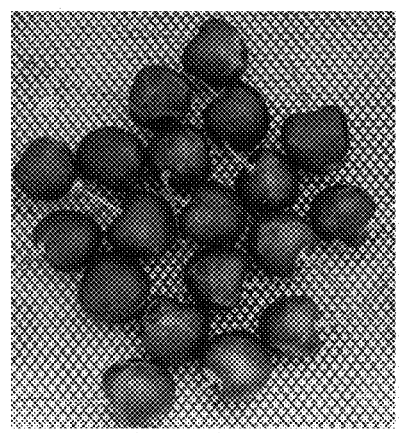 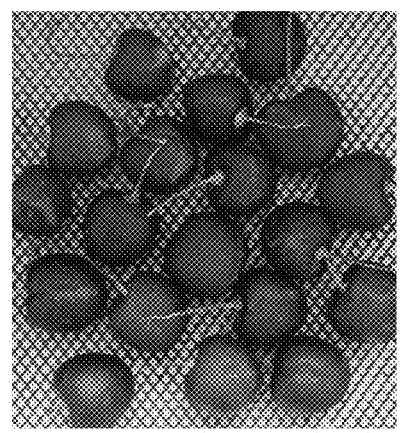
FIG. 22D  FIG. 22E

FIG. 36A
 
FIG. 36B       FIG. 36C

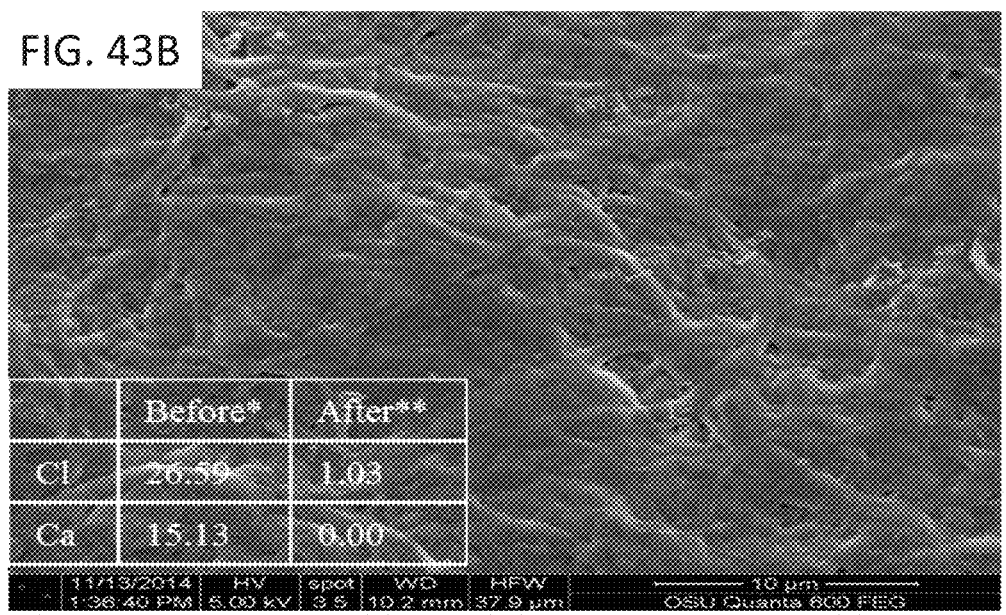
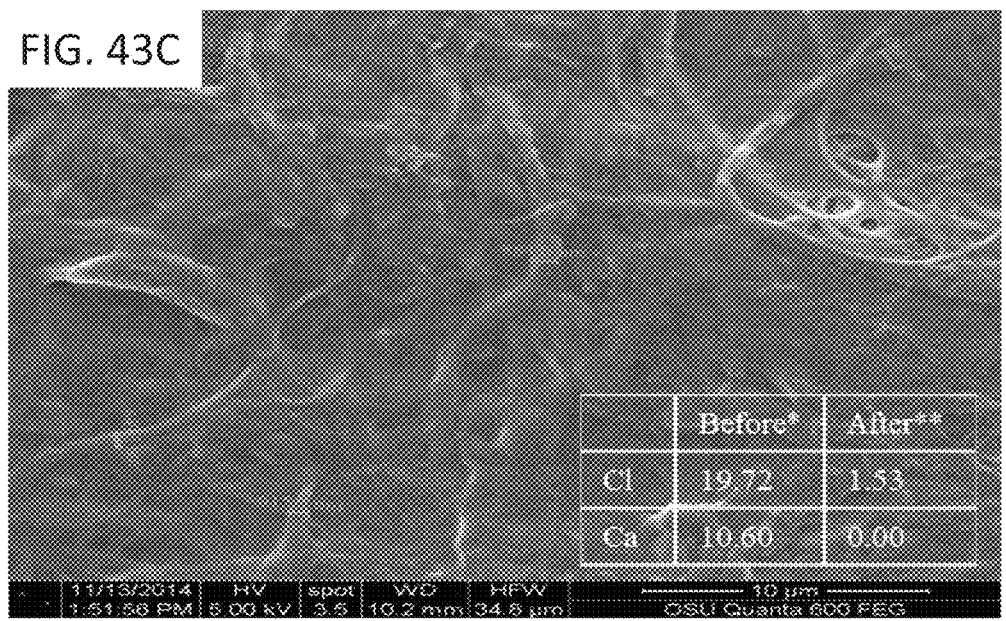

NANO-CELLULOSE COMPOSITIONS, COATINGS, AND USES THEREOF

CROSS REFERENCE TO RELATED APPLICATION

This application is a continuation of U.S. application Ser. No. 16/511,999, filed Jul. 15, 2019, which is a continuation of U.S. application Ser. No. 14/852,341, filed Sep. 11, 2015, issued as U.S. Pat. No. 10,400,128, which claims the benefit of and priority to the earlier filing date of U.S. Provisional Application No. 62/128,895, filed Mar. 5, 2015; U.S. application Ser. No. 14/852,341, filed Sep. 11, 2015, issued as U.S. Pat. No. 10,400,128 also is a continuation-in-part of International Application No. PCT/US2014/029611, filed on Mar. 14, 2014, which in turn claims the benefit of and priority to the earlier filing date of U.S. Provisional Application No. 61/784,060, filed Mar. 14, 2013, and U.S. Provisional Application No. 61/895,929, filed Oct. 25, 2013. This application also is a continuation of U.S. application Ser. No. 16/511,999, filed Jul. 15, 2019, which is a continuation of U.S. application Ser. No. 14/852,341, filed Sep. 11, 2015, issued as U.S. Pat. No. 10,400,128, which is a continuation-in-part of U.S. application Ser. No. 14/214,145, filed on Mar. 14, 2014, issued as U.S. Pat. No. 9,826,750, which in turn claims the benefit of and priority to the earlier filing date of U.S. Provisional Application No. 61/784,060, filed Mar. 14, 2013. Each of these earlier applications is incorporated by reference herein in its entirety.

FIELD

This disclosure relates to the field of protective coatings, particularly coatings for plants, plant parts, and foodstuffs. It further relates to compositions for forming protective films and methods of making and using these compositions and coatings.

BACKGROUND

Finding acceptable coatings for foods, such as fresh fruits and processed and vegetables, cheeses, bakery goods, raw and cooked eggs, fresh and processed meat, and seafood products, is a challenging task. Coatings should be edible and once applied, act as a barrier to moisture, gases and/or UV light, and undesirable microorganisms. However, several other criteria are also important: the coating should be essentially harmless to consumers, transparent (or nearly so) in the visible region so the coated product is visible to the consumer, and it should impart no significant odor or taste to the foods.

In addition, edible coatings and films that offer promise as packaging materials due to one or more functional properties often suffer from poor water resistance (highly water soluble). Satisfying all these criteria simultaneously and satisfactorily has presented a serious challenge to researchers and as yet no suitable solution has been found.

Anthocyanins provide the majority of red, purple, and blue pigmentation of some fruits and vegetables, and their greater consumption has been suggested to mitigate the risk of chronic disease in humans. Unfortunately, these pigments are highly labile and vulnerable to degradation during thermal processing. Further complicating matters is their water-solubility that promotes their leaching into aqueous media. Thus, innovative technologies are needed to overcome long-standing technical barriers experienced by the food industry to retain these health-promoting pigments during food handling and processing.

Fresh produce (fruits and vegetables) and plants in general commonly lose water to their surroundings during production, harvesting, handling and storage. This water loss can cause damage, dieback, and death to plants and plant parts in general, as well as changes in the appearance, texture and quality of the produce, which most consumers find unappealing. This results in decreased marketability, and limits acceptable shelf-life and storage times.

Exposure to high levels of UV light can damage developing and maturing produce creating visibly damaged and discolored tissues, destroying native healthful phytochemical compounds, stimulating production of undesirable and harmful compounds like ethylene gas, and providing a foothold for spoilage organisms to grow. Such produce suffers a loss of perceived quality, reduced health benefits and is generally deemed unsuitable for the fresh market. Further, the phenomenon can potentially ruin a grower economically, as the conditions leading to its occurrence are shared by the entire crop.

Fresh produce damage can be caused by both external and internal influences. External influence is the most common and can be easily seen when fresh produce cracks in the rain. Rainwater is absorbed through the cuticle due to a high osmotic potential (due to the sugar content of fruit) inside the fresh produce. The water moves across the membrane in order to equalize the potential. The produce then swells to the point beyond which the skin can expand and the produce splits open. The internal influence of fruit damage is the buildup of tensile forces within the produce as a result of water uptake through the vascular system within the tree itself. This can be most clearly seen in covered orchards where fruits occasionally split, although protected from the rain.

Previously frozen foods typically exude liquid during thawing, resulting in a phenomenon called "drip loss." This can be off-putting to consumers, and can change the overall composition of the thawed product, making it behave differently from fresh during preparation/cooking. Drip loss also can cause economic losses to the processors.

SUMMARY

The innovations described herein utilize a cellulose nanomaterial, which has not previously been used as or in edible coatings, alone or in combination with an inorganic salt component and/or other additives. The resultant coatings are useful for the protection against moisture loss, gas transmission (e.g., $O_2$ and $CO_2$), microbial growth, and UV damage of fresh fruits and vegetables both pre- and post-harvest, as a water and gas barrier coating for fresh and processed foods, for reducing or preventing leaching of food substances, such as anthocyanins and other water soluble compounds, as well as loss and/or gain of moisture during food processing (e.g., canning, thermal processing, infusion processing, high hydrostatic pressure, and so forth) and storage. Coatings provided herein are also useful to protect against and reduce biotic and abiotic stresses in plants, plant parts, and foodstuffs while in storage, on the shelf, and during production (including post-harvest production). In some embodiments, the composition is a nanocellulose-based edible composition selected from one or more components that form a barrier to biotic and abiotic stresses, water resistant film forming matrices, UV protectants, preservatives (such as foodstuff preservatives), and anti-leaching solutions, wherein the components form a protective barrier when placed on an inorganic material, a foodstuff, a plant or any part thereof, an animal tissue, or any other organic material.

In some embodiments, the disclosed compositions comprise a cellulose nanomaterial in an amount ranging from about 0.02 wt/v % to about 5 wt/v % and a surfactant in an amount ranging from about 0.01 wt/v % to about 5 wt/v %. In some embodiments, the compositions comprise a cellulose nanomaterial in an amount ranging from about 0.1 wt/v % to about 1 wt/v % and an inorganic salt component in an amount ranging from about 0.05 wt/v % to about 1 wt/v %. In some embodiments, the compositions can further comprise a stabilizing agent, such as methyl cellulose in an amount ranging from about 0.05 wt/v % to 0.2 wt/v %. In yet other embodiments, the composition comprises a cellulose nanomaterial, an inorganic salt component, a non-starch polysaccharide (e.g., methyl cellulose, carboxymethyl cellulose or other cellulose derivative, chitosan, or the like), and at least one additional component selected from a crosslinking agent, an additive agent, an agricultural agent, and combinations thereof.

Plants or plant parts comprising a film formed from a composition disclosed herein also are disclosed.

Methods of using the provided compositions also are described herein. For example, embodiments of the disclosed methods comprise substantially coating a plant or plant part with an embodiment of the composition disclosed herein before or after the plant or plant part is harvested or planted. In yet additional embodiments, the methods can comprise thermally processing a plant part (e.g., a fruit or vegetable) using a thermal processing method, a high hydrostatic pressure processing method, an infusion processing method, or combinations thereof.

Some disclosed embodiments concern a nanocellulose edible coating essentially as described herein. In some embodiments, a method of coating an object, comprising applying to the object a nanocellulose coating or coating composition essentially as described herein also is disclosed.

The foregoing and other features and advantages will become more apparent from the following detailed description of several embodiments, which proceeds with reference to the accompanying figures.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 3A is an image of uncoated blueberries; FIG. 3B is an image of blueberries that were coated with a composition comprising 1% cellulose nanofibrils (CNF) prior to the first thermal processing step; FIG. 3C is an image of blueberries coated with a composition (prior to drying) comprising 1% cellulose nanofibrils and 0.01% micro calcium carbonate (MCC) prior to the first thermal processing step; FIG. 3D is an image of blueberries coated with a composition comprising 1% cellulose nanofibrils applied by spray coating prior to the first thermal processing step; and FIG. 3E is an image of blueberries coated with a composition comprising 1% cellulose nanofibrils and 0.01% MCC applied by spray coating prior to the first thermal processing step.

FIG. 4A is an image of blueberries after thermal processing at 80° C. for 20 minutes, with the blueberries being coated with CNF prior to thermal processing; FIG. 4B is an image of the blueberries illustrated in FIG. 4A after the coating was removed and the blueberries were subjected to another thermal process at 65° C. for 15 minutes; and FIG. 4C is an image of the blueberries of FIGS. 4A and 4B after being stored in water for one day under ambient conditions.

FIGS. 7A-7C are images of a control sample (uncoated blueberries) after 1 hour, 2 hours, and 4 hours, respectively.

FIGS. 7D-7F are images of blueberries coated with a composition comprising 1.5% cellulose nanofibrils and 1.0% $CaCl_2$ after 1 hour, 2 hours, and 4 hours, respectively.

FIG. 9A is an image of uncoated cherries, and FIG. 9B is an image of cherries coated with a composition comprising 1.5% cellulose nanofibrils and 1.0% $CaCl_2$.

FIG. 10A illustrates uncoated apples and FIG. 10B is an image of apple rings coated with a composition comprising 1% cellulose nanofibrils and 0.01% MCC.

FIG. 14A is an image of uncoated apples; FIG. 14B is an image of an apple coated with a composition comprising 1% cellulose nanofibrils; FIG. 14C is an image of an apple coated with a composition comprising 1% cellulose nanofibrils and 0.01% MCC; FIG. 14D is an image of an apple coated with a composition comprising 1% cellulose nanofibrils, applied by spray coating; and FIG. 14E is an image of an apple coated with a composition comprising 1% cellulose nanofibrils and 0.01% MCC, applied by spray coating.

FIG. 19A is an image of cherries coated with 1.5% cellulose nanofibrils and 0.01% CaCO$_3$; FIG. 19B is an image of cherries coated with 1.5% cellulose nanofibrils and 0.05% CaCO$_3$; FIG. 19C is an image of cherries coated with 1.5% cellulose nanofibrils and 0.1% CaCO$_3$; FIG. 19D is an image of cherries coated with 1.5% cellulose nanofibrils and 0.5% CaCO$_3$; and FIG. 19E is an image of cherries coated with 1.5% cellulose nanofibrils and 1% CaCO$_3$.

FIGS. 20A-20E are photographic images of cherries coated with 1.5% cellulose nanofibrils and different concentrations of wollastonite (FIG. 20A, 0.17% wollastonite; FIG. 20B, 0.38% wollastonite; FIG. 20C, 0.64% wollastonite; FIG. 20D, 1% wollastonite; and FIG. 20E, 1.5% wollastonite).

FIG. 21B, 1.5% cellulose nanofibrils and 0.38% nano calcium silicate; FIG. 21C, 1.5% cellulose nanofibrils and 0.64% nano calcium silicate; FIG. 21D, 1.5% cellulose nanofibrils and 1% nano calcium silicate; and FIG. 21E, 1.5% cellulose nanofibrils and 1.5% nano calcium silicate).

FIGS. 22A-22E are photographic images of cherries coated with 1.5% cellulose nanofibrils added with different concentrations of micro CaCO$_3$ or CaCl$_2$. (FIG. 22A, uncoated cherries; FIG. 22B, 1.5% cellulose nanofibrils and 0.1% CaCO$_3$; FIG. 22C, 1.5% cellulose nanofibrils and 0.5% CaCO$_3$; FIG. 22D, 1.5% cellulose nanofibrils and 0.1% CaCl$_2$; and FIG. 22E, 1.5% cellulose nanofibrils and 0.5% CaCl$_2$).

FIG. 23B, 1% CNF composition further comprising 0.1% CMC, 0.1% MCC, and 0% CaCl$_2$; FIG. 23C, 1% CNF composition further comprising 0% CMC, 0.1% MCC, and 0.1% CaCl$_2$; FIG. 23D, 1% CNF composition further comprising 0.1% CMC, 0.1% MCC, and 0.1% CaCl$_2$ (washed off and subjected to a second thermal process at 85° C. for 20 min); FIG. 23E, 1% CNF composition further comprising 0% CMC, 0.5% MCC, and 0% CaCl$_2$; FIG. 23F, 1% CNF composition further comprising 0.1% CMC, 0.5% MCC, and 0% CaCl$_2$; FIG. 23G, 1% CNF composition further comprising 0% CMC, 0.5% MCC, and 0.1% CaCl$_2$; and FIG. 23H, 0.1% CMC, 0.5% MCC, and 0.1% CaCl$_2$).

FIG. 24A is an image of a control batch of blueberries that were not coated; FIG. 24B illustrates blueberries coated with a composition comprising 0.5% CNF and 0.1% CMC, and further comprising 0.1% MCC and 0% CaCl$_2$; FIG. 24C illustrates blueberries coated with a composition comprising 0.5% CNF and 0.1% CMC, and further comprising 0.1% MCC and 0.1% CaCl$_2$; FIG. 24D illustrates blueberries coated with a composition comprising 0.5% CNF and 0.1% CMC, and further comprising 0.5% MCC and 0% CaCl$_2$; FIG. 24E illustrates blueberries coated with a composition comprising 0.75% CNF and 0.1% CMC, and further comprising 0.1% MCC and 0% CaCl$_2$; FIG. 24F illustrates blueberries coated with a composition comprising 0.75% CNF and 0.1% CMC, and further comprising 0.1% MCC and 0.1% CaCl$_2$; FIG. 24G illustrates blueberries coated with a composition comprising 0.75% CNF and 0.1% CMC, and further comprising 0.5% MCC and 0% CaCl$_2$ (washed off and applied the second thermal process at 85° C. for 20 min); and FIG. 24H illustrates blueberries coated with a composition comprising 0.75% CNF and 0.1% CMC, and further comprising 0.5% MCC and 0.1% CaCl$_2$.

FIG. 25A is an image of a control sample where no coating was applied before thermal processing. FIG. 25B illustrates blueberries coated with a composition comprising 1% CNF/0.1% CMC/0.1% MCC after thermal processing; FIG. 25C illustrates blueberries coated with a composition comprising 1% CNF/0.1% CMC/0.5% MCC after thermal processing; FIG. 25D illustrates blueberries coated with a composition comprising 0.5% CNF/0.1% CMC/0.1% MCC after thermal processing; and FIG. 25E illustrates blueberries coated with a composition comprising 0.75% CNF/ 0.1% CMC/0.5% MCC after thermal processing.

FIG. 29A is an image of the blueberries in the processing solution after a first and second thermal process step using 0.25% CMC/ 18% sugar; FIG. 29B is an image of the blueberries in the processing solution after a first and second thermal process step using 0.25% CMC/18% sugar and after having been stored for 7 days; FIG. 29C is an image of the blueberries in the processing solution after a first thermal processing step using 0.25% CMC/18% sugar and second thermal processing step using 0.25% CMC/18% sugar/10 mM $CaCl_2$; FIG. 29D is an image of the blueberries in the processing solution after a first thermal processing step using 0.25% CMC/18% sugar and second thermal processing step using 0.25% CMC/18% sugar/10 mM $CaCl_2$ and after being stored for 7 days; FIG. 29E is an image of the blueberries in the processing solution after a first processing step using 0.25% CMC/18% sugar and second thermal process using 0.25% CMC/18% sugar/10 mM $CaCl_2$ at pH 4.5 and after being stored for 7 days.

FIGS. 34A and 34B: uncoated mangoes; FIGS. 34C and 35D: Coating A, which contains 1.5% cellulose nanofibrils (CNF)/0.1% micro calcium carbonate (MCC) applied by spray method; and FIGS. 34E and 34F: Coating B, which contains 1.5% CNF/0.1% MCC/0.1% carboxymethyl cellulose (CMC) applied by spray method. Photographs of coated mangoes were taken after film was removed using tap water.

FIGS. 36A-36C are photographic images of grapes illustrating the effect of cinnamon leaf essential (CLE) oil on cellulose nanofibrils (CNF)/micro calcium carbonate (MCC) coating composition. FIG. 36A illustrates uncoated grapes; FIG. 36B, CNF/MCC with 2.5% CLE; and FIG. 36C, CNF/MCC/carboxymethyl cellulose (CMC) with 2.5% CLE.

FIG. 39A shows results from embodiments wherein no complexation steps/conditions were used; FIG. 39B shows results from embodiments wherein $Fe^{3+}$-anthocyanin complexation was used; and FIG. 39C shows results from embodiments wherein CMC-$Fe^{3+}$-anthocyanin complexation was used.

FIG. 42A shows fresh fruit; FIG. 42B shows fruit comprising a cellulose nanofiber (CNF) coating containing $CaCl_2$; and FIG. 42C shows fruit comprising an MC-modified cellulose nanofiber (CNF) coating containing $CaCl_2$.

FIGS. 43A-43E are scanning electron microscopy (SEM) images of different types of CNF films and layer-by-layer coating system; FIGS. 43A, 43B, and 43C illustrate the morphology of embodiments of a cellulose nanofiber (CNF) film, $CNF/CaCl_2$ film, or $CNF/CaCl_2$/methylcellulose (MC) film, respectively; the tables in FIGS. 43B and 43C show the change of calcium contents in films before* and after** soaking in water for 10 minutes at the ambient temperature by using energy dispersive x-ray analysis (EDXA)); FIGS. 43D and 43E illustrate simulated layer-by-layer coating system after sodium alginate treatment for $CNF/CaCl_2$ and $CNF/CaCl_2/MC$ coating, respectively.

FIG. 44A illustrates effects of the composition on weight loss; and FIG. 44B illustrates effects of the composition on shrinkage; the same letter placed above each column within same fruit were not significantly different (p>0.05); "Control" represents uncoated fruit; and "OCNC," "2.5CNC," "5CNC," "7.5CNC" and "10CNC" represent fruit coated with 2% chitosan coating formulations added with 0%, 2.5%, 5%, 7.5% and 10% of CNC, respectively.

FIG. 49A is a photographic image of cherries before being sprayed with the coating; FIG. 49B is a photographic image of cherries after being sprayed with the coating; FIGS. 49C and 49D illustrate the effect of surfactant level (%, w/w wet base) on cherry cracking (%) and fruit growth (mm) grown in two different locations of Coihueco [FIG. 49C] and Angol [FIG. 49D] in Chile.

DETAILED DESCRIPTION

I. Overview of Several Embodiments

Figure 1A:
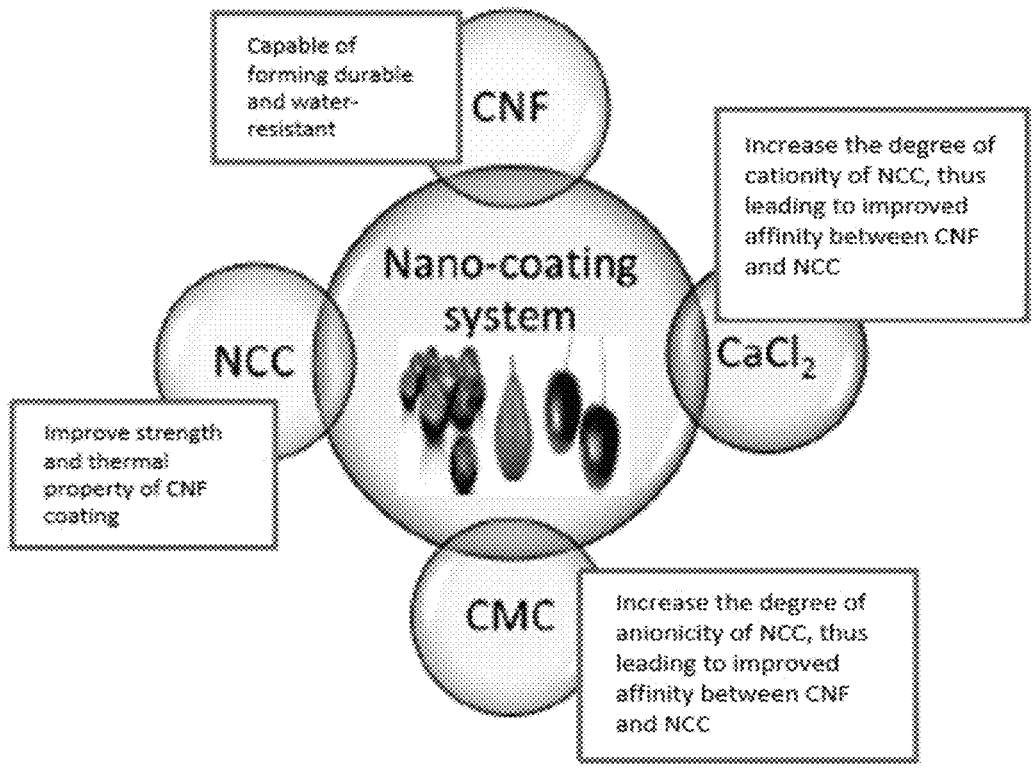
FIGS. 1A and 1B are schematic diagrams illustrating the features of an embodiment of the disclosed coating composition (FIG. 1A) that can be used in combination with processing composition embodiments to promote anthocyanin retention in fruits during thermal processing (FIG. 1B).

Disclosed herein are embodiments of a composition comprising at least one cellulose nanomaterial, an inorganic salt component, and/or a stabilizing agent (e.g., methyl cellulose, carboxymethyl cellulose or other cellulose derivatives, chitosan, and the like). The disclosed compositions are useful for forming edible coatings/films on plant parts and other objects. In some disclosed embodiments, the compositions further comprise a crosslinking agent. The disclosed compositions and coatings/films made using the compositions are effective at protecting fresh and processed produce and other substances and products, from various different types of food processing damage (and the deleterious effects associated therewith), and biotic and/or abiotic stresses that reduce quality and marketability.

Disclosed embodiments include a coating composition useful for preventing pre- and post-harvest damage to plants or parts thereof. In some embodiments, the coating compositions mitigate the leaching of inorganic materials, plant and animal tissue pigments, and nutrients in fresh and processed tissues (e.g., fruits and vegetables). Embodiments of the composition can be used to form a film on objects, such as plants and/or plant parts (e.g., fruits, vegetables, and the like).

The composition, and films made using the composition, can function to protect the plant and/or plant part from damage caused by pre- or post-harvest damage and/or processing. In some embodiments, agricultural crop seeds and plantlets can benefit from the compositions described herein as they can be protected against biotic and abiotic stresses while in storage and during field production. The disclosed composition, and films made using the composition, can prevent reduced perceived quality and reduced health benefits associated with plants or plant parts that have been exposed to, and damaged by, UV light. Furthermore, the compositions, and films made using the compositions, can protect foodstuffs, fruits, or vegetables that are stored cold (e.g., that are frozen, stored in cold rooms or refrigerators). For example, previously frozen foods typically exhibit "drip loss," which can be reduced using the compositions described herein. Embodiments of the composition also can be used to prolong the integrity and appearance of foodstuffs and fresh produce.

Some embodiments concern a composition, comprising a cellulose nanomaterial in an amount ranging from about 0.1 wt/v % to about 10 wt/v %; an inorganic salt component in an amount ranging from about 0.005 wt/v % to about 2.5 wt/v %; and a stabilizing agent in an amount ranging from about 0.05 wt/v % to about 0.1 wt/v %; or a cellulose nanomaterial in an amount ranging from about 0.1 wt/v % to about 10 wt/v %; and an inorganic salt component in an amount ranging from about 0.005 wt/v % to about 5 wt/v %. In any or all of the described embodiments, the cellulose nanomaterial is selected from cellulose nanofibrils, cellulose nanocrystals, or a combination thereof. In any or all of the described embodiments, the cellulose nanomaterial is present in an amount ranging from about 0.1 wt/v % to about 3 wt/v %. In any or all of the described embodiments, the inorganic salt component is selected from a sodium-containing salt, a potassium-containing salt, a calcium-containing salt, a magnesium-containing salt, a tin-containing salt, or a combination of two or more thereof. In any or all of the described embodiments, the inorganic salt component is selected from nano calcium carbonate, micro calcium carbonate, calcium:silicate (90%:10%), wollastonite, $CaCl_2$, NaCl, $SnCl_2$, $MgCl_2$, KCl, KI, or combinations thereof. In any or all of the described embodiments, the inorganic salt component is present in an amount ranging from about 0.1 wt/v % to about 2 wt/v %.

In any or all of the described embodiments, the stabilizing agent includes a carboxy- or sulfate-containing polysaccharide selected from alginic acid, sodium alginate, carboxymethyl cellulose, pectic polysaccharides, carboxymethyl dextran, xanthan gum, carboxymethyl starch, hyaluronic acid, dextran sulfate, pentosan polysulfate, carrageenans, fucoidans, or a combination of two or more thereof. In any or all of the described embodiments, the stabilizing agent is present in an amount ranging from about 0.05 wt/v % to about 1 wt/v %, such as about 0.05 wt/v % to about 0.4 wt/v %.

In any or all of the described embodiments, the composition can further comprise a crosslinking agent, an additive agent, an agricultural agent, or a combination of two or more thereof. In some embodiments, the crosslinking agent is selected from a phenolic compound, an acid, a metal ion, or a combination of two or more thereof; the additive agent is selected from a film forming material (e.g., chitosan, methylcellulose, carboxymethyl cellulose or other cellulose derivatives), a plasticizer, an antimicrobial agent, an antioxidant agent, a suspension agent/stabilizer, an emulsifier, a mixing aid/defoamer, a preservative, a co-solvent, or a combination of two or more thereof; and/or the agricultural agent is selected from nutrients, growth stimulants, plant growth regulators, herbicides, fungicides, pesticides, or a combination of two or more thereof.

In any or all of the described embodiments, the composition is formulated for preventing or mitigating pre- and/or post-harvest damage in a plant, fruit, vegetable, or part thereof. In any or all of the described embodiments, the composition is formulated for preventing or mitigating leaching of nutrients, anthocyanins and other biological pigments, or combinations thereof from a plant, fruit, vegetable, or part thereof. In any or all of the described embodiments, the composition is formulated for preventing or mitigating weight loss and UV damage of a plant, fruit, vegetable, or part thereof.

In any or all of the described embodiments, the composition comprises cellulose nanofibrils in an amount selected from 0.02%, 0.188%, 0.375%, 0.5 wt/v %, 0.75 wt/v %, 1 wt/v %, 1.5% wt/v %, or 2 wt/v %; calcium carbonate (e.g., nano calcium carbonate or micro calcium carbonate) in an amount selected from 0.01 wt/v %, 0.05 wt/v %, 0.1 wt/v %, 0.17 wt/v %, 0.38 wt/v %, 0.5 wt/v %, 0.64 wt/v %, 1 wt/v %, 1.5 wt/v %, or 2 wt/v %; and a non-starch polysaccharide (e.g., methylcellulose, carboxymethyl cellulose and other cellulose derivatives, chitosan, and the like) in an amount selected from 0.05 wt/v %, 0.1 wt/v %, 0.15 wt/v %, or 0.25 wt/v %.

Some embodiments concern a plant or plant part comprising a film formed from the composition of any or all of the embodiments described herein. In any or all of the described embodiments, the plant or plant part exhibits reduced weight loss after thawing compared to an equivalent plant or plant part that is not coated with the composition. In any or all of the described embodiments, the plant or plant part exhibits reduced cracking compared to an equivalent plant or plant part that is not coated with the composition. In any or all of the described embodiments, the plant or plant part exhibits reduced anthocyanin leaching, moisture loss, gas exchange, or nutrients loss compared to an equivalent plant or plant part that is not coated with the composition. In some embodiments, the plant part is a fruit, a vegetable, or a seed.

Also disclosed herein are embodiments of a method comprising substantially coating a plant or plant part with the composition of any or all of the disclosed embodiments before or after the plant or plant part is harvested. In any or all of the described embodiments, the plant or plant part is substantially coated with the composition by spraying, dipping, enrobing, or a combination of two or more thereof. In any or all of the described embodiments, the method further comprises drying plant or plant part after it has been coated to form a film on the plant or plant part, wherein drying involves heating the plant or plant part at a temperature of about 30° C. to about 35° C. In some embodiments, a hot air drying technique can be used to dry (at least partially) the plant part. Such hot air drying techniques can use temperatures ranging from 60° C. to 90° C. for a time period ranging from about 2 minutes to about 10 minutes. In any or all of the described embodiments, the plant part is a fruit or vegetable. In some embodiments, the method further comprises processing the fruit or vegetable to prevent or mitigate leaching of nutrients, anthocyanins and other biological pigments, or combinations thereof in the fruit or vegetable. In some embodiments, processing the fruit or vegetable comprises thermally processing the fruit or vegetable at a temperature of at least 80° C. to about 100° C., using high hydrostatic pressure to process the fruit or vegetable or an infusion processing method to process the fruit or vegetable, or combinations thereof. In some embodiments, the method further comprises washing the film from the fruit or vegetable before the fruit or vegetable is processed, after the fruit or vegetable is processed, or both. In some embodiments, one or more additional thermal processing steps may be used. In any or all of the described embodiments, the method can further comprise exposing the fruit or vegetable to a processing composition. In some embodiments, the processing composition comprises a crosslinking agent in an amount ranging from about 0.01 wt/v % to about 0.5 wt/v %, an optional sugar compound in an amount ranging from about 12 wt/v % to about 25 wt/v %, a multivalent salt in an amount ranging from about 1 mM to about 100 mM, or combinations thereof. In some embodiments, the processing composition comprises sodium alginate, carboxymethyl cellulose, sucrose, $CaCl_2$, or a combination of two or more thereof.

In any or all of the described embodiments, the method prevents or mitigates pre- or post-harvest damage of the plant or plant part. In any or all of the described embodiments, the method prevents or mitigates drip loss. In any or all of the described embodiments, the method prevents or mitigates biotic and/or abiotic stress to the plant or plant part. In any or all of the described embodiments, the method prolongs storage or shelf life of the plant or plant part.

Some embodiments concern a method, comprising substantially coating a fruit or vegetable before or after it is harvested with a composition comprising a cellulose nanomaterial in an amount ranging from about 0.1 wt/v % to about 3 wt/v %, an inorganic salt component in an amount ranging from about 0.005 wt/v % to about 2.5 wt/v %, and a crosslinking agent in an amount ranging from about 0.05 wt/v % to about 0.4 wt/v %; drying the composition coating the fruit or vegetable to form a film; thermally processing the fruit or vegetable at a temperature of at least 80° C. to about 100° C. in a processing composition comprising a crosslinking agent in an amount ranging from about 0.01 wt/v % to about 0.5 wt/v %; one or more sugar compounds in an amount ranging from about 12 wt/v % to about 18 wt/v %; a multivalent salt in an amount ranging from about 5 mM to about 15 mM, or combinations thereof; washing the film from the fruit or vegetable; and thermally processing the fruit or vegetable at a temperature of at least 80° C. to about 100° C. and a pH of at least 4 to about 5.5 in a processing composition comprising a crosslinking agent in an amount ranging from about 0.01 wt/v % to about 0.5 wt/v %; a sugar compound in an amount ranging from about 12 wt/v % to about 18 wt/v %; a multivalent salt in an amount ranging from about 5 mM to about 15 mM, or combinations thereof. In any or all of the described embodiments, drying comprises heating the fruit or vegetable at a temperature of about 30° C. to about 35° C. In yet additional embodiments, a hot air drying technique can be used to dry (at least partially) the plant part. Such hot air drying techniques can use temperatures ranging from 60° C. to 90° C. for a time period ranging from about 2 minutes to about 10 minutes.

In some embodiments, a nano-cellulose edible coating essentially as described herein may be used. In some embodiments, a method of coating an object, comprising applying to the object a nano-cellulose coating or coating composition essentially as described herein is provided.

In some embodiments, a composition useful for food processing is disclosed. The composition can comprise a cellulose nanomaterial in an amount ranging from about 0.1 wt/v % to about 10 wt/v %; an inorganic salt component in an amount ranging from about 0.01 wt/v % to about 0.75 wt/v %; and methyl cellulose in an amount ranging from about 0.05 wt/v % to 1 wt/v %.

In any or all of the disclosed embodiments, the cellulose nanomaterial is selected from cellulose nanofibrils, cellulose nanocrystals, or a combination thereof. Also, the cellulose nanomaterial can be present in an amount ranging from about 0.1 wt/v % to about 1 wt/v %. In some embodiments, the cellulose nanomaterial is present in an amount of 0.75 wt/v %.

In any or all of the disclosed embodiments, the inorganic salt component is selected from a sodium-containing salt, a potassium-containing salt, a calcium-containing salt, a magnesium-containing salt, a tin-containing salt, or a combination of two or more thereof. Also, the inorganic salt component can be selected from nano calcium carbonate, micro calcium carbonate, calcium oxide nanopowder, calcium:silicate (90%:10%), wollastonite, $Ca(OAc)_2$, $CaCl_2$, and other calcium salts NaCl, $SnCl_2$, $MgCl_2$, KCl, KI, or combinations thereof. In some embodiments, the inorganic salt is $CaCl_2$, which is present in an amount ranging from about 0.1 wt/v % to about 0.6 wt/v %. In some embodiments, the $CaCl_2$ is present in an amount of 0.5 wt/v %.

In any or all of the disclosed embodiments, the methyl cellulose is present in an amount ranging from about 0.1 wt/v % to about 1 wt/v %. In some embodiments, the methyl cellulose is present in an amount of 0.5 wt/v %.

In any or all of the disclosed embodiments, the composition can further comprise a stabilizing agent. The stabilizing agent can be a carboxy- or sulfate-containing polysaccharide selected from alginic acid, sodium alginate, cellulose and cellulose derivatives (e.g., carboxymethyl cellulose), pectic polysaccharides, carboxymethyl dextran, xanthan gum, carboxymethyl starch, hyaluronic acid, dextran sulfate, pentosan polysulfate, carrageenans, fucoidans, or a combination of two or more thereof. In some embodiments, the stabilizing agent is present in an amount ranging from about 0.05 wt/v % to about 1 wt/v %, such as about 0.05 wt/v % to about 0.5 wt/v %. In any or all of the disclosed embodiments, the stabilizing agent can be sodium alginate, carboxymethyl cellulose, or a combination thereof. In some embodiments, the sodium alginate is present in an amount of 0.5 wt/v %. In some embodiments, the carboxymethyl cellulose is present in an amount of 0.1 wt/v %.

In any or all of the disclosed embodiments, the composition can further comprise a crosslinking agent, an additive agent, an agricultural agent, or a combination of two or more thereof. In some embodiments, the crosslinking agent is selected from a phenolic compound, an acid, a metal ion, or a combination of two or more thereof; the additive agent is selected from a film forming material (e.g., methyl cellulose, carboxymethyl cellulose, cellulose derivatives, chitosan, or the like), a plasticizer, an antimicrobial agent, an antioxidant agent, a suspension agent/stabilizer, an emulsifier, a mixing aid/defoamer, a preservative, a co-solvent, or a combination of two or more thereof; and/or the agricultural agent is selected from nutrients, growth stimulants, plant growth regulators, herbicides, fungicides, pesticides, or a combination of two or more thereof. In some embodiments, the composition can further comprise chitosan in an amount ranging from 0.05 wt/v % to 1 wt/v %.

In any or all of the disclosed embodiments, the composition can be formulated for preventing or mitigating post-harvest damage in a fruit, vegetable, or part thereof. In any or all of the disclosed embodiments, the composition can be formulated for preventing or mitigating leaching of nutrients, anthocyanins and other biological pigments, or combinations thereof from a fruit, vegetable, or part thereof. In any or all of the disclosed embodiments, the composition can be formulated for preventing or mitigating weight loss and UV damage of a fruit, vegetable, or part thereof.

In some embodiments, the composition can comprise cellulose nanofibrils in an amount ranging from 0.5 wt/v % to 1 wt/v %; methyl cellulose, chitosan, or a combination thereof in an amount ranging from 0.4 wt/v % to 0.6 wt/v %; and $CaCl_2$ in an amount ranging from 0.1 wt/v % to about 0.75 wt/v %.

Also disclosed herein are embodiments of a plant part, comprising a film formed from a composition comprising cellulose nanomaterial in an amount ranging from about 0.1 wt/v % to about 10 wt/v %; an inorganic salt component in an amount ranging from about 0.01 wt/v % to about 0.75 wt/v %; and methyl cellulose, chitosan, or a combination thereof in an amount ranging from about 0.05 wt/v % to 1 wt/v %. In any or all of the disclosed embodiments, the plant part exhibits reduced anthocyanin leaching, moisture loss, gas exchange, or nutrients loss compared to an equivalent plant part that is not coated with the composition. The plant part can be a fruit or a vegetable.

Also disclosed herein are embodiments of a method comprising substantially coating a plant part with a composition comprising cellulose nanomaterial in an amount ranging from about 0.1 wt/v % to about 10 wt/v %; an inorganic salt component in an amount ranging from about 0.01 wt/v % to about 0.75 wt/v %; and methyl cellulose, chitosan, or a combination thereof in an amount ranging from about 0.05 wt/v % to 1 wt/v % after the plant part is harvested. In any or all of the disclosed embodiments, the plant part can be substantially coated with the composition by spraying, dipping, enrobing, or a combination of two or more thereof. In some embodiments, the method can further comprise drying the plant part at ambient temperature after it has been coated to form a film on the plant part. In some embodiments, a hot air drying technique can be used to dry (at least partially) the plant part. Such hot air drying techniques can use temperatures ranging from 60° C. to 90° C. for a time period ranging from about 2 minutes to about 10 minutes. The plant part can be a fruit or vegetable.

In some embodiments, the method can further comprise processing the fruit or vegetable to prevent or mitigate leaching of nutrients, anthocyanins and other biological pigments, or combinations thereof in the fruit or vegetable. In any or all of the disclosed embodiments, processing the fruit or vegetable comprises thermally processing the fruit or vegetable at a temperature of at least 80° C. to about 100° C., using high hydrostatic pressure to process the fruit or vegetable, or combinations thereof. In some embodiments, the method can further comprise washing the film from the fruit or vegetable before the fruit or vegetable is processed, after the fruit or vegetable is processed, or both. In any or all disclosed embodiments, one or more additional thermal processing steps may be used. In some embodiments, the method further comprises exposing the fruit or vegetable to a processing composition. The processing composition comprises a stabilizing agent in an amount ranging from about 0.05 wt/v % to about 1 wt/v %, a sugar compound in an amount ranging from about 12 wt/v % to about 40 wt/v %, a mono- or multivalent salt in an amount ranging from about 0.01 wt/v % to 0.5 wt/v %, or combinations thereof. In some embodiments, the processing composition comprises sodium alginate, sucrose, $CaCl_2$, or a combination of two or more thereof.

In any or all of the disclosed embodiments, the method prevents or mitigates post-harvest damage of the plant part, and/or prevents or mitigates abiotic stress to the plant part, and/or prolongs storage or shelf life of the plant part.

In some embodiments, the method comprises substantially coating a fruit or vegetable after it is harvested with a composition comprising a cellulose nanomaterial in an amount ranging from about 0.1 wt/v % to about 10 wt/v %, an inorganic salt component in an amount ranging from about 0.01 wt/v % to about 0.75 wt/v %, and methyl cellulose in an amount ranging from about 0.05 wt/v % to 1 wt/v %; drying the composition coating the fruit or vegetable to form a film; and thermally processing the fruit or vegetable at a temperature of at least 80° C. to about 100° C. in a processing composition comprising a crosslinking agent in an amount ranging from about 0.05 wt/v % to about 1 wt/v %, a sugar compound in an amount ranging from about 12 wt/v % to about 40 wt/v %, a mono- or multivalent salt in an amount ranging from about 1 mM to about 100 mM, or combinations thereof. Such methods also can comprise exposing the fruit or vegetable to a composition comprising a crosslinking agent and a mono- or multivalent salt prior to substantially coating the fruit or vegetable with the composition comprising the cellulose nanomaterial, the inorganic salt component, and/or the methyl cellulose. In some embodiments, such methods can further comprise washing the film from the fruit or vegetable after thermally processing the fruit or vegetable; and thermally processing for a second time the fruit or vegetable at a temperature of at least 80° C. to about 100° C. and a pH of at least 4 to about 5.5 in a processing composition comprising a crosslinking agent in an amount ranging from about 0.01 wt/v % to about 0.5 wt/v %; a sugar compound in an amount ranging from about 12 wt/v % to about 18 wt/v %; a mono- or multivalent salt in an amount ranging from about 5 mM to about 15 mM, or combinations thereof. In any or all disclosed embodiments, drying comprises heating the fruit or vegetable at ambient temperature or at a temperature of about 30° C. to about 35° C.

In some embodiments, the method can comprise exposing a fruit or vegetable after it is harvested to a carboxymethyl cellulose-containing composition, wherein the carboxymethyl cellulose is present in an amount ranging from 0.05 wt/v % to about 1 wt/v %; substantially coating the fruit or vegetable with a composition comprising a cellulose nanomaterial in an amount ranging from about cellulose nanofibrils in an amount ranging from 0.5 wt/v % to 1 wt/v %, methyl cellulose in an amount ranging from 0.4 wt/v % to 0.6 wt/v %, and $CaCl_2$ in an amount ranging from 0.1 wt/v % to about 0.75 wt/v %; drying the composition coating the fruit or vegetable to form a film; exposing the fruit or vegetable to sodium alginate in an amount ranging from 0.05 wt/v % to 0.5 wt/v % and $CaCl_2$ in an amount ranging from 2 wt/v % to 4 wt/v %, sequentially or simultaneously; and thermally processing the fruit or vegetable at a temperature of at least 80° C. to about 100° C. in a processing composition comprising a sugar compound in an amount ranging from about 12 wt/v % to about 18 wt/v %.

Some embodiments disclosed herein concern a composition, comprising a cellulose nanomaterial in an amount ranging from about 0.02 wt/v % to about 5 wt/v %; and a surfactant in an amount ranging from about 0.01% wt/v % to about 5 wt/v %. Other embodiments disclosed herein concern a composition, comprising a cellulose nanomaterial in an amount ranging from about 0.1 wt/v % to about 1 wt/v %; and an inorganic salt component in an amount ranging from about 0.05 wt/v % to about 1 wt/v %.

In any or all of the above embodiments, the composition comprising the cellulose nanomaterial in an amount ranging from about 0.1 wt/v % to about 1 wt/v %, and the inorganic salt component in an amount ranging from about 0.05 wt/v % to about 1 wt/v %, can further comprise a crosslinking agent, a stabilizing agent, a film forming material, or a combination of two or more thereof wherein each of the crosslinking agent, the stabilizing agent, and the film forming material independently are present in an amount ranging from about 0.05 wt/v % to about 1 wt/v % In any or all of the above embodiments, the cellulose nanomaterial is selected from cellulose nanofibrils, cellulose nanocrystals, or a combination thereof.

In any or all of the above embodiments, the cellulose nanomaterial is present in an amount of 0.02%, 0.2%, 0.5%, or 0.75 wt/v %.

In any or all of the above embodiments, the inorganic salt component is selected from a sodium-containing salt, a potassium-containing salt, a calcium-containing salt, a magnesium-containing salt, a tin-containing salt, or a combination of two or more thereof.

In any or all of the above embodiments, the inorganic salt component is selected from nano calcium carbonate, micro-calcium carbonate, calcium oxide nanopowder, calcium:silicate (90%:10%), wollastonite, $CaCl_2$, NaCl, $SnCl_2$, $MgCl_2$, KCl, KI, or a combination of two or more thereof.

In any or all of the above embodiments, the inorganic salt is $CaCl_2$ and is present in an amount ranging from about 0.1 wt/v % to about 0.6 wt/v %.

In any or all of the above embodiments, the stabilizing agent is a carboxy- or sulfate-containing polysaccharide selected from alginic acid, sodium alginate, cellulose, cellulose derivatives, pectic polysaccharides, carboxymethyl dextran, xanthan gum, carboxymethyl starch, hyaluronic acid, dextran sulfate, pentosan polysulfate, carrageenans, fucoidans, or a combination of two or more thereof; and the film forming material is selected from methyl cellulose, carboxymethyl cellulose, cellulose derivatives, chitosan, or a combination of two or more thereof.

In any or all of the above embodiments, the surfactant is selected from a polysorbate surfactant, a sorbitan surfactant, or a combination thereof.

In any or all of the above embodiments, the composition comprising the cellulose nanomaterial in an amount ranging from about 0.02 wt/v % to about 5 wt/v %, and the surfactant in an amount ranging from about 0.01% wt/v % to about 5 wt/v %, further comprises a plasticizer, an antimicrobial agent, or a combination thereof.

In any or all of the above embodiments, the plasticizer is selected from glycerol, sorbitol, polyethylene glycol 400, or a combination of two or more thereof; and the antimicrobial agent is selected from potassium sorbate, a quaternary ammonium salt, chitosan, or a combination of two or more thereof.

In any or all of the above embodiments, the composition comprises cellulose nanofibrils in an amount ranging from 0.05 wt/v % to 1 wt/v %; chitosan and methyl cellulose, wherein each of the chitosan and methyl cellulose independently is present in an amount ranging from 0.05 wt/v % to 2 wt/v %; $CaCl_2$ in an amount ranging from 0.1 wt/v % to about 0.75 wt/v %; and sodium alginate in an amount ranging from about 0.05 wt/v % to about 3 wt/v %.

In any or all of the above embodiments, the composition comprises cellulose nanofibrils in an amount ranging from 0.1 wt/v % to 1 wt/v %; polyoxyethylene (80) sorbitan monolaurate, sorbitan monolaurate, sorbitan monooleate, or a combination thereof, in an amount ranging from 0.01 wt/v % to about 0.5 wt/v %; and glycerol, sorbitol, polyethylene glycol 400, or a combination of two or more thereof, in an amount ranging from 0.1 wt/v % to 0.5 wt/v %; or cellulose nanocrystals in an amount ranging from about 0.02 wt/v % to about 0.2 wt/v %; chitosan in an amount ranging from about 0.05 wt/v % to about 2 wt/v %; and polyoxyethylene (80) sorbitan monolaurate, sorbitan monolaurate, sorbitan monooleate, or a combination thereof, in an amount ranging from 0.01 wt/v % to about 0.5 wt/v %.

In some embodiments, a method, comprising substantially coating a plant part with a composition is disclosed. The composition can comprise a cellulose nanomaterial in an amount ranging from about 0.02 wt/v % to about 5 wt/v %, and a surfactant in an amount ranging from about 0.01% wt/v % to about 5 wt/v % before or after the plant part is harvested by spraying, dipping, or enrobing the plant part with or in the composition.

In some embodiments, a method is disclosed that comprises substantially coating a fruit or vegetable after it is harvested with a composition comprising a cellulose nanomaterial in an amount ranging from about 0.1 wt/v % to about 1 wt/v %, and an inorganic salt component in an amount ranging from about 0.05 wt/v % to about 1 wt/v %; drying the composition substantially coating the fruit or vegetable to form a film-coated fruit or vegetable; exposing the film-coated fruit or vegetable to a stabilizing agent, an additional inorganic salt component, or a combination thereof; and thermally processing the film-coated fruit or vegetable in a processing solution comprising a sugar compound in an amount ranging from about 12 wt/v % to about 40 wt/v % by heating the film-coated fruit or vegetable at a temperature of about 80° C. to about 100° C., using high hydrostatic pressure, or using infusion processing.

In any or all of the above embodiments, the method can further comprise exposing the fruit or vegetable to a composition comprising an inorganic salt component, a surfactant, or a combination thereof; exposing the fruit or vegetable to a composition comprising a crosslinking agent and an additive agent; or exposing the fruit or vegetable to both a composition comprising an inorganic salt component, a surfactant, or a combination thereof and a composition comprising a crosslinking agent and an additive agent; wherein the fruit or vegetable is exposed prior to being substantially coated with the composition comprising the cellulose nanomaterial in an amount ranging from about 0.1 wt/v % to about 1 wt/v %, and the inorganic salt component in an amount ranging from about 0.05 wt/v % to about 1 wt/v %.

In any or all of the above embodiments, drying can comprise drying the fruit or vegetable at ambient temperature, heating the fruit or vegetable at a temperature of about 30° C. to about 35° C., or heating the fruit or vegetable at a temperature ranging from 60° C. to 90° C.

In some embodiments, a plant part, comprising a film formed from the composition of any or all of the above embodiments is disclosed.

In any or all of the above embodiments, the plant part exhibits reduced anthocyanin leaching, moisture loss, gas exchange, or nutrients loss compared to an equivalent plant part that does not comprise a film formed from the composition.

In any or all of the above embodiments, the plant part is a fruit or vegetable.

II. Abbreviations $CaCl_2$ calcium chloride
CMC carboxymethyl cellulose
CMF cellulose microfiber
CNC cellulose nano crystal
CNF cellulose nanofibrils
MC methylcellulose
Micro $CaCO_3$ (or MCC) micro calcium carbonate
NCC nano calcium carbonate
SA sodium alginate
SEM scanning electron microscopy
RH relative humidity
WVTR water-vapor transmission rate

III. Terms

Unless otherwise noted, technical terms are used according to conventional usage.

The term "cellulose nanocrystal" as used herein refers to a cellulosic object composed of at least one elementary fibril, containing predominately crystalline and paracrystalline regions, which does not exhibit branches or entanglement between cellulose nanocrystals or network-like structures.

The term "cellulose nanofiber" as used herein refers to a nanofiber predominantly composed of cellulose and exhibiting cellulosic properties.

The term "cellulose nanofibril" as used herein refers to a cellulosic object composed of at least one elementary fibril, containing crystalline, paracrystalline, and amorphous regions, which may exhibit longitudinal splits, entanglement between cellulose nanofibrils, or network-like structure.

The term "crosslinking" as used herein refers to the use of a substance (molecular or ionic) to link at least two molecules (whether the same or different) through a chemical bond, such as a covalent, ionic, and/or electrostatic bond.

The term "elementary fibril" or "fibril" as used herein refers to a cellulosic structure, originating from a single terminal enzyme complex, having a configuration of cellulose chains specific to each plant, animal, algal and bacterial species.

The term "encapsulation" as used herein refers to the formation of a complete or partial barrier around a particle or an object for specifically controlling the movement of substances into or out of encapsulated particle or object.

The term "exogenous" refers to any material that is present in or on an organism or living cell or system or object, but that originated outside of that organism/cell/system/object, as opposed to something that is endogenous. As used herein, exogenous distinguishes the synthetic films disclosed herein from natural films or cuticles produced by plants or plant parts.

The term "leaching" as used herein refers to the extraction of certain organic and inorganic materials from a plant or plant part into a liquid, such as a processing composition or other suitable aqueous or non-aqueous composition.

The term "mitigate(ing)" as used herein refers to the ability of the disclosed composition, a film made from the composition, or a method using the composition to substantially reduce (e.g., such as by about 10%, 20%, 30%, 40%, 50%, 60%, 70%, 80%, or 90%) pre- or post-harvest damage from occurring. In some embodiments, pre- or post-harvest damage can be caused by biotic stress, abiotic stress, storage, and/or processing (e.g., thermal processing).

The term "nanofiber" as used herein refers to a nanoobject with two external dimensions in the nanoscale and the third dimension significantly larger.

The term "nutrients" as used herein refers to any component that is found in a plant or plant part, whether occurring naturally or having been absorbed during growth. Nutrients can include, but are not limited to primary macronutrients, such as nitrogen, phosphorus, potassium; secondary macronutrients, such as calcium, sulfur, and magnesium; micronutrients or trace minerals, such as boron, manganese, iron, zinc, copper, nickel, and the like.

The term "plant" as used herein refers to a whole plant including any root structures, vascular tissues, vegetative tissues and reproductive tissues. A "plant part" includes any portion of the plant. For example, plant parts may be obtained upon harvesting a plant. Plant parts encompassed by the present disclosure include, but are not limited to, flowers, fruits, seeds, leaves, vegetables, stems, roots, branches, and combinations thereof, which are less than the whole plant from which they are derived.

The term "prevent(ing)" as used herein refers to the ability of the disclosed composition, a film made from the composition, or a method using the composition to completely or substantially stop pre- or post-harvest damage from occurring. In some embodiments, pre- or post-harvest damage can be caused by biotic stress, abiotic stress, storage, and/or processing (e.g., thermal processing).

The term "UV damage" as used herein refers to any sort of damage to the objects described herein that is caused by ultraviolet light. In some embodiments, such damage can include wilting, discoloration, shrinking, spotting, and the like.

The term "stabilizing agent" refers to a compound that can improve the material properties, particularly water resistance and mechanical properties of the films formed from the coating composition, and also the affinity between the cellulose nanomaterial and the inorganic salt component.

The amounts of the compositional components that can be used in the coating compositions, processing compositions, and/or agricultural use compositions disclosed herein are expressed as weight/volume percent unless otherwise indicated. In instances where compositional components are in the form of, or combined as, an aqueous solution, the amounts of components can be expressed as weight/volume percent (wt/v %) or weight/weight percent (wt/wt %) as these units are essentially identical.

Explanations of terms and methods are provided herein to better describe the present disclosure and to guide those of ordinary skill in the art in the practice of the present disclosure. The singular forms "a," "an," and "the" refer to one or more than one, unless the context clearly dictates otherwise. For example, the term "comprising an antioxidant" includes single or plural antioxidants and is considered equivalent to the phrase "comprising at least one antioxidant." The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements.

Unless explained otherwise, all technical and scientific terms used herein have the same meaning as commonly understood to one of ordinary skill in the art to which this disclosure belongs. All references cited herein are incorporated by reference in their entirety.

IV. Coating Compositions

The coating compositions described herein can be prepared using the methods disclosed herein and any other methods known in the art to be suitable for producing a dispersion, solution, or emulsion that can be applied to an object.

A. Components

In some embodiments, components of the coating compositions described herein are edible and in some examples they have a regulatory status of generally recognized as safe (GRAS) as provided by the United States Food and Drug Administration. In other examples the components are listed on the Environment Protection Agency's 4A and 4B lists as being safe for the environment.

In some embodiments, the coating composition can comprise a cellulose nanomaterial. Cellulose nanomaterial, as used herein, is a cellulosic material consisting primarily of linear chains of about one hundred to over ten thousand β-D-glucopyranose units linked by glucosidic bonds at their C1 and C4 positions, with nanoscale external dimensions, or in some embodiments, having nanoscale internal structure or surface structure. In some embodiments, cellulose nanomaterials can comprise cellulose nanofibrils (which are also referred to herein as CNF) or cellulose nanocrystals. Such nanomaterials may contain a portion of cellulose microcrystals or cellulose microfibrils. The amount of cellulose microcrystals and/or cellulose microfibrils present in such mixtures can be reduced or increased depending on the extraction method use to make the cellulose nanomaterial and/or by varying the cellulose-containing species from which these components are extracted. In some embodiments, the cellulose nanomaterials consist of cellulose nanofibrils or cellulose nanocrystals. The cellulose nanomaterial typically is selected to provide a clear coating and an improved matrix for incorporation of other materials/components disclosed herein.

The cellulose nanomaterial of the disclosed coating composition typically is selected to have a suitable structure and suitable chemical properties for use in the particular composition embodiments and methods of using the compositions disclosed herein. For example, the cellulose nanomaterial typically is selected to provide an acceptably clear, water-resistant coating. In some embodiments, the cellulose nanomaterial structure and compound properties are optimized to provide a type of cellulose nanomaterial that comprises both crystalline regions and amorphous regions. The cellulose nanomaterial can have dimensions of from about 3 nm to about 300 nm in width. The cellulose nanomaterial can have a length ranging from about 50 nm to about 100,000 nm, such as about 100 nm to about 10,000 nm, about 100 nm to about 5,000 nm, about 100 nm to about 2,500 nm, about 100 nm to about 2,000 nm, or about 100 nm to about 1,000 nm. The disclosed cellulose nanomaterial disclosed herein can have an aspect ratio reminiscent of elementary fibrils in plant cell walls. In some embodiments, the cellulose nanomaterial has an aspect ratio ranging from about 10 to about $1\times10^6$, such about 20 to about $1\times10^5$ about 30 to about $1\times10^4$, about 40 to about 100, or about 50 to about 100. An exemplary cellulose nanomaterial having aspect ratios within this range is the cellulose nanofibril material disclosed herein. In other embodiments, the cellulose nanomaterial can have an aspect ratio ranging from about 5 to about 100, such as about 5 to about 50, about 5 to about 25, about 5 to about 20, about 5 to about 15, or about 5 to about 10. An exemplary cellulose nanomaterial having an aspect ratio within this range is the cellulose nanocrystal material disclosed herein. In particular disclosed embodiments, the cellulose nanomaterial may be cellulose nanofibrils that can be prepared using typical methods known to a person of ordinary skill in the art, such as fibrillation with or without chemical pretreatment in the mechanical refining of cellulose derived from wood fiber or non-wood plant fiber. The method used to prepare the cellulose nanofibrils may or may not provide a composition of cellulose nanofibrils containing residual hemicelluloses. In some embodiments, the cellulose nanofibrils may be purchased from a commercial source and then used in the disclosed compositions.

The disclosed coating composition also can include one or more inorganic salt components. The inorganic salt component should be suitable for consumption. The inorganic salt component may be added to embodiments of the coating composition to promote UV protection of the object being coated with the coating composition, to increase film strength, film adhesion to the object being coated with the coating composition, and/or complex with components contained within the object being coated. In some embodiments, the inorganic salt component may be a nanoparticle or a nano-powder. The inorganic salt component may have a particle size ranging from about 60 nm to about 100 nm, the particle size being determined using Scanning Electron Microscopy (SEM). The inorganic salt component may be selected from any of those typically used in the art as agricultural additives, drug delivery components (e.g., nano calcium carbonate, micro calcium carbonate, both of which may be loaded with hydrophilic protein-based drugs), or those used for imaging, biomedical and bioscience applications, or as coatings, plastics, nanowires, or alloy and/or catalytic applications. In preferred embodiments, the inorganic salt component is not susceptible to oxidation.

In particular disclosed embodiments, the inorganic salt component comprises at least one monovalent or multivalent (such as divalent, trivalent, or tetravalent) ion and a suitable counter-ion. In some embodiments, the inorganic salt compound may be selected from sodium-containing salt, a potassium-containing salt, a calcium-containing salt, a magnesium-containing salt, a tin-containing salt, or a combination thereof. Such salts can comprise any suitable counter-ion, such as those that are safe for consumption. Suitable inorganic salt components are selected to maintain the transparency of the film made using the disclosed coating composition and can include, but are not limited to calcium salts (e.g., calcium carbonate, such as nano or micro calcium carbonate, a calcium silicate compound, such as wollastonite or a combination of calcium and silicate at a ratio of 90%:10%, respectively, calcium oxide nanopowder, calcium chloride, calcium acetate, sodium chloride, and soluble calcium salts), tin salts (e.g., stannous chloride and the like), magnesium salts (e.g., magnesium chloride and the like), potassium salts (e.g., potassium chloride, potassium iodide, and the like), or combinations thereof.

Embodiments of the coating composition disclosed herein can be formulated using various amounts of the disclosed components in any combination. The amount of the cellulose nanomaterial that is used in the coating composition may range from about 0.02% to about 10%, such as about 0.02% to about 5%, or 0.1% to about 5%, about 0.1% to about 3%, about 0.15% to about 2.5%, about 0.19% to about 2%, about 0.25% to about 1.5%, about 0.3% to about 1%, or from about 0.5% to about 1%. Exemplary amounts of the cellulose nanomaterial include about 0.02%, 0.188%, 0.2%, 0.375%, 0.5%, 0.75%, 1%, 1.5%, and 2%. The amount of the inorganic salt component that is used in the coating composition may range from about 0.005% to about 5%, such as about 0.005% to about 2.5%, such as from about 0.05% to about 2%, or from about 0.05% to about 0.5%, or from about 0.01% to about 2%, or from about 0.1% to about 2%, or from about 0.5% to about 2%, or from about 1% to about 2%, or from about 1.5% to about 2%, or from about 0.05% to 0.75%, or 0.1% to 0.6%. Exemplary amounts of the inorganic salt component that can be used in the coating composition include about 0.01%, 0.05%, 0.1%, 0.17%, 0.38%, 0.5%, 0.64%, 1%, 1.5%, and 2%. Certain embodiments of the coating composition need not comprise the inorganic salt component and instead consist of the cellulose nanomaterial. In coating composition embodiments comprising the cellulose nanomaterial and one or more inorganic salt components, the ratio of the cellulose nanomaterial to the inorganic salt component may range from about 50:50 (cellulose nanomaterial:inorganic salt component) to about 99:1 (cellulose nanomaterial:inorganic salt component), with exemplary ratios including 50:50, 99.34:0.66, 96.77:3.23, 93.75:6.25, 90:10, 80:20, 75:25, 70:30, or 60:40 (cellulose nanomaterial:inorganic salt component).

Exemplary coating composition embodiments disclosed herein can comprise combinations of cellulose nanofibrils, calcium carbonate (e.g., nano or micro calcium carbonate), calcium chloride, sodium chloride, and/or stannous chloride. The amounts of each of these components can be as disclosed herein and these compositions also may comprise one or more additional components discussed below.

Some embodiments of the disclosed coating composition may further comprise one or more crosslinking agents. Crosslinking agents may be used to stabilize and retain anthocyanins in plants or a plant part (e.g., fruits or vegetables) during processing to provide for enhanced shelf life, storage, and consumer appeal. Examples of the crosslinking agents that can be added to the disclosed coating composition include, but are not limited to, phenolics, stabilizing agents, acids, metal ions, and combinations thereof. In other embodiments, the crosslinking agent can be an inorganic crosslinking agent, such as sodium trimetaphosphate, calcium acetate, calcium chloride, zinc chloride, magnesium chloride, ferric chloride, manganese, and the like. Organic crosslinking agents (other than the polysaccharides disclosed above) also can be used, such as pyruvic acid, glutaraldehyde, glyceraldehyde, formaldehyde, magnesium and zinc salts of acetic acid, or combinations thereof. An exemplary embodiment of the disclosed composition is provided in FIG. 1A, which illustrates compositional components and how each component can affect the properties of other components in the composition to provide a durable, water resistant film suitable for the uses disclosed herein.

Examples of phenolic compounds that can be used include, but are not limited to, tannic acid, salicylic acid, vanillin, ethyl vanillin, gallic acid, ellagic acid, methyl parabens, propyl parabens, ethyl parabens, butyl parabens, vanillin, butylated hydroxyanisole, butylated hydroxytoluene, tocopherols, α-tocopherol, and the like.

Examples of suitable acids include, but are not limited to, formic acid, citric acid, acetic acid, fumaric acid, lactic acid, malic acid, phosphoric acid, tartaric acid, propionic acid, and the like. In some embodiments, the acid compound may be the same as a stabilizing agent disclosed herein.

Stabilizing agents can be added to the composition to improve the material properties, particularly mechanical properties of the films formed from the coating composition, and also the affinity between the cellulose nanomaterial and the inorganic salt component. Without being limited to a single theory of operation, it is currently believed that the stabilizing agent enhances the attraction between the cationic particles of the inorganic salt component and the anionic portions of the cellulose nanomaterial by increasing the degree of anionicity of the cellulose nanomaterial. Stabilizing agents can include, but are not limited to, carboxy- or sulfate-containing polysaccharides. Suitable carboxylated polysaccharides include, but are not limited to, alginic acid (or a salt there, such as sodium alginate), cellulose or cellulose derivatives (e.g., carboxymethyl cellulose), pectic polysaccharides, carboxymethyl dextran, xanthan gum, carboxymethyl starch, or combinations thereof. Suitable sulfated polysaccharides include, but are not limited to, hyaluronic acid, dextran sulfate, pentosan polysulfate, carrageenans, fucoidans, or combinations thereof. Additionally, any suitable non-carboxylated or non-sulfated polysaccharides known in the art can be modified chemically to include these functional groups. In some embodiments, even the cellulose nanomaterial can be functionalized using such methods, such as carboxymethylation of CNF. Such modified polysaccharides also can be used in the disclosed compositions.

Metal ions may also be added the disclosed compositions to increase the degree of cationicity of the monovalent or multivalent metal present in the inorganic salt component thereby improving the affinity between the inorganic salt component and the cellulose nanomaterial. Metal ions that can be included in the disclosed coating composition include, but are not limited to, calcium (derived from $CaCl_2$, for example), tin (derived from food-grade stannous (Sn) chloride, for example), iron (e.g., $Fe^{3+}$) or other food grade metal ions.

Amounts of the crosslinking agents that may be used in the disclosed coating composition can be varied to increase and/or decrease a desired property of the coating composition. Phenolic compounds and acids can be present in an amount ranging from 0 to about 5%, such as about 1% to about 5%, or about 2% to about 5%, or about 3% to about 5%, or about 4% to about 5%. Stabilizing agents can be present in an amount ranging from 0 to about 1%, such as about 0.05% to about 1%, about 0.05% to about 0.9%, about 0.05% to about 0.8%, about 0.05% to about 0.7%, about 0.05% to about 0.5%, about 0.075% to about 0.6%, about 0.1% to about 0.5%, about 0.15% to about 4%, or about 0.2% to about 0.3%, or about 0.25% to about 0.3%. In some embodiments, a crosslinking agent may be present in an amount ranging from 0 to 0.5%, such as about 0.05% to about 0.4%, about 0.1% to about 0.3%, or about 0.1% to about 0.25%. Exemplary amounts of the crosslinking agent are selected from 0.05%, 0.1%, 0.15%, 0.25%, and 0.5%. The metal ion can be present in an amount ranging from about 0.5 mM to about 15 mM, such as about 1 mM to about 10 mM, such as about 1 mM to about 9 mM, or about 1 mM to about 7 mM, or about 1 mM to about 7 mM, or about 1 mM to about 3 mM.

In other disclosed embodiments, the coating composition can further comprise one or more additive agents that when applied to the object to be coated can protect the object from (and/or reduce) water loss, UV damage, and/or loss of physical integrity, all of which are responsible for significant quality deterioration, microbial spoilage and monetary losses to the food industry. Examples of suitable additive agents include, but are not limited to, film forming materials, such as a non-starch polysaccharide (e.g., methyl cellulose, carboxymethyl cellulose or other cellulose derivatives, chitosan, and the like), protein, or a fruit or vegetable puree; plasticizers (such as, but not limited to, glycerin, propylene glycol, sorbitol solutions, sorbitan monostearate, sorbitan monoleate, lactamide, acetamide DEA, lactic acid, polysorbate 20, 60 and 80, polyoxyethylene-fatty esters and ethers, sorbitan-fatty acid esters, polyglyceryl-fatty acid esters, triacetin, dibutyl sebacate, polyethylene glycol, such as PEG 400, or combinations thereof); antimicrobial agents or antioxidant agents, which can be selected from suitable essential oils (including, but not limited to thyme oil, clove oil, oregano, lemongrass, marjoram, cinnamon, coriander, or combinations thereof), and other suitable components disclosed herein that also exhibit antimicrobial and/or antioxidant activity (e.g., potassium sorbate, chitosan, a quaternary ammonium salt, or combinations thereof); suspension agents/stabilizers (including, but not limited to xanthan gum, guar gum, carrageenan, carbopol polymers, and combinations thereof); emulsifiers (including, but not limited to pemulin emulsifiers; lecithin; polysorbate surfactants (or TWEEN surfactants), e.g., polyoxyethylene (20) sorbitan monolaurate, also referred to as "TWEEN 20," or polyoxyethylene (80) sorbitan monolaurate, also referred to as "Tween 80"; sorbitan surfactants (or SPAN surfactants), e.g., sorbitan monolaurate, also referred to as "SPAN 20," or sorbitan monooleate, also referred to as "SPAN 80"; and combinations thereof); mixing aids/defoamers (including, but not limited to surfynol products, silicones, such as simethicone, silica gel, and combinations thereof), preservatives (including, but not limited to sorbic acid, benzoic acid, and salts thereof; nitrates (including, but not limited to potassium nitrate or sodium nitrate); chitosan; essential oils; organic acids; bacteriocins (including, but not limited to nisin); and phenolic compounds); cosolvents (such as, but not limited to alcohols, such as isopropanol); and combinations thereof. In some embodiments, certain additional components can serve multiple purposes in the composition. For example, some additive components, such as preservatives and chitosan, can exhibit antimicrobial and/or antioxidant activity, as can certain stabilizing agents, such as acids, and phenolic compounds.

The amount of the additive agent present in the coating composition can be modified as necessary. In some embodiments, plasticizers can be present in an amount ranging from 0 to about 10%, such as about 0.1% to about 10%, about 0.2% to about 9%, about 0.3% to about 8%, about 0.4% to about 7%, about 0.5% to about 6%, about 0.75% to about 5%, or about 1% to about 4%, or about 0.01% to about 0.5%. In examples using chitosan, the amount of chitosan present may range from about 0 to about 3%, such as about 0.05% to 2%, or about 0.05% to about 1%, or about 0.05% to about 0.5%, or about 0.1% to about 1.5%, about 0.2% to about 1%, about 0.3% to about 0.9%, about 0.4% to about 0.8%, or about 0.5% to about 0.7%. In examples using a polysaccharide (e.g., methyl cellulose, carboxymethyl cellulose or other cellulose derivatives, chitosan, or the like), the amount of polysaccharide present may range from about 0 to about 2%, such as about 0.05% to about 1%, or about 0.05% to about 0.5%, or about 0.1% to about 1%, or about 0.4% to about 0.6%. In examples using an essential oil, the amount of the essential oil present may range from about 0 to about 4%, such as about 0.1% to about 2.5%, about 0.2% to about 1.5%, about 0.3% to about 1.5%, about 0.4% to about 1.5%, or about 0.5% to about 1.5%. In examples using a surfactant, the amount of the surfactant can range from about 0.01% to about 100% of the amount of the cellulose nanomaterial used, such as about 0.01% to about 10%, or about 0.01% to about 5%, or about 0.5%, or about 0.05% to about 1%, such as about 0.1% to about 0.5%, or about 0.1% to about 0.2%. In particular disclosed embodiments, a particular ratio of cellulose nanomaterial to surfactant can be used to make a coating composition that exhibits superior coating of the object being coated. In particular disclosed embodiments, the cellulose nanomaterial:surfactant ratio can range from 1:1 to 20:1, such as 2.5:1 to 20:1, or 2.5:1 to 10:1. In examples using an antimicrobial, the amount of the antimicrobial can range from about 0.1% to about 1%, such as about 0.1% to about 0.75%, or about 0.1% to about 0.5%, with exemplary embodiments using 0.5%.

Also contemplated are agricultural use compositions comprising at least one of the composition components described herein and further comprising one or more agricultural agents selected from nutrients (e.g., fertilizers), growth stimulants, plant growth regulators, herbicides, fungicides, pesticides, or combinations thereof. The agricultural use compositions, or films made using the agricultural use composition, can be made using any of the methods disclosed herein and can applied onto crops, trees, bushes, vines, vegetable plants, ornamental and decorative plants, such as plants grown for their flowers (e.g., roses, carnations, lilies, and so forth) or for their decorative foliage (e.g., ivy, ferns, and so forth), and the like. The amount of agricultural agent used in the disclosed agricultural use composition may be selected to be within the limitations set forth in EPA guidelines. A person of ordinary skill in the art would recognize that such amounts can be determined by reviewing the EPA guidelines concerning the selected agricultural agent and selecting an amount within the lower and upper limits provided therein.

In embodiments comprising one or more agricultural agents, the agricultural agent typically is provided in an amount ranging from about 1 ppm to about 5,000 ppm, such as about 1 ppm to about 4,000 ppm, about 1 ppm to about 3,000 ppm, about 1 ppm to about 2,000 ppm, or about 1 ppm to about 1,000 ppm. Amounts less than or equal to a manufacturer's suggested application level also may be used and would be readily recognized by those of ordinary skill in the art.

B. Processing Compositions

Other compositions disclosed herein include processing compositions, which can be used in combination with the coating compositions disclosed herein. The processing compositions typically are used in methods where the object coated with the disclosed coating compositions undergoes thermal processing.

Suitable processing compositions comprise at least one component capable of promoting surface encapsulation of the object being coated, and/or enhancing the thermal stability of one or more pigment components present in the object (e.g., with a plant or plant part). Without being limited to a single theory of operation, it is currently believed that the processing composition components can chemically interact (e.g., electrostatically, covalently, and/or ionically) with one or more coating composition components.

In particular disclosed embodiments, the processing composition can comprise a crosslinking agent as disclosed herein. In some embodiments, the crosslinking agents can be selected from a stabilizing agent as disclosed herein. Exemplary processing compositions can comprise carboxy- or sulfate-containing polysaccharides. Suitable carboxylated polysaccharides include, but are not limited to, alginic acid (and salts thereof), carboxymethyl cellulose, pectic polysaccharides, carboxymethyl dextran, xanthan gum, carboxymethyl starch, or combinations thereof. Suitable sulfated polysaccharides include, but are not limited to, hyaluronic acid, dextran sulfate, pentosan polysulfate, carrageenans, fucoidans, and combinations thereof. Additionally, any suitable non-carboxylated or non-sulfated polysaccharides known in the art can be modified chemically to include these functional groups, such as maltodextrin. Such modified polysaccharides also can be used in the disclosed compositions. The amount of crosslinking agent present in the processing composition can range from about 0.01% to 1%, such as about 0.01% to about 0.5%, or 0.01% to about 0.4%, about 0.05% to about 0.3%, about 0.1% to about 0.25%, or about 0.15% to about 0.2%. In exemplary embodiments, the amount of the crosslinking agent used is about 0.25% or about 0.5%. In yet additional exemplary embodiments, about 5% to about 20% of maltodextrin can be used in the processing compositions disclosed herein.

The processing composition can further comprise a sugar compound. In some embodiments, the sugar compound is optional and need not be present in the processing composition. Any sugar suitable for use in typical fruit canning processes can be used in the processing compositions. In particular disclosed embodiments, the sugar compound is selected from any sugar compound having a brix value of about 12 to about 18; the sugar used may be a mixture of two or more sugars. Exemplary embodiments use sucrose, but other similar sugar compounds can be used. The total amount of sugar compound(s) used in the processing composition can range from 0 to about 40%, such as from 0 to about 30%, or about 5% to about 30%, or about 5% to about 20%, about 12% to about 18%, such as about 12% to about 17%, about 12% to about 16%, about 12% to about 15%, or about 12% to about 14%. In exemplary embodiments, the amount of the sugar compound used is about 18% or about 15%.

Other suitable processing composition components include, but are not limited to, any of the mono- or multivalent salts disclosed herein. In some embodiments, the processing solution can include a calcium-containing salt, a magnesium-containing salt, a tin-containing salt, or a combination thereof. An exemplary multivalent salt used in particular working embodiments disclosed herein is $CaCl_2$, but other such salts know to those of ordinary skill in the art could be used. In embodiments using a mono- or multivalent salt, the mono- or multivalent salt is provided in an amount of about 1 mM to about 100 mM, such as about 5 mM to about 75 mM, about 5 mM to about 50 mM, about 5 mM to about 25 mM, about 5 mM to about 20 mM, about 5 mM to about 12.5 mM, or about 5 mM to about 10 mM. In exemplary embodiments, the about of the mono- or multivalent salt used is about 10 mM.

Figure 1B:
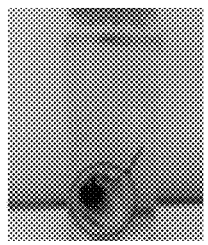
Figure 1B:
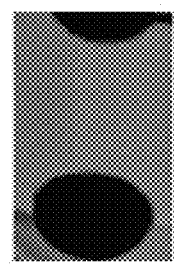

In particular disclosed embodiments, processing compositions comprising sodium alginate (also referred to as "SA") were used to promote encapsulation of nutrients, pigments, anthocyanins, and the like on the surface of fruit. It is currently believed that this encapsulation is achieved by a chemical crosslinking interaction between the sodium alginate and one or more positively charged ions present in the composition, such as in the form of the inorganic salt component and/or a metal ion additive. The sodium alginate-containing processing solutions can therefore also improve the adhesiveness of the coating composition to the surface of coated fruits. The coated fruits therefore become more durable under aqueous conditions, thermal conditions, and other processing conditions. A schematic diagram illustrating a particular embodiment of the disclosed coating composition in combination with the processing compositions disclosed herein is provided in FIG. 1B.

Processing solutions also can comprise carboxymethyl cellulose (alone or in combination with sodium alginate) to further prevent leaching of nutrients, anthocyanins and other biological pigments from fruits. Without being limited to a single theory of operation, it is currently believed that the carboxymethyl cellulose (or any other crosslinking agent disclosed herein) further induces metal-complex formation between one or more positively charged ions present in the coating composition (such as those present in the inorganic salt component and/or a metal ion additive) and anthocyanins present in the fruit. An exemplary embodiment is described in FIG. 1B. This metal-complex formation can promote polymerization and/or structural modification of anthocyanins present in the fruit. These polymerized or structurally modified anthocyanins are typically more stable and therefore are not degraded and/or leached from the fruit during thermal processing and/or storage. The addition of methyl cellulose to a coating composition comprising a cellulose nanomaterial and an inorganic salt component also can facilitate prevention of anthocyanin degradation and/or leaching from the fruit during thermal processing and/or storage.

V. Films

Also disclosed herein are embodiments of films that can be made using the disclosed composition. Certain embodiments of the disclosed films need not comprise any waxes, oils, or other solvents to be applied to an object. The film can be edible as the film, or composition used to form the film can be formulated with ingredients which are commonly found in food (e.g., cellulose, calcium carbonate, water, glycerin, etc.) thereby avoiding consumer concerns over food safety. In some embodiments, the film may be fibrous or crystalline and can form a durable, inert, water-resistant coating over the object being coated.

In some embodiments, the composition can be used to form a film over an object, the film having the physical and chemical properties discussed herein. The disclosed compositions also can be used to form flexible packages. Flexible packages include, but are not limited to, biodegradable products, such as boards, films, and packages, or protective coatings. The term "film" or "coating" as used herein refers to a layer of the composition created on the exterior of a plant or plant part. The layer need not have a uniform thickness or be completely homogenous in composition. Also, the film or coating need not cover the entire object to which it is applied. In some embodiments, the film or coating can substantially coat the object. In such embodiments, the film or coating can cover about 10%, 20%, 30%, 40%, 50%, 60%, 70%, 80%, or 90% of the surface area of the object. In other embodiments, the film or coating can completely coat the object—that is it can cover about 100% of the object. In some embodiments, the film or coating can have a thickness that varies by about 10%, 20%, 30%, 40%, 50%, 60%, 70%, 80%, or 90% over the object.

Films and/or flexible packages made from embodiments of the disclosed composition are extremely water resistant and strong. Films and flexible packages comprising combinations of the disclosed composition and other existing film forming materials (such as non-starch polysaccharides like methyl cellulose or chitosan, protein, and fruit/vegetable puree) can provide water resistance and barrier properties while retaining the unique functionality of the non-cellulose components of the composition. The films or coatings described herein provide protection from water loss caused by transpiration and/or freeze-thaw related drip loss, and allow for improved water resistance and barrier properties while retaining the unique functionality of the non-cellulose components of the composition. In yet additional embodiments, the film forming materials disclosed herein can enhance adhesion between the cellulose nanomaterial and hydrophobic fruit surfaces. Without being bound by a particular theory of operation, it is currently believed that film forming materials, like methyl cellulose, can prevent the adverse effects that water can have on foodstuffs by promoting the hydrophobicity of the cellulose nanomaterial.

When applied to the target surface of plants, plant parts, foodstuffs, animal tissues and inorganic materials, the disclosed compositions form a strong external barrier after drying. The compositions may be dried to form the films by allowing the water in the composition to evaporate. In some embodiments, the films are dried using heat to facilitate faster drying of the composition thereby preventing or mitigating long-term exposure to oxygen and light. Temperatures ranging from about 30° C. to about 35° C. can be used to dry the compositions after they have been applied to an object. In some embodiments, a hot air drying technique can be used to dry (at least partially) the plant part. Such hot air drying techniques can use temperatures ranging from 60° C. to 90° C. for a time period ranging from about 2 minutes to about 10 minutes. The films or coatings produced using embodiments of the disclosed compositions can mitigate the loss of color appearance and physical integrity associated with the leaching of anthocyanins and other biological pigments (e.g., betalains), nutrients, and water-soluble compounds into surrounding water or other aqueous solutions when subjected to the heat, pressure, or other conditions associated with preparation and processing. This barrier prevents or greatly lessens the leaching of anthocyanins and other biological pigments (e.g., betalains), and nutrients during thermal or other types of processing. In plants and foodstuffs, preventing water loss before and after harvest is important to the marketability of the products. The disclosed compositions, and films made using the compositions, can be used to prevent such water loss in susceptible plants, foodstuffs, as well as in animal tissues and inorganic materials.

In particular disclosed embodiments, a plant or plant part that comprises a film made from the compositions disclosed herein exhibits properties that would not be exhibited by an equivalent plant or plant part (i.e., an identical unmodified plant or plant part) that does not comprise such a film. For example, in some embodiments, the plant or plant part that comprises a film formed from the disclosed composition exhibits reduced weight loss (such as a 10%, 20%, 30%, 40%, 50%, 60%, 70%, 80%, or 90% reduction) after thawing compared to an equivalent plant or plant part that is not coated with the composition. In some embodiments, the plant or plant part comprising a film made from the composition disclosed herein exhibits reduced cracking (such as a 10%, 20%, 30%, 40%, 50%, 60%, 70%, 80%, 90%, or 100% reduction) compared to an equivalent plant or plant part that is not coated with the composition. In yet other embodiments, the plant or plant part comprising a film made from the disclosed composition exhibits reduced anthocyanin leaching, moisture loss, gas exchange, or nutrients loss (such as a 10%, 20%, 30%, 40%, 50%, 60%, 70%, 80%, or 90% reduction) compared to an equivalent plant or plant part that is not coated with the composition.

VI. Methods of Making the Compositions

Also disclosed herein are embodiments of a method for making the disclosed coating compositions and processing compositions.

The method of making the disclosed composition may comprise dispersing in water (which may be deionized, purified, and the like) a suitable amount of each composition component disclosed herein. In some embodiments, both components may be added to water simultaneously. In other embodiments, each component may be added sequentially to the same aqueous solution. In yet other embodiments, separate aqueous solutions of each component may be prepared and then mixed together. Other components may be added to the solution containing the cellulose nanomaterial either prior to or after the inorganic salt component is added to the cellulose nanomaterial. Certain components may not need to be dispersed in water prior to mixing and therefore may be added neat to one or more solutions containing other components. As used herein, "mixing" can be accomplished by any means known in the art. For example, mechanically stirring, agitating or co-spraying components can be used to "mix" the components described herein. The resulting composition can form a dispersion, a solution, or an emulsion. Exemplary methods of making the composition concern dispersing the cellulose nanomaterial in water and then adding the inorganic salt component to the solution of the cellulose nanomaterial.

Once each component is dispersed in water (whether together or separately), the solution is then homogenized using a homogenizer at low or high shear. The level of shear used can be modified according to the type of coating composition used. The solution typically is homogenized for a time period suitable for completely dissolving, dispersing, and/or emulsifying the components in water at ambient temperature. In some embodiments, one or more of a stabilizing agent, an additive agent, and/or an agricultural agent may be added after the solution of the cellulose nanomaterial and the inorganic salt component before or after the aqueous solution comprising these components has been homogenized. These components also could be added to separate aqueous solutions of either one of the cellulose nanomaterial and/or inorganic salt component before the two aqueous solutions are combined. The final composition may then be formulated for administration by soaking, spray coating, dipping, enrobing, or any other suitable technique for applying the composition to an object as disclosed herein.

In some embodiments, the composition is not intended for immediate use, for example when the composition is packaged for future sale. Such compositions are shelf stable, such that less than 20%, 30%, 40% or 50% of the composition will separate after 5, 10, 20, 30 or 60 days of storage. Even longer periods of storage are also contemplated. One of ordinary skill in the art will appreciate that methods of making shelf-stable compositions can involve choosing appropriate stabilizers to be added to the composition.

In other embodiments, the composition can be applied relatively soon after mixing. In some examples, the cellulose nanomaterial can be dispersed in water and then mixed with one or more of the other components at a later time. In other embodiments, the cellulose nanomaterial can be dispersed in water with the inorganic salt component to form a premixture, which can be mixed with a separate composition comprising one or more of the stabilizing agents, additive agents, and/or an agricultural agent disclosed herein. The resulting compositions can be then mixed on or near the location where application will occur, thus eliminating the need to create a shelf stable composition.

VII. Methods of Use

The compositions described herein can be used for one or more purposes. One of ordinary skill in the art will appreciate that the methods used to apply the compositions to a subject, plant, or plant parts may vary depending upon the intended purpose of the composition. Additional uses for edible coatings, other than those expressly disclosed herein, will be recognized by those of ordinary skill in the art.

A. Uses of Compositions

The compositions disclosed herein can be used to prevent pre- and post-harvest damage to plants, or parts thereof, thus extending shelf-life and increasing marketability of fresh produce. The compositions also can be used in foodstuffs to promote storage and the appearance of food items. The compositions further have uses that are not related to food, but can concern animal healthcare and medical applications. The utility of the disclosed compositions, and films made using such compositions is not limited solely to those described herein. The coating compositions disclosed herein can be easily removed prior to sale or simply peeled away by the consumers.

In some embodiments, the coating and processing compositions disclosed herein can be used to reduce and prevent anthocyanins and other biological pigments (e.g., betalains) and nutrients leaching from fruits and/or vegetables. For example, during thermal processing (e.g., canning), anthocyanins and other biological pigments (e.g., betalains) and nutrients can be leached from the fruit into the surrounding aqueous media, which typically is water or a sugar solution, causing a change in appearance (loss of natural fruit pigments) and possible nutritional losses. Composition embodiments disclosed herein can mitigate these losses. Additionally, the coating and processing compositions disclosed herein can be used to reduce and prevent anthocyanins and other biological pigments (e.g., betalains) and nutrients leaching from fruits and/or vegetables during infusion processing. Infusion processing (e.g., infused dehydration and vacuum impregnation) is a conventional technique used to provide semi-dehydrated fruit with soft texture and desirable taste. Infusion processing techniques are described in more detail in Zhao & Xie, "Practical applications of vacuum impregnation in fruit and vegetable processing," *Trends in Food Science & Technology* 15 (2004), 434-451, which is incorporated herein by reference.

The disclosed compositions also are useful as food coatings and in preparation of frozen foods to prevent drip loss and in maintain integrity during thawing. Foodstuffs experience significant water loss during the freezing and thawing process due to syneresis (i.e., water loss after thawing) and evaporation; the disclosed compositions can mitigate this water loss. For example, the disclosed compositions can be used to reduce water loss/gain in bakery goods (e.g., cookies, pastries, and breads) during storage (cold or ambient). Some embodiments can be used to reduce water loss/gain and/or sticking of candies and other confections during storage (cold or ambient). In yet other embodiments, the disclosed compositions can be used to reduce gas (e.g., $O_2$ and $CO_2$) exchange or exposure to harmful gasses (e.g., ethylene gas) of various foods or other organic materials with air in the environment during storage and while on the shelf.

Compositions disclosed herein can also be used in an agricultural context to protect plant parts (e.g., agricultural crop seeds), plants and/or plantlets against biotic and/or abiotic stresses prior to and after harvesting. In some embodiments, the compositions described herein can be used alone or can be combined with one or more agricultural agents to inhibit biotic stresses, such as insect, nematode, and/or microbial infestation, and also to resist abiotic stresses, such as environmental stresses. One of ordinary skill in the art will appreciate that there are several methods that can be used to determine the decrease in infestation attributable to the application of the compositions described herein. For example, for microbial levels cultures can be taken and the number of colony forming units (CFUs) can be determined and compared to plant parts (e.g., agricultural crop seeds), plants and/or plantlets that were not treated with the composition. Similarly, the number of insects or insect larvae can be counted and plant parts (e.g., agricultural crop seeds), plants and/or plantlets that have been treated with the compositions described herein can be compared to similar plant parts (e.g., agricultural crop seeds), plants and/or plantlets in the same geography that have not been treated. Generally, the treated plants will display 10%, 20%, 30%, 40%, 50%, 60%, 70%, 80%, or 90% less microbial, nematode, and/or insect infestation compared to control plant parts (e.g., agricultural crop seeds), plants and/or plantlets.

In some examples, the coating compositions are used to prevent or mitigate abiotic stresses, such as UV light exposure, wind exposure, and low and high temperature exposure, to name a few. Solely by way of example, embodiments of the disclosed composition can be used to prevent cracking in fruit (e.g., cherries and the like) associated with the water balance of fruits and/or vegetables. Depending on the coating formulation, a 50% to 100% reduction in cracking can be obtained.

The compositions also provide the safe, visibly transparent films that do not impart any significant odor or taste to the foods and that also prevents discoloration or other damage of the fruit caused by UV exposure. The films also can prevent against moisture loss caused by heat and/or sunlight.

The coating compositions described herein are also useful in post handling of animal tissues, healthcare and related medical applications, to protect (that is, reduce the effects of) the body and especially the skin from damage due to moisture loss, UV light exposure, heat, and other biotic and/or abiotic stresses. Exposure to high levels of UV light can damage maturing produce, resulting in visibly discolored spots, destroying phytochemical compounds, and providing a foothold for spoilage organisms to grow.

Modifying the physical properties of biodegradable products such as boards, films and packages, for instance to provide increased resistance to degradation, improved barrier properties, and/or improved strength is yet another application for the disclosed compositions. It is also contemplated that the films and compositions provided herein can be used as a protective surface treatment or coating for durable materials, such as to reduce or prevent damage during transit and handling. The majority of flexible packaging materials in the food industry are petroleum-derived polymers. Their lack of sustainability and concerns over toxic residues result in decreased appeal to consumers. Alternate natural materials (e.g., cellulose and chitosan) lack water resistance. The compositions disclosed herein can be used to provide coatings that address these limitations.

Exemplary uses of the disclosed compositions include, but are not limited to, the particular applications provided in Table 1.

TABLE 1

Exemplary Uses of Compositions

| Food item | Application Stage | Results obtained from using Composition Embodiments |
|---|---|---|
| Cherries | Pre-harvest | prevention and/or mitigation of cherry cracking |
| Cherries (including fresh cherries and maraschino cherries) and blueberries | Post-harvest processing | storage is improved; longer shelf life; enables new packaging of these products (for example, the fruit can be displayed in a clear container and retain the appearance of fresh fruit |
| Pome fruit (apples, pears) | Pre-harvest | prevention of sunburn (such as degradation caused by sunburn) |

TABLE 1-continued

Exemplary Uses of Compositions

| Food item | Application Stage | Results obtained from using Composition Embodiments |
| --- | --- | --- |
| Fruit cocktail | Post-harvest processing | inclusion of blueberries or cherries in fruit cocktails without leaching of color; low to no sugar embodiments |
| Pome fruit (apples, pears, cherries) | Post-harvest | longer storage life carrier for other functional component(s) |
| Strawberries | Post-harvest | longer shelf life |
| Wine grapes | Pre-harvest | prolong growing season; compositions can comprise an antimicrobial component |
| Blueberries, strawberries, grapes, and other small fruits/berries | Post-harvest | longer shelf life carrier for antimicrobial component(s) |
| Seeds | Storage | increased germination rates; carrier for additional performance additives, such as pre-emergent herbicides, growth enhancers, fertilizers, etc. |
| Bananas | Post-harvest | longer shelf life; carrier for antimicrobial, antifungal, and/or insecticide component(s) |
| Citrus | Post-harvest | longer shelf life; carrier for antimicrobial component(s) |
| Tropical fruits (mangoes, papaya, avocado, bananas etc.) | Pre- and post-harvest | protection from stress agents and also improve shelf life carrier for antimicrobial component(s) |
| Tomatoes | Pre- and Post-harvest | protection from stress agents; improved shelf life; improved transportability with reduced loss of quality |
| Eggs | Before shipping/sale | improved shelf life; storage at ambient temperature |

B. Application of Compositions

In particular disclosed embodiments, the compositions can be applied as a dispersion, a solution, or an emulsion to any of the objects disclosed herein. Techniques known to those of ordinary skill in the art may be used to apply the compositions to form films. For example, the object may be dipped into a dispersion, a solution, or an emulsion of the composition. In other embodiments, a dispersion, solution, or emulsion of the composition may be dripped onto the object. In yet other embodiments, the object may be coated (partially or wholly) by spray-coating a dispersion, a solution, or an emulsion of the composition onto the object. The object also can be enrobed (partially or wholly) using a mechanical applicator to apply a dispersion, solution, or emulsion of the composition to the object. In embodiments concerning compositions that are used to coat plants and/or plant parts, such as fruits and/or vegetables, the composition can be added to the object prior to being harvested or after harvesting. Suitable sprayers and enrobers would be recognized by those of ordinary skill in the art. In some embodiments, the coating method may be chosen based on the viscosity of the coating composition. For example, if the coating composition is viscous and the object being coated is a post-harvest product (e.g., fruit or vegetable), then dipping or dripping methods of application are typically used. Pre-harvest application typically involves applying the coating to the plant or plant part thereof using a spraying method.

C. Processing Methods

As indicated herein, the disclosed compositions are suitable for use with plants or parts thereof (e.g., fruits and/or vegetables) that are exposed to post-harvest treatment. In some embodiments, fruits and/or vegetables can be thermally processed to promote the shelf life of the fruit or vegetable, and foodstuffs made using such fruits and vegetables. An example is the thermal processing of fruits or vegetables for preservation. Another example is storing fruits or vegetables at cold temperatures. Yet another example is high hydrostatic pressure (HHP) processing of fruits or vegetables. High hydrostatic pressure processing is a method of processing where products, such as fruits or vegetables, are subjected to elevated pressures (such as about 6,000 atm) with or without the addition of heat to achieve, for example, microbial inactivation or to alter the product attributes to achieve consumer-desired qualities (such as reduced leaching of nutrients, anthocyanins or other biological pigments, or combinations thereof). The disclosed compositions are suitable for use in these processing applications and any other processing technique used in the art.

Figure 2A:
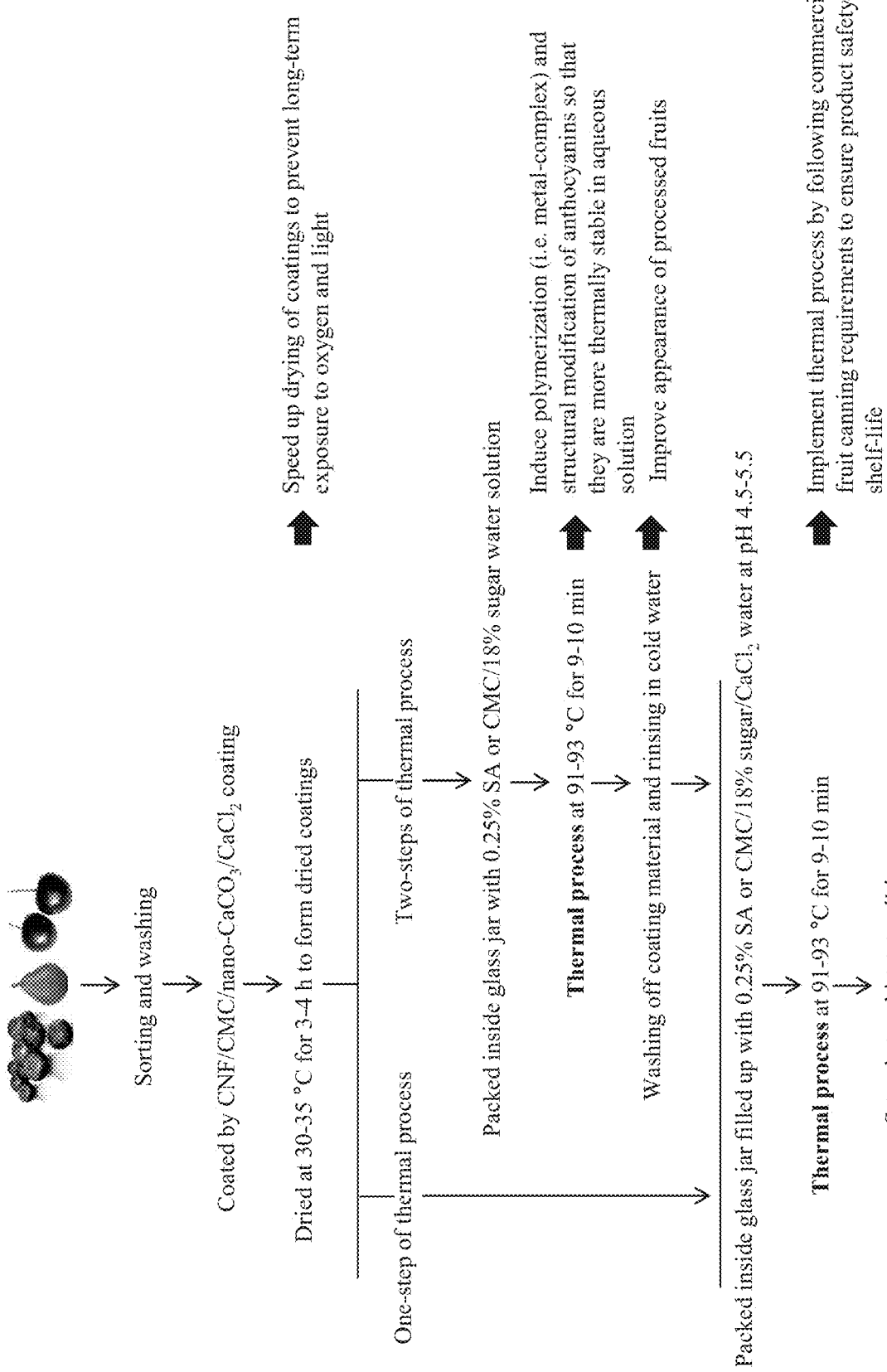
FIGS. 2A and 2B are schematic diagrams illustrating various embodiments of the thermal processing method steps disclosed herein.
Figure 2B:
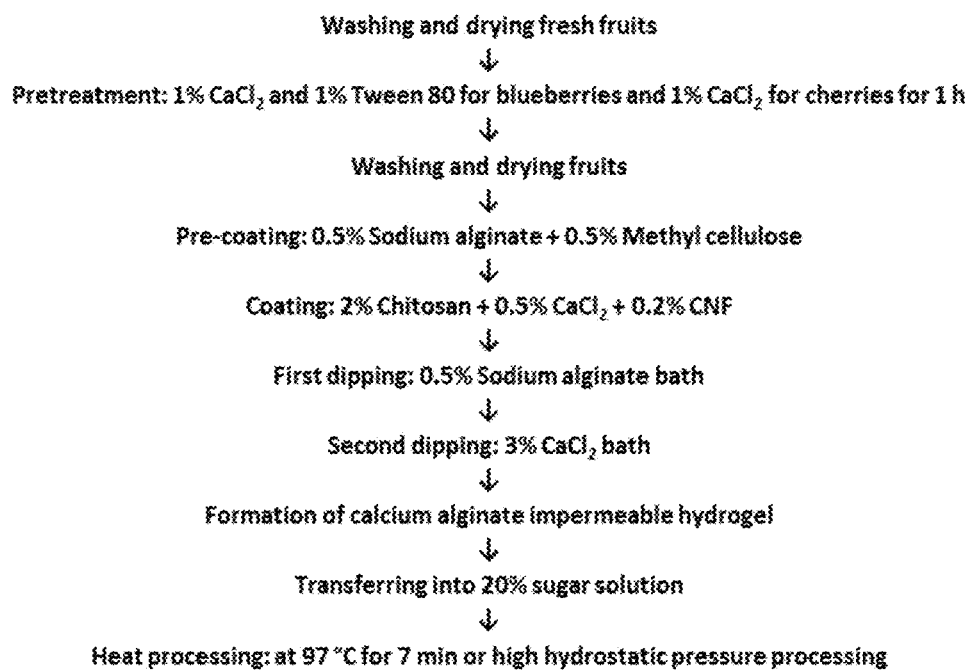

The disclosed compositions can be used in thermal processing of products disclosed herein. Thermal processing typically involves at least one thermal processing step that comprises exposing a product coated with a film made from the compositions disclosed herein to heat. An exemplary schematic diagram of thermal processing, as disclosed herein, is illustrated in FIG. 2A. As illustrated in FIG. 2A, products can be sorted and washed and coated with a coating composition embodiment disclosed herein. The products are then dried to form a film from the composition and subsequently exposed to a one-step embodiment (e.g., a single thermal processing step where pH is controlled) of the thermal processing methods disclosed herein or a two-step embodiment (e.g., a first thermal processing step where pH is not controlled, and a second subsequent thermal processing step where pH is controlled) of the thermal processing method. FIG. 2A further illustrates that certain embodiments of the thermal processing method disclosed herein can include a washing step to remove the film and improve the appearance of processed products. Another exemplary embodiment is illustrated in FIG. 2B. The processing embodiment described by FIG. 2B includes a pretreatment step wherein the plant part is treated with a composition comprising an inorganic salt component, a surfactant, or a combination thereof. The plant part can then be washed and dried. A pre-coating step can be used wherein the plant part is exposed to a composition comprising a crosslinking agent, methyl cellulose, or a combination thereof and then a coating composition as described herein. After the plant part has been coated (or substantially coated) with the coating composition, it can be dipped into one or more additional solutions, such as a solution comprising a crosslinking agent, a solution comprising an inorganic salt component, or a combination thereof. In some embodiments, such as that illustrated in FIG. 2B, the coated plant part can first be dipped in a crosslinking agent solution and then dipped into an inorganic salt solution. The combination of these steps can produce a hydrogel on the plant part (e.g., a calcium alginate hydrogel). The plant part can then be transferred into a processing composition, such as processing composition comprising a sugar. Thermal processing and/or high hydrostatic pressure processing can then be used.

The temperature at which the sample is heated can be modified depending on the type of product used and the type of storage solution (e.g., if a highly acid solution is used to store the fruit, then lower temperatures may be used). In some embodiments, the thermal processes disclosed herein involve using temperatures of at least 80° C. to about 100° C., such as about 90° C. to about 94° C., or about 91° C. to about 93° C. A typical thermal processing step is used after the coating composition has been added to and dried onto the product that will undergo processing. The sample may then be heated in water or it may be combined with a processing composition as disclosed herein. Coated samples (with or without) processing compositions can then be heated at an appropriate temperature for a sufficient time period. In some embodiments, the sample is heated in the processing solution for at least 5 minutes to about 30 minutes, such as about 10 minutes to about 25 minutes, about 10 minutes to about 20 minutes, or about 10 minutes to about 15 minutes.

Typically, thermal processing is completed by utilizing at least one thermal processing step that implements commercial canning requirements to ensure product safety. For example, the sample can be heated and simultaneously maintained at a certain pH in a pH-modified processing solution. In such embodiments, the processing solution typically is maintained at a pH of at least 4, and may be as high as about 5.5. The pH in some examples can be about 4.5. The pH of the pH-modified processing solution can be maintained by including suitable concentrations of formic acid, citric acid, lactic acid, or any combination thereof. The pH may be adjusted to accommodate the particular processing temperature used. For example, samples maintained at a pH greater than about 4.6 should be heated at temperatures of at least about 90° C. to avoid contamination (e.g., to prevent causing botulism). Samples that are maintained at lower pH values (e.g., below 4.6) may be heated at temperatures lower than about 90° C., and in some embodiments may not even require heating. In some embodiments, this particular thermal processing step can be the only thermal processing step. In other embodiments, this particular thermal processing step may be combined with one, two, three, or more, prior thermal processing steps wherein the pH of the solution need not be maintained or controlled.

In some embodiments, the film coating the product may be removed at different stages of thermal processing. The films can be removed by rinsing with water, agitation, exposure to high velocity rinsing sprays, using chemical conditions (e.g., exposure to acidic or basic solutions, enzymatic treatments, or exposure to other reactive species). In some embodiments, the film can be removed after a first thermal process step described above (with or without pH control) to improve the appearance of the processed products. The product can then undergo a suitable final thermal processing step. In other embodiments, the film is removed after a first thermal processing step, at which point the product is exposed to a second, subsequent thermal processing step. The product may then be washed and exposed to a final thermal processing step. In some embodiments, the film need not be removed and can be included in the final processed product. Removing the film does not require removing all of the film or components thereof. Residual amounts of the film or its various components may remain on the product; however, these residual amounts do not affect the appearance, taste, or quality of the product.

Alternatives to thermal processing also may be used for preserving products like fruits and/or vegetables. Suitable alternative processing methods include high hydrostatic pressure (HHP) processing methods. In these embodiments, products (e.g., fruits and vegetables) are processed at a suitable pressure for a suitable time (typically at ambient temperature), such as at a pressure and for a time that is capable of inactivating harmful microorganisms and enzymes that may lead to quality deterioration and food safety concern of products during storage. Exemplary pressures include pressures ranging from about 400 to about 800 MPa, such as from about 400 to about 500 MPa using a high pressure unit. The time may range from greater than about 5 minutes to about 20 minutes, such as about 10 minutes to about 15 min.

In some embodiments using HHP processing, products are first coated using the coating compositions disclosed herein and then packed in a suitable container, such as a polyethylene terephthalate (PET) retort bowl or other container that can subjected to HHP treatment, such as a polymer cup, glass jar, metal can, or flexible pouch. The products can be packaged in the container with any one of the processing compositions disclosed herein. In one embodiment, the samples can be sealed and subjected to a first thermal processing step as disclosed herein, followed by an HHP processing step. In another embodiment, the samples are first subjected to a first thermal processing step using a first processing composition prior to being packaged in the container for HHP processing. The samples may then be separated from the first processing composition used in the first thermal processing step and placed into a fresh processing composition, which can be the same or different from the first processing composition. This embodiment may further comprise removing the films or coatings formed on the products after the first thermal processing step. The samples are then processed using an HHP processing step. Any of these embodiments can be modified to include a second thermal processing step after the samples have undergone HHP treatment. The products can be removed from the packaging before or after this second thermal processing step, and any residual film or coating present on the products may also be removed before or after this second thermal processing step.

Other disclosed embodiments concern storing foodstuffs, fruits, and/or vegetables coated with a film formed from the disclosed compositions at low temperatures for preservation. These products can be frozen or merely stored in cold temperatures (e.g., such as temperatures of a cold room, refrigerator, and the like) for long periods of time. Such embodiments need not implement a thermal processing step to obtain the desired film properties.

In some embodiments, the processing methods disclosed herein can be used in combination with infusion processing. Infusion processing (e.g., infused dehydration and vacuum impregnation) is a conventional technique used to provide semi-dehydrated fruit with soft texture and desirable taste. In particular disclosed embodiments, infusion processing can comprise exposing a fruit or vegetable (such as a fruit or vegetable treated according to any of the embodiments disclosed herein) to a 65-80 Brix of infusion solution wherein a fruit/solution ratio of 1:3 is used, the temperature of the infusion solution is maintained at 30-50° C. and the fruit or vegetable is infused for about 4 hours to 24 hours. In some embodiments, a moisture content of infused fruit of 30-40% is achieved. In some embodiments, a vacuum can be applied.

VIII. Products

Myriad objects can be contacted with embodiments of the composition disclosed herein, thereby providing improved products. In some embodiments, the object is a plant or plant part. Exemplary objects include fruits, such as those disclosed in Table 1.

Generally, the objects comprising a coating or film produced by the composition include components as described herein, but upon drying the relative concentration of the components is altered due, for instance, to the loss of water from the composition. Therefore, the film or coating formed will generally contain less water and higher concentrations/ratios of the (non-evaporative) compositional components. The amounts provided below in Table 2 correspond to representative amounts of components present in the dried film, and are expressed as wt/wt %.

TABLE 2

Representative Film Component Concentrations

| Component | Exemplary Range 1 | Exemplary Range 2 | Exemplary Range 3 | Exemplary Range 4 |
|---|---|---|---|---|
| Cellulose nanomaterial | 10%-95% | 50%-95% | 60%-95% | 70%-95% |
| Inorganic salt component | 0-50% | 1%-40% | 1%-20% | 1%-10% |
| Stabilizing agent | 0-30% | 0.5%-20% | 1%-15% | 1%-10% |
| Additive agent | 0-90% | 1%-70% | 1%-50% | 10%-40% |
| Agricultural agent | 0-50% | 0.5%-30% | 1%-25% | 1%-15% |

The following examples are provided to illustrate certain particular features and/or embodiments. These examples should not be construed to limit the claimed invention to the particular features or embodiments described.

EXAMPLES

Example 1

This example describes making compositions comprising cellulose nanofibrils (CNF) comprising both crystalline regions and amorphous regions, with dimensions of three to several hundred nm in width, and having an aspect ratio greater than 50, reminiscent of elementary fibrils in plant cell walls.

The CNFs are formed by fibrillation methods with or without chemical pretreatment in the mechanical refining of cellulose such as, but not limited to wood fiber or non-wood plant fiber, and may or may not contain residual hemicelluloses. In some examples, the CNF was obtained from a commercial source.

Nanoparticles, nano dots or nano powder calcium carbonate (NCC) are cubic, high surface area particles. Nano-sized calcium carbonate has a particle size of about 60 nm to about 100 nm when examined by Scanning Electron Microscopy (SEM). Existing applications for NCC has focused on its use in drug delivery by loading them with hydrophilic protein-based drugs and for their potential imaging, biomedical and bioscience properties and for use in coatings, plastics, nanowire, and in alloy and catalyst applications. In some examples, the NCC or MCC was obtained from a commercial source. The present application includes the terms "nano calcium carbonate" and "nanopowder calcium carbonate" and "nanoscale mineral compound." As of Mar. 14, 2013, the inventors understood that the commercial calcium carbonate used in Examples 1-15 was nano-sized calcium carbonate having a particle size of ~60-100 nm. This belief was based on information provided by the source of the commercial calcium carbonate. The inventors subsequently determined using scanning electron microscopy (SEM) that the calcium carbonate used in these Examples was micro-sized. Thus, in Provisional Application Nos. 61/784,060 and 61/895,929, "nano calcium carbonate" and "NCC" were used; this term has been updated herein to be micro calcium carbonate (or "MCC").

Table 4, below, provides various different formulations of CNF and MCC compositions. For preparing the compositions, the given amount of CNF, MCC, and/or $CaCl_2$ was dissolved in deionized water and then homogenized using a homogenizer for reaching complete dissolution of the composition components under ambient conditions.

TABLE 4

Formulation of CNF and MCC compositions.

| Code | Formulation † |
|---|---|
| NF316 | 0.188% CNF |
| NF316C | 0.188% CNF with 0.01% MCC |
| NF38 | 0.375% CNF |
| NF38C | 0.375% CNF with 0.01% MCC |
| NF34 | 0.750% CNF |
| NF34C | 0.750% CNF with 0.01% MCC |
| NF 1 | 1% CNF |
| NF 1C | 1% CNF with 0.01% MCC |
| NF 1S | 1% CNF by spray coating |
| NF 1CS | 1% CNF with 0.01% MCC by spray coating |
| NF1.5CC | 1.5% CNF with 1.0% $CaCl_2$ |
| CMC | Carboxymethyl cellulose |

† All formulations were prepared by dispersing the components in deionized water.

Example 2

This example describes the prevention of pigment/nutrient leaching from blueberry fruits using embodiments of the composition disclosed herein. All embodiments, with and without the addition of nano calcium carbonate or micro calcium carbonate, virtually eliminated the leakage of anthocyanin pigments (compared with a control) from blueberries during thermal processing analogous to that seen in the industry.

Blueberries were coated with different CNF, MCC, and $CaCl_2$ solutions as described in Table 4 by either dipping the fruit in a solution of the composition (the blueberries were dipped in a solution of the composition for 1 minute and then dried at room temperature) or spray-coating (a solution of the composition was sprayed on the surface of blueberries under 30 psi pressure and then dried at room temperature).

The uncoated and coated blueberries (or cherries, in some embodiments) were packed in glass jars filled with distilled water, put inside a water bath with controlled temperature, and then subjected to one of the following thermal process conditions: 1) heating at 80° C. for 20 min; 2) heating at 65° C. for 15 min; and 3) a sequence of conditions (1) and (2). To determine whether the disclosed compositions could prevent leaching of anthocyanins and other biological pigments, pigment and anthocyanin content in the packing water after thermal processing of the blueberries was determined. The color of packing water was measured using a UV spectrophotometer at 525 nm (Shimadzu, Japan). A pH differential spectrophotometric method by Giusti and Wrolstad (2001) was used to measure the monomeric anthocyanin content of the packing water (Giusti & Wrolstad, "Characterization and Measurement of Anthocyanins by Uv-Visible Spectroscopy," In Current Protocols in Food Analytical Chemistry, edited by Ronald E. Wrolstad, F1.2.1-F1.2.13. New Jersey: John Wiley & Sons, Inc., 2001). After the first thermal process (80° C. for 20 minutes), the film produced by the composition was removed from the surface of the fruits by washing with tap water. The uncoated fruit was then subjected to the second thermal treatment (65° C. for 15 minutes) to examine whether the protective effect would remain.

Figure 3A:
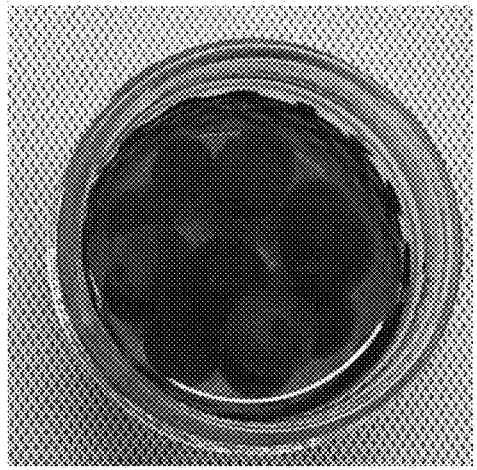
FIGS. 3A-3E are photographic images of coated and uncoated blueberries after performing two thermal processing steps, film removal, and storage in packing water (one day under ambient conditions).
Figure 3B:
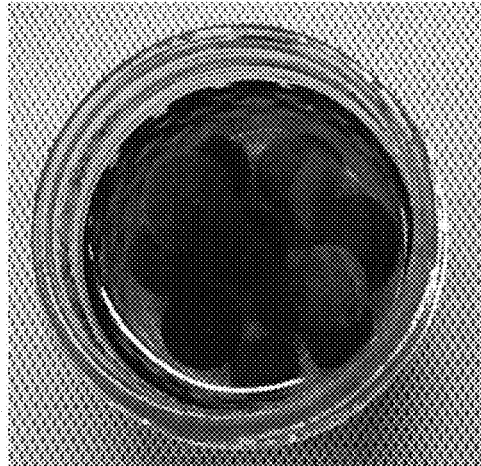
Figure 3C:
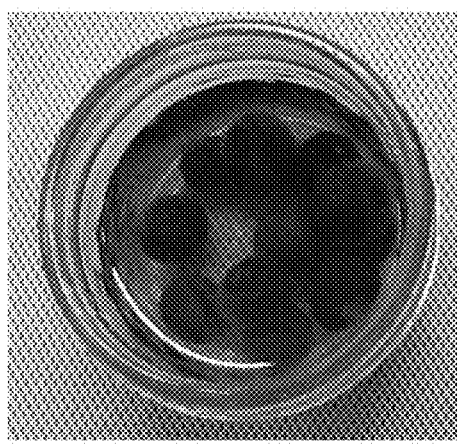
Figure 3D:
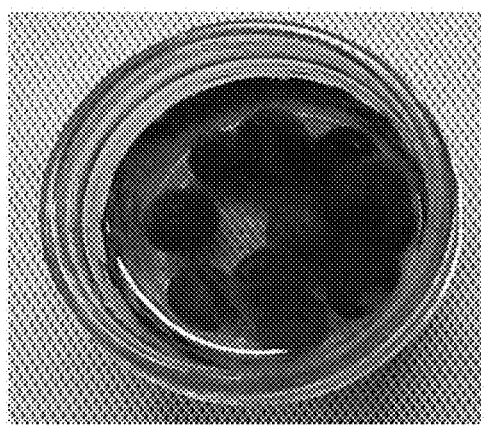
Figure 3E:
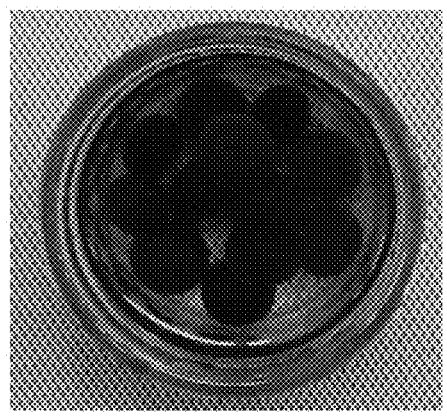
Figure 4A:
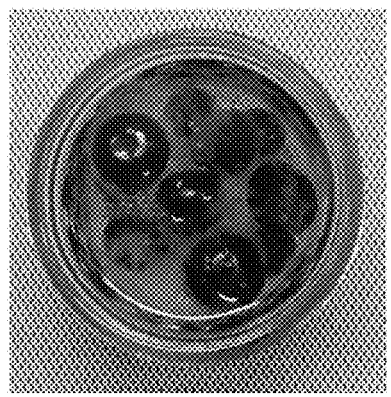
FIGS. 4A-4C are photographic images of blueberries coated with different composition embodiments disclosed herein after different thermal processes.
Figure 4B:
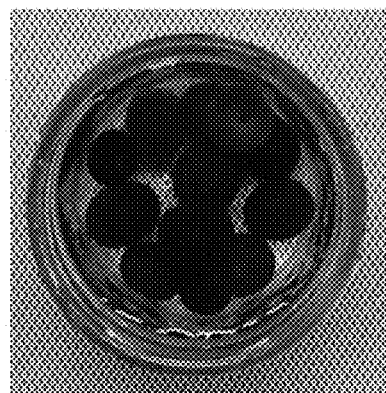
Figure 4C:
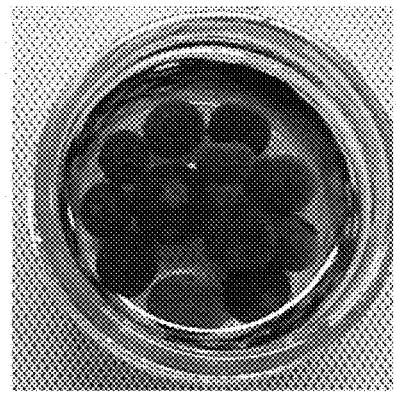
Figure 5:
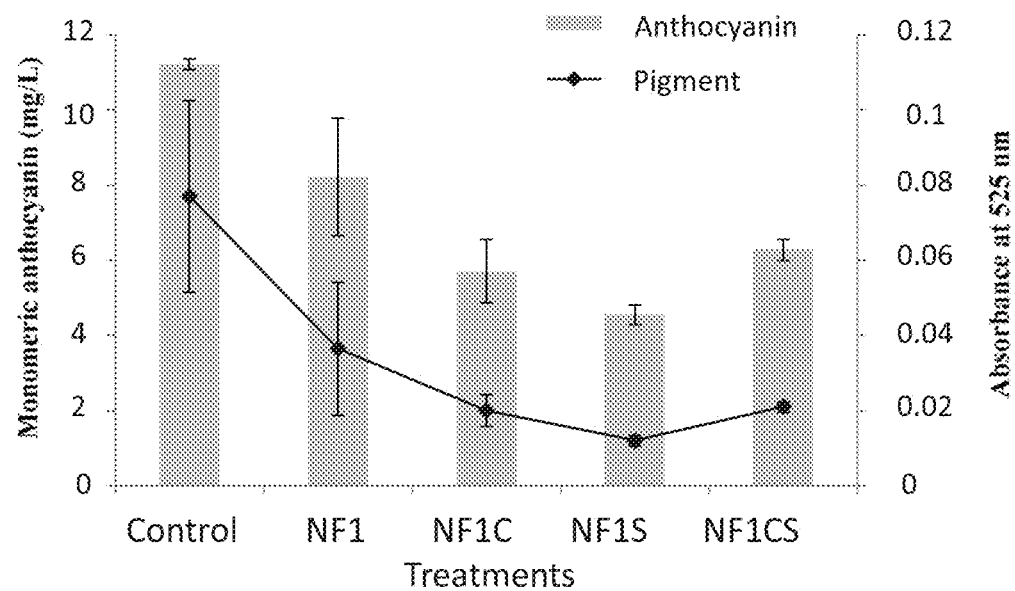
FIG. 5 is a graph of monomeric anthocyanin concentration (mg/L) and pigment absorbance (measured at 525 nm) leached from coated or uncoated blueberries after processing (80° C. for 20 minutes) and cooling (20 minutes).
Figure 6:
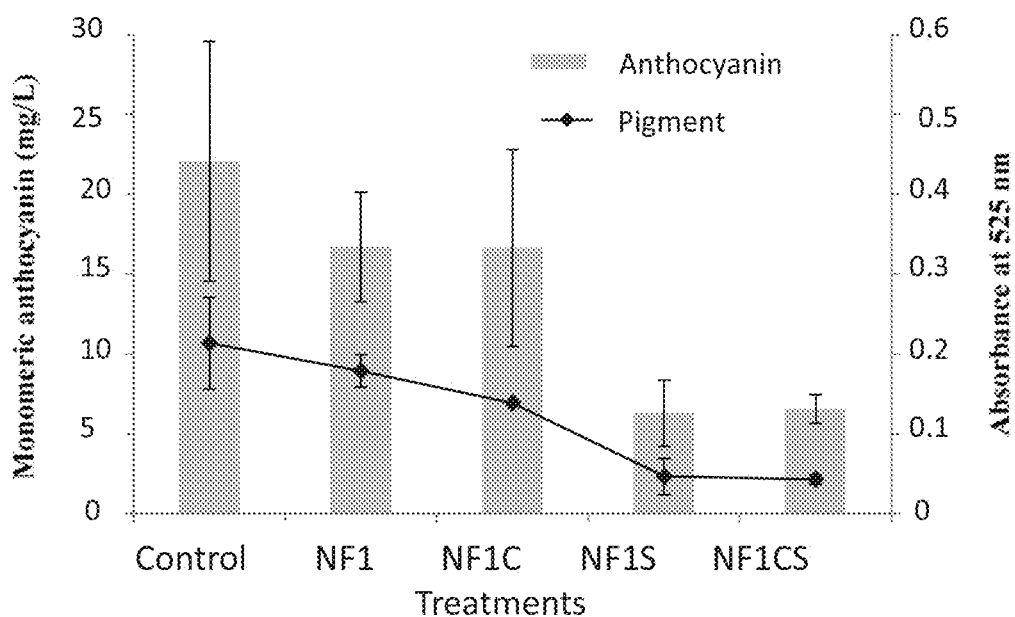
FIG. 6 is a graph of monomeric anthocyanin concentration (mg/L) and pigment absorbance (measured at 525 nm) leached from processed blueberries (first at 80° C. for 20 minutes and then at 65° C. for 15 minutes) after storage (one day, under ambient conditions).
Figure 7A:
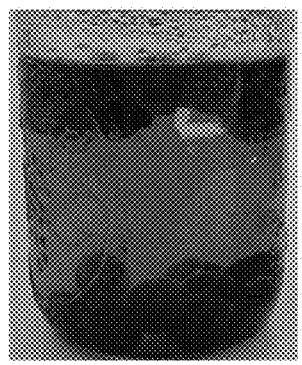
FIGS. 7A-7F are photographic images of blueberries after being subjected to thermal processing at 80° C. for 20 minutes and cooling at room temperature for 4 hours.
Figure 7B:
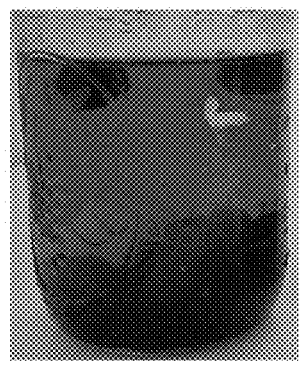
Figure 7C:
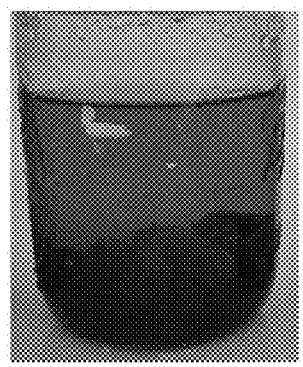
Figure 7D:
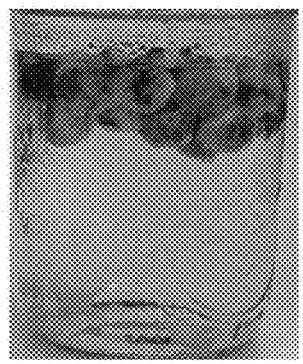
Figure 7E:
Figure 7F:
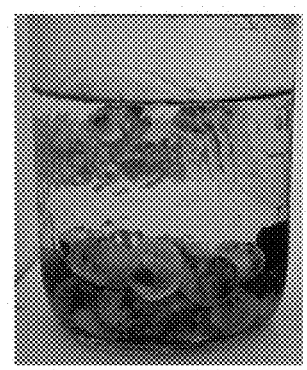
Figure 8:
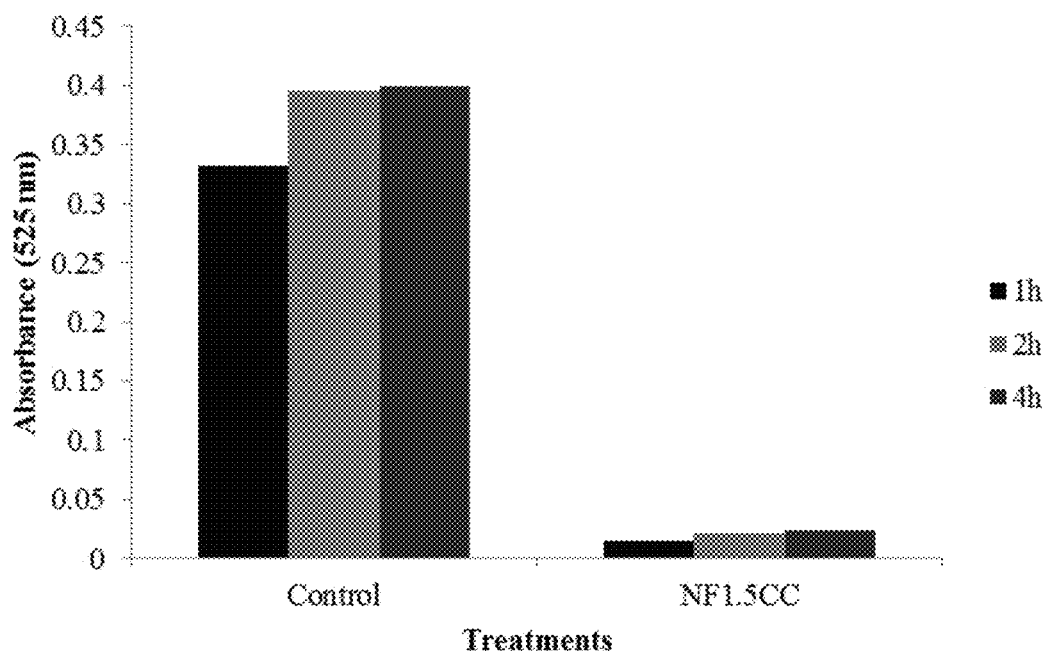
FIG. 8 is a bar graph of absorbance (measured at 525 nm) measured from the samples illustrated in FIGS. 7A-7F. The bar graph illustrates changes in the color of the filling solution after the blueberries were subjected to thermal processing at 80° C. for 20 minutes, followed by cooling at room temperature for 4 hours; the results after 1 hour, 2 hours, and 4 hours are presented left to right. "NF1.5CC" indicates the samples coated with a composition comprising 1.5% cellulose nanofibrils and 1.0% $CaCl_2$.

FIGS. 3A-3E illustrate that the leaching of anthocyanins and other biological pigments was eliminated or greatly reduced by the CNF/MCC compositions (FIGS. 3B-3E), compared with uncoated blueberries (FIG. 3A). As can be seen by these examples, the color of the water surrounding the blueberries in FIGS. 3B, 3C, particularly FIG. 3E was less red than the water surrounding the blueberries in FIG. 3A. FIGS. 4A-4C illustrate that even after the film of the composition was removed after the first thermal treatment (FIG. 4B), pigment leaching was negligible after the second stage of thermal treatment shown in FIG. 4C as the color of the water surrounding the blueberries illustrated in FIG. 4B was free of color, whereas the water surrounding the blueberries illustrated in FIG. 4C was tinted red. Further, the coating formulations containing MCC showed lower levels of leaching compared to those without as shown in FIG. 5, which illustrates the levels of monomeric anthocyanin and pigments leached from coated or uncoated blueberries after processing (80° C. for 20 minutes) and cooling (20 minutes) and FIG. 6, which illustrates the levels of monomeric anthocyanin and pigments leached from coated or uncoated blueberries after one day of storage.

Figure 9A:
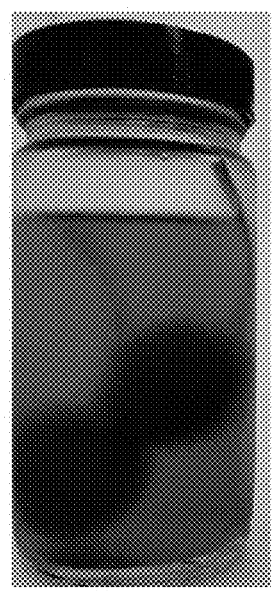
FIGS. 9A and 9B are photographic images illustrating how embodiments of the disclosed composition can reduce or eliminate leaching of anthocyanin pigments from cherries. The photographs were taken after thermal processing at 80° C. for 20 minutes, followed by storage in packing water (2 hours).
Figure 9B:
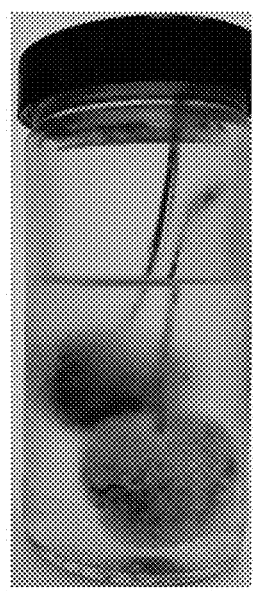

The method by which the composition was added to the fruit also had a marked effect. In some embodiments wherein the film was formed by spray-coating the composition onto the fruit, the resulting film performed better than some embodiments wherein the film was formed by dipping the fruit in the composition. In some embodiments, the spray-coated samples showed significantly lower contents of pigments and anthocyanin in packing solutions. FIGS. 7A-7F and FIG. 8 illustrate that the leaching of anthocyanin pigments from blueberries was significantly reduced by using CNF/$CaCl_2$ compositions (FIGS. 7D-7F, and indicated as "NF1.5CC" in FIG. 8) after thermal process (80° C. for 20 minutes), compared to uncoated blueberries (FIGS. 7A-7C, and indicated as "Control" in FIG. 8). As illustrated in these examples, the water surrounding the coated blueberries illustrated in FIGS. 7D-7F was fairly clear with little color, whereas the uncoated blueberries illustrated in FIGS. 7A-7C leached pigments into the surrounding water turning it bright red. Similar results for embodiments using cherries were obtained. For example, FIGS. 9A and 9B illustrate that leaching of anthocyanin pigments was eliminated by the CNF/$CaCl_2$ compositions disclosed herein (FIG. 9B), as compared with uncoated cherries (FIG. 9A). The water surrounding the cherries illustrated in FIG. 9A turned bright red; whereas the water surrounding the cherries illustrated in FIG. 9B remained colorless.

Example 3

This example describes using embodiments of the composition disclosed herein to coat apples.

Apples were peeled, cored and cut into slices of uniform thickness. The resultant slices were then dipped in CNF-containing compositions or left uncoated prior to freezing in a forced air freezer (−20° C.) for 24 hours. Afterwards, the samples were removed from the freezer and allowed to thaw at ambient temperature (18-23° C.) for about 6 hours. Measurements were taken of both the change in mass during freezing (condensation) and the total amount of liquid exuded from the thawing apples (syneresis and evaporation).

Figure 10A:
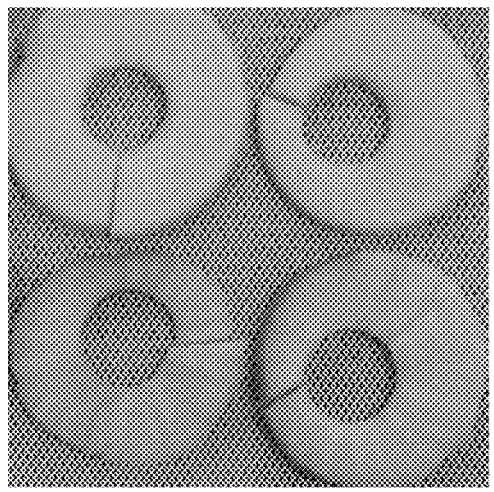
FIGS. 10A and 10B are photographic images illustrating the appearance of uncoated and coated apple rings after freezing processes.
Figure 10B:
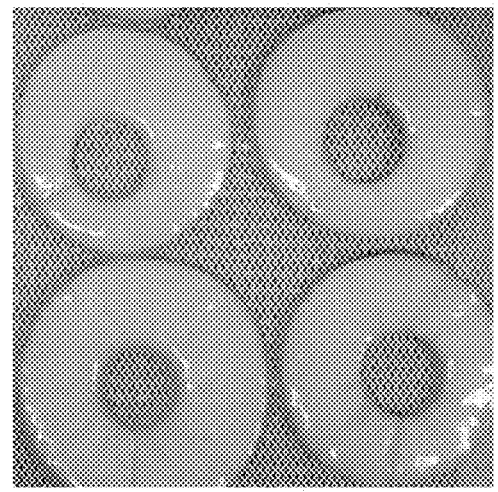

Overall, the total weight loss (%) after thawing of coated apple slices was lower than that of uncoated apples, as indicated in Table 5. Additionally, it was found that the condensation which formed on the thawing apples due to ambient humidity in the thawing room was higher on the uncoated slices (FIG. 10A) compared to the coated ones apples (FIG. 10B). Uncoated apples appear more desiccated due to higher levels of moisture loss compared with the samples comprising a film made from a composition comprising 1% CNF and 0.01% MCC.

TABLE 5

Comparison of condensation (%) and weight loss (%) between uncoated and CNF coated fresh-cut apples.

| Treatments | Parameters | |
| --- | --- | --- |
| | Condensation (%) | Weight loss (%) |
| Uncoated apples | 8.87 ± 1.19 | 21.09 ± 3.54 |
| NF1 | 6.48 ± 0.51 | 17.33 ± 2.38 |
| NF1C0.01 | 6.28 ± 0.53 | 17.94 ± 2.54 |

Example 4

This example concerns methods to prepare CNF-containing flexible, water-resistant films that are useful when applied as an edible food packaging wrap for a wide variety of food products.

Compositions comprising CNF (0.188% and 0.375%) were prepared, casted in Teflon-coated glass plate, and dried at room temperature for 72-96 hours (Chen and Zhao, 2012). See, Chen, J. and Zhao, Y., "Effect of molecular weight, acid, and plasticizer on the physicochemical and antibacterial properties of beta-chitosan based films," J. Food Sci. 77(5), E127-136. A composition comprising 1% carboxymethyl cellulose also was prepared to make films as a comparison with the CNF-containing films. Prepared films were conditioned for 48 hours in a 25° C. and 50% relative humidity (RH) environmental chamber. Conditioned film samples were tested for moisture content, water solubility, and water-vapor transmission rate (WVTR), as well as tensile strength and elongation. The moisture content of the films was determined by the percentage weight loss of film samples after drying in a forced-air oven at 100° C. for 24 hours. Water solubility was determined by the percentage weight loss of films samples after suspension in water for 24 hours and dried at 40° C. for 24 hours, whereas the control carboxymethyl cellulose film was only tested for 2 hours due to its hydrophobicity. WVTR was measured by the cup method at 25° C. and 100/50% RH gradient, following ASTM Standard Method E96-87 (ASTM, 2000). Tensile strength (TS) and percent elongation at the break (EL) of the films were each determined according to ASTM D882 (ASTM, 2001) and analyzed using a texture analyzer (TA.XT2i, Texture Technologies Corp., USA) by following the same procedures as Park and Zhao (*J. Agric. and Food Chemistry* 52(7): 1933-1939, 2004.

Figure 11:
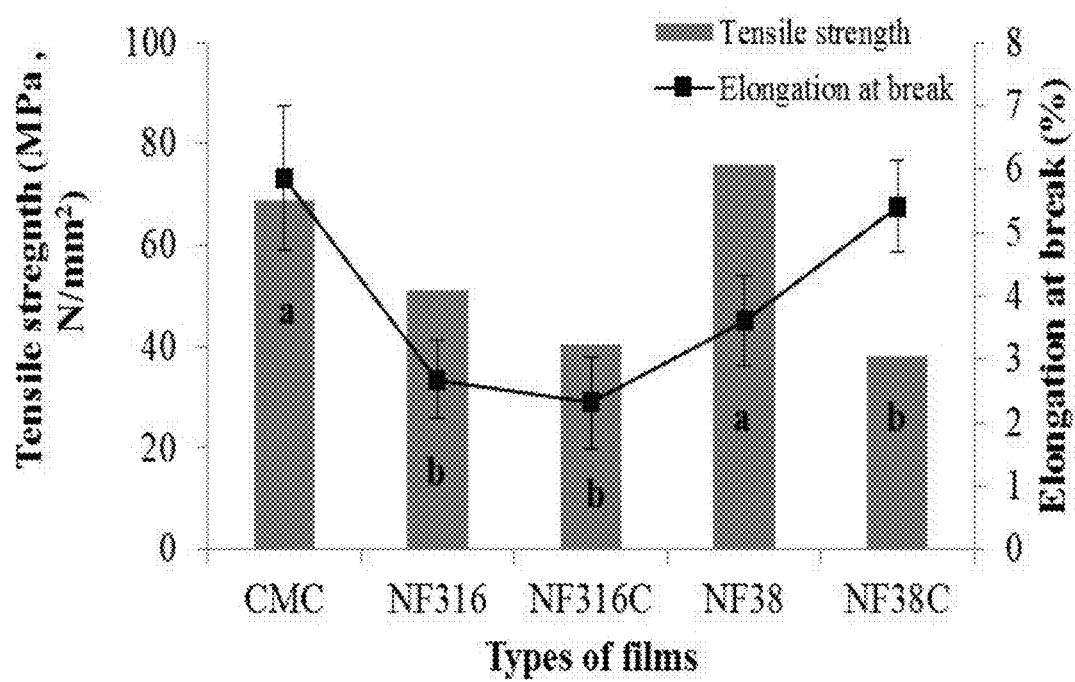
FIG. 11 is a graph of tensile strength (MPa, $N/mm^2$) and elongation at break (%) illustrating results obtained from analyzing films of carboxymethyl cellulose and films made using various embodiments of the disclosed composition. The different letters provided on the bars in FIG. 11 represent significant difference (P<0.05) of tensile strength; where the same letter is indicated, no significant difference was observed.

Overall, the physicochemical properties of the CNF-containing films were significantly better than the carboxymethyl cellulose control films, indicating the CNF-containing films had a higher level of water-resistance (Table 6). Tensile strength and elongation provided interesting results, with the carboxymethyl cellulose-containing film showing the greatest elongation and the second highest tensile strength, being surpassed slightly by films of formulation NF38, as shown in FIG. 11. These differences are related to the differences in the concentration and resultant film thickness, as the carboxymethyl cellulose solution had more than twice the concentration, and resulted in a much thicker film (0.083 mm) than NF38 (0.019 mm) as shown in Table 6. Microstructure tests showed that combining CNF with MCC significantly improved the homogeneity of the films with MCC being evenly distributed in the film matrix of the samples.

TABLE 6

Moisture contents (MC, %), water solubility (Ws, %), and water vapor transmission rate (WVTR, g mm/d m2) for various types of films.

| Types of film | Measured parameters | | | |
|---|---|---|---|---|
| | MC | Film Thickness | Ws | WVTR |
| CMC* | 15.865 $^a$ | 0.083 | 62.067 $^a$ | 131.840 $^a$ |
| NF316** | 4.206 $^c$ | 0.014 | 0.123 $^b$ | 13.186 $^b$ |
| NF316C*** | 4.266 $^c$ | 0.014 | 0.240 $^b$ | 22.818 $^b$ |
| NF38+ | 6.016 $^b$ | 0.019 | 0.176 $^b$ | 24.948 $^b$ |
| NF38C++ | 5.905 $^b$ | 0.030 | 0.216 $^b$ | 25.391 $^b$ |

*1% carboxymethyl cellulose
**0.188% cellulose nano fibrils
***0.188% cellulose nano fibrils added with 0.01% CaCO3
+0.375% cellulose nano fibrils
++0.375% cellulose nano fibrils added with 0.01% CaCO3
Means preceded by the same letter in the same column within same experiment were not significantly different (P > 0.05).

Example 5

This example describes a method for providing UV sunburn protection within CNF/MCC coatings and films before and after harvest.

Figure 12:
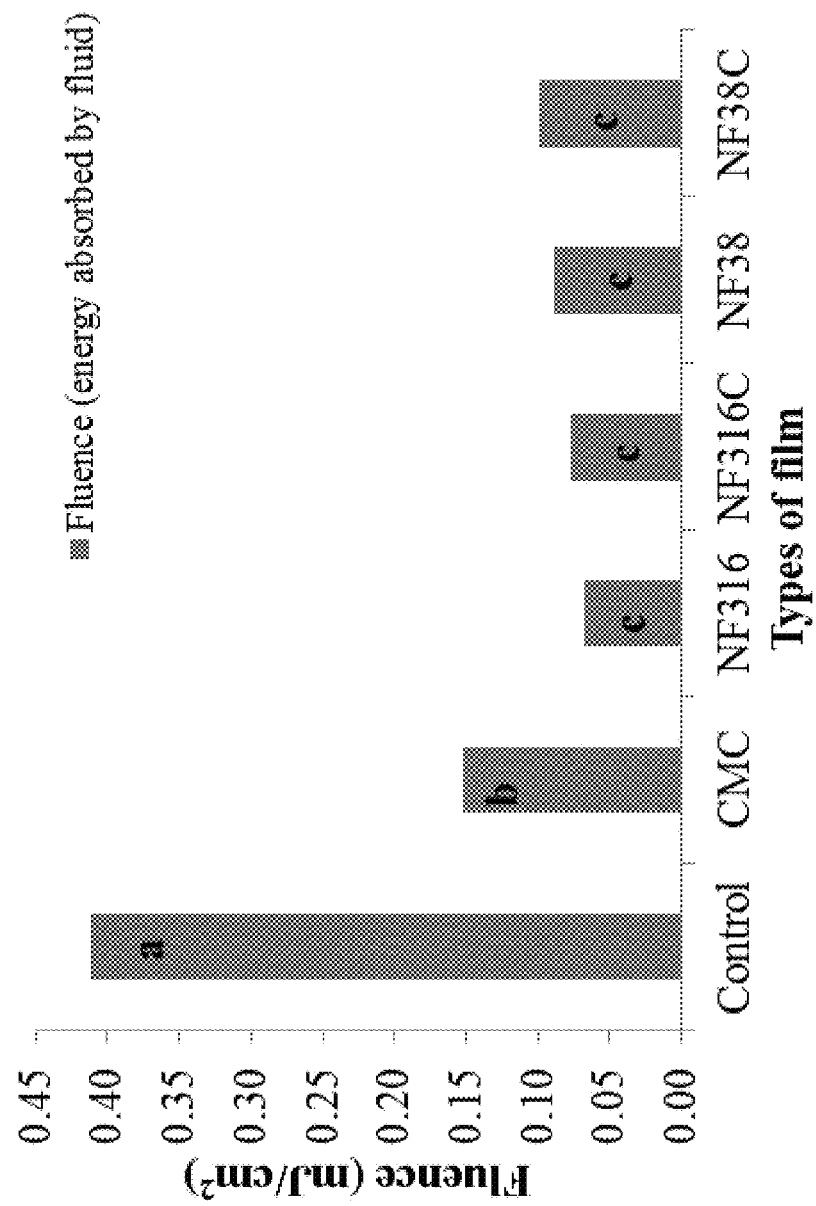
FIG. 12 is a bar graph of fluence (mJ/cm$^2$) measurements obtained upon irradiation of the surface of cylindrical vessels containing 0.6 M KI, 0.1 M KIO$_3$, and 0.01 M Na$_2$B$_4$O$_7$.10H$_2$O (n=2; mean values). Results are provided for vessels having no film coating (control), vessels covered with a carboxymethyl cellulose film, and vessels having film coatings formed using embodiments of the disclosed composition. Different letters on the bar represent significant difference (P<0.05) of UV fluence; where the same letter is indicated, no significant difference was observed

UV protective films with carboxymethyl cellulose and CNF-containing compositions were prepared following the same procedures described above and used to cover the top of cylindrical acrylic vessels containing 10 mL of a buffered liquid dosimetry solution (0.6 M KI, 0.1 M $KIO_3$, and 0.01 M $Na_2B_4O_7.10H_2O$). Fluence measurements ($mJ/cm^2$) were obtained by subjecting the vessels to ultra violet light for a fixed time and then measuring the change in the absorbance of the solution at 352 nm, as illustrated in FIG. 12. Transmittance of visible and UV light was also determined using spectrophotometry at 620 nm and 280 nm. Additionally, whole apples (*Malus domestica*, var. golden delicious) were coated with the compositions using either spraying or dipping methods. After the coatings/films had dried, the coated samples and un-coated samples were exposed to a 10 W UV source for 1.5 hours to induce UV damage. Samples were stored at ambient temperature for 12 days and periodically assayed for color and weight loss (%), and photographed to record changes in appearance.

Figure 13:
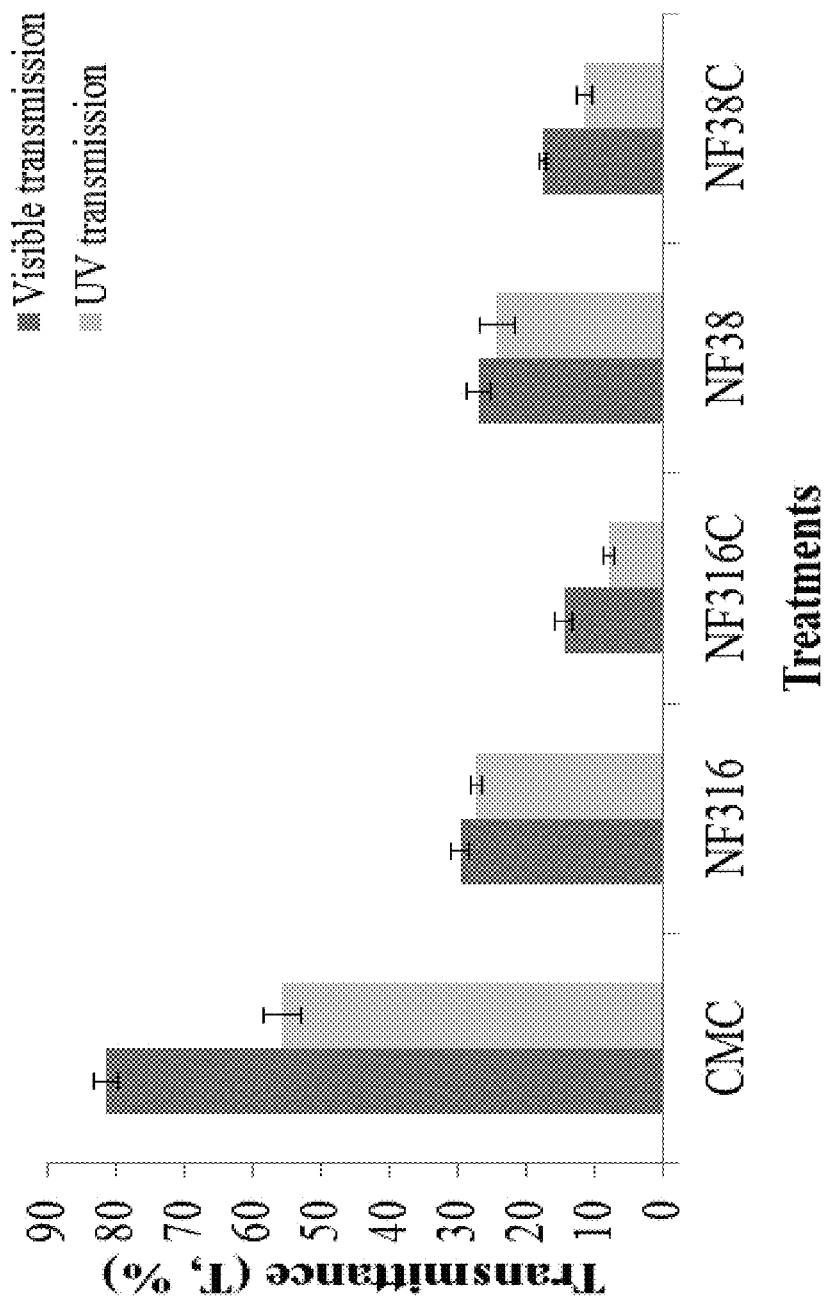
FIG. 13 is a bar graph of transmittance (T, %) of visible (measured at 620 nm) or UV (measured at 280 nm) light transmission passing through various types of films disclosed herein (n=3, mean values).
Figure 14A:
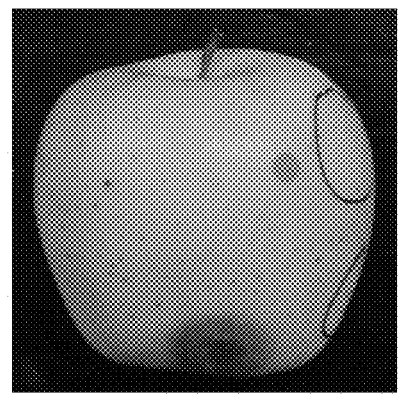
FIGS. 14A-14E are photographic images of treated apples after UV exposure and storage.
Figure 14B:
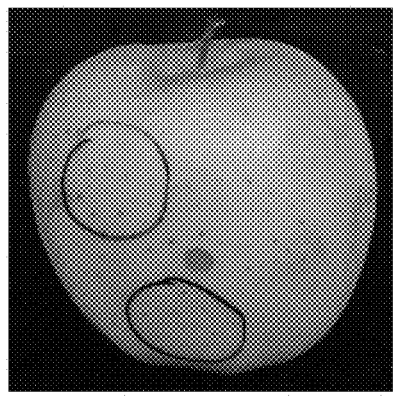
Figure 14C:
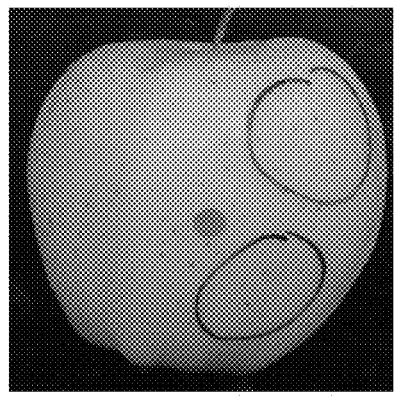
Figure 14D:
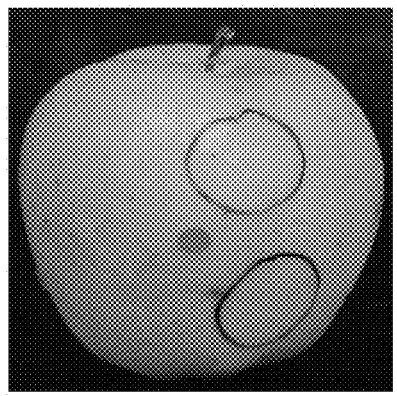
Figure 14E:
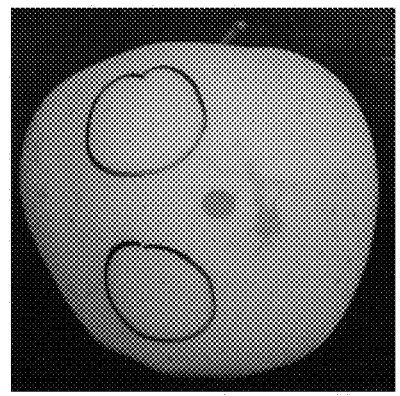

All films showed a significant reduction in the fluence of UV light, with the CNF-containing films outperforming the carboxymethyl cellulose film as shown in FIG. 12. The transmittance (%) of both visible and UV light were quite high for carboxymethyl cellulose films (81.4% and 55.7%, respectively), compared to the transmittance through the CNF-based films, which ranged from 14.4% to 29.5% for visible light and 7.9% to 27.3% for UV as shown in FIG. 13. The addition of MCC to a given formulation provided marked decreases in transmittance (%) of visible and UV light, reducing them by as much as a third or more. Treated apples, shown in FIGS. 14A-14E, had no significant difference in color before and after coating, but after UV exposure and storage significant increases were observed in the color intensity (Chroma) between the uncoated "control" apples (FIG. 14A) and the apples coated with all but one formulation (NF1C) described in Table 7 (FIGS. 14B-14E). In all but one case (NF1C), no change in weight loss (%) was found. This difference likely was due to the relatively short storage time and the great degree of variation within sample groups.

TABLE 7

Comparison of ΔL, ΔE, Δhue, Δchroma, and weight loss (%) between uncoated and coated whole apples for 12 days.†

| | ΔL | Δhue | Δchroma | ΔE | Weight loss (%) |
|---|---|---|---|---|---|
| Control | −3.067 | 0.249 | 10.399 | 14.83 | 5.67 |
| NF1* | −3.133 | −0.635 | 6.519 (*) | 11.58 (*) | 5.16 |
| NF1C** | −1.767 (*) | 1.293 | 6.372 (*) | 11.37 | 4.35 (*) |
| NF1S+ | −2.867 | −3.630 | 5.410 (*) | 12.22 | 4.92 |
| NF1CS++ | −3.100 | 0.568 | 6.700 (*) | 11.68 | 5.11 |

†Mean values (n = 6), values followed by an asterisks (*) denote significant difference from the control value, as determined by t-testing (α = 0.05)
*1% cellulose nano fibrils
**1% cellulose nano fibrils added with 0.01% CaCO3
+1% cellulose nano fibrils by spray coating
++1% cellulose nano fibrils added with 0.01% CaCO3 by spray coating

Example 6

Figure 15A:
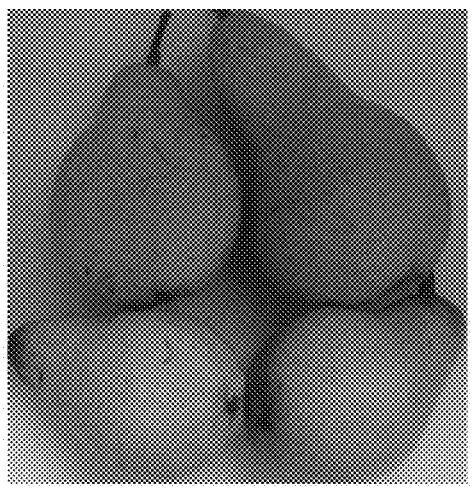
FIGS. 15A-15D are photographic images of uncoated pears after being stored under ambient conditions for 10 days (FIG. 15A) and 25 days (FIG. 15C); pears coated with a composition comprising 1.5% cellulose nanofibrils and 0.1% CaCl$_2$ stored in the same ambient conditions for 10 days (FIG. 15B) and 25 days (FIG. 15D) also are illustrated.
Figure 15B:
Figure 15C:
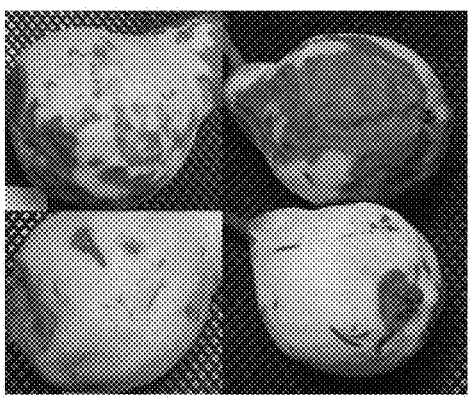
Figure 15D:
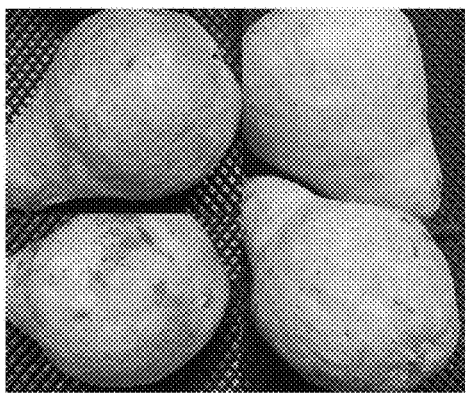

The ability of the disclosed compositions, and films formed using the disclosed compositions, to prevent post-harvest biotic and/or abiotic stresses and thereby improve the appearance of fruits was tested with other fresh fruits, such as pears and apples. FIGS. 15A-15D illustrate results obtained from embodiments where a set of uncoated pears (after 10 days) is illustrated in FIG. 15A, which illustrates these pears as having little to no discoloration and/or wilting. The same set of pears is illustrated in FIG. 15C, which illustrates the pears after being stored for 25 days under ambient conditions—these pears are significantly discolored (with large brown spots/patches) and wilted. Pears comprising a coating of by 1.5% CNF with 0.1% $CaCl_2$ are illustrated in FIG. 15B. These pears exhibited little to no discoloration and/or wilting (FIG. 15D). After 25 days of storage under ambient conditions, the coated pears exhibited little to no discoloration in the form of brown spots or patches. They also did not wilt or shrink in size, as did the pears illustrated in FIG. 15C.

Figure 16A:
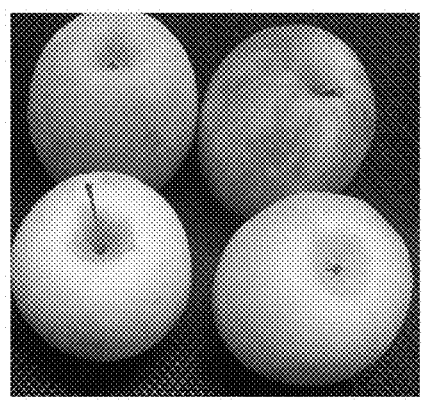
FIGS. 16A and 16B are photographic images of uncoated apples that were stored for 25 days under ambient conditions (FIG. 16A) and apples coated with a composition comprising 1.5% cellulose nanofibrils and 0.1% CaCl$_2$ that also were stored for 25 days under ambient conditions (FIG. 16B).
Figure 16B:
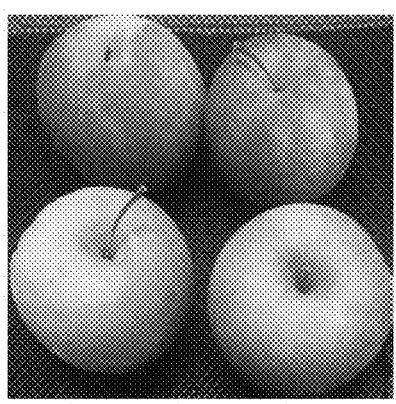

An additional embodiment establishing that the disclosed compositions are capable of preventing or mitigating post-harvest biotic and/or abiotic stresses was conducted using apples. The results of this embodiment are illustrated in FIGS. 16A and 16B. Uncoated apples after being stored for 25 days under ambient conditions are significantly discolored (from red to yellow) by oxidative degradation of color pigments and wilted due to weight loss (FIG. 16A). Apples comprising a coating of by 1.5% CNF with 0.1% $CaCl_2$ exhibited little to no discoloration and/or wilting (FIG. 16B).

Example 7

In this example, methods for using aqueous suspension/slurries of fibrous or crystalline nano-cellulose that are capable of forming clear, durable and water-resistant coatings to prevent cherry cracking are provided. These coatings can carry other functional substances, such as nano-calcium carbonate to further enhance its water-resistant function. This example illustrates the ability to protect fresh cherries; however, a person of ordinary skill in the art would recognize that the compositions, films, and methods of making/using such compositions and films is not limited to cherries. The disclosed methods can be used with other objects disclosed herein to decrease cracking, such as that associated with the water balance of fruits and/or vegetables, to enhance the marketability. Table 8 shows a list of formulations of CNF/calcium compositions. To prepare the compositions, the given amount of CNF and/or calcium was dissolved in deionized water and then homogenized for complete dissolution of CNF and calcium at ambient conditions.

TABLE 8

Formulation of CNF and calcium coating and film-forming solutions.

| Code | Formulation† |
|---|---|
| NF2 | 2% CNF |
| NF2C2 | 2% CNF with 2% Calcium†† (CNF:Calcium = 50:50) |
| NF1.5C0.01 | 1.5% CNF with 0.01% Calcium (CNF:Calcium = 99.34:0.66) |
| NF1.5C0.05 | 1.5% CNF with 0.05% Calcium (CNF:Calcium = 96.77:3.23) |

TABLE 8-continued

Formulation of CNF and calcium coating and film-forming solutions.

| Code | Formulation† |
|---|---|
| NF1.5C0.1 | 1.5% CNF with 0.1% Calcium(CNF:Calcium = 93.75:6.25) |
| NF1.5C0.17 | 1.5% CNF with 0.17% Calcium (CNF:Calcium = 90:10) |
| NF1.5C0.38 | 1.5% CNF with 0.38% Calcium (CNF:Calcium = 80:20) |
| NF1.5C0.5 | 1.5% CNF with 0.5% Calcium (CNF:Calcium = 75:25) |
| NF1.5C0.64 | 1.5% CNF with 0.64% Calcium (CNF:Calcium = 70:30) |
| NF1.5C1 | 1.5% CNF with 1.0% Calcium (CNF:Calcium = 60:40) |
| NF1.5C1.5 | 1.5% CNF with 1.5% Calcium (CNF:Calcium = 50:50) |

†All formulations were prepared by dispersing the components in deionized water
††Calcium source was obtained from either micro calcium carbonate, nano calcium silicate (wollastonite), or nano-calcium silicate (calcium:silicate = 90%:10%)

Figure 17D:
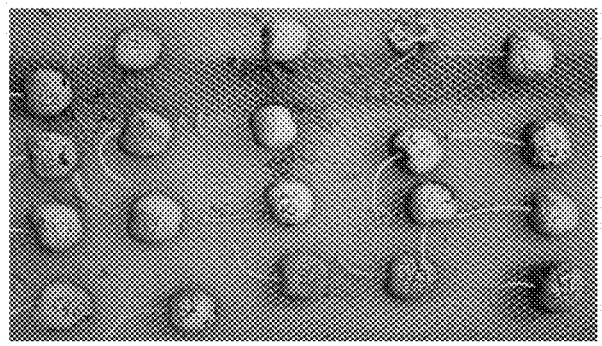
FIGS. 17A-17D are photographic images of uncoated cherries (FIG. 17A); cherries coated with a composition comprising 2% cellulose nanofibrils (FIG. 17B); cherries coated twice with a composition comprising 2% cellulose nanofibrils (FIG. 17C); and cherries coated with a composition comprising 2% cellulose nanofibrils and 2% CaCO$_3$ (FIG. 17D).
Figure 17C:
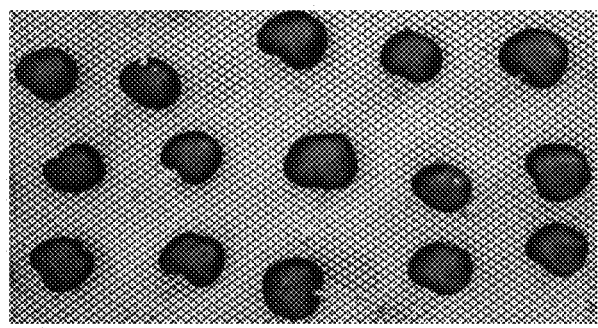
Figure 17B:
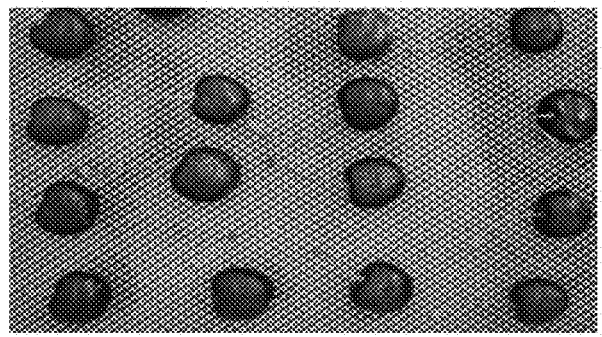
Figure 17A:
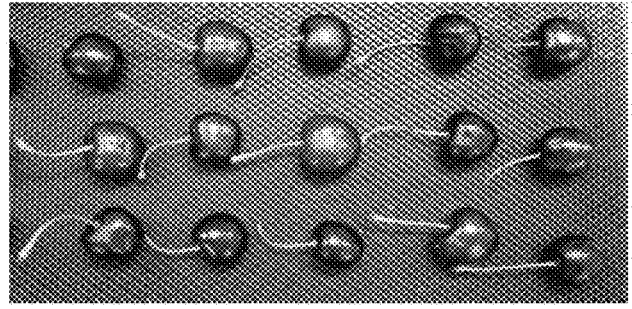

53 stem-on cherries for each treatment (a control, and different CNF coatings) were subjected to water treatment for testing the control and CNF based coatings on cherry cracking. For coating treatment, two coating solutions including 2% CNF and 2% CNF added with 2% $CaCO_3$ were prepared and coated on cherries either once or twice by using a spray-coating method (30 psi), and then dried for 1 hour under air-flow (fan) at room temperature (FIGS. 17A-17D). As shown in FIG. 17D, adding 2% $CaCO_3$ into CNF coating resulted in a formation of blooming/clouding on the surface of cherries, which is due to the large particle size of $CaCO_3$. This issue is resolved by reducing the particle size of $CaCO_3$.

Uncoated cherries (control) and coated cherries with two different coating solutions were soaked in water for 8 h at room temperature. The numbers of non-cracking and cracking cherries were counted, and the cracking ratio was presented based on the total number of cherries (53 ea.).

The weight gain (%) of the cherries was determined as:

Weight gain (%)=(weight of cherries after soaking for 8 hours−initial weight of cherries)/initial weight of cherries*100.

In addition, weight loss (%) of the container containing 200 mL of distilled water was measured as:

Weight loss (%)=(Initial weight of container−weight of container after cherries were soaked for 8 hours)/initial weight of container*100.

Results

As shown in Table 9, the cracking ratio of cherries reduce from almost 70% to 50% in cherries coated with the 2% CNF composition, to 30% in cherries coated with the 2% CNF composition (coated twice), and to ~6% in cherries coated with the 2% CNF/2% $CaCO_3$ composition. These results clearly demonstrate that CNF-based films reduce the level of cherry cracking.

TABLE 9

The number of cracked cherries after 8 h soaking in distilled water.

| Treatments | Cracked cherries/Total number | Cracking ratio (%) |
|---|---|---|
| Control | 36/52 | 69.23 |
| NF2 | 26/52 | 50.00 |
| NF2 coated twice | 16/52 | 30.77 |
| NF2C2 | 3/52 | 5.77 |

Figure 18:
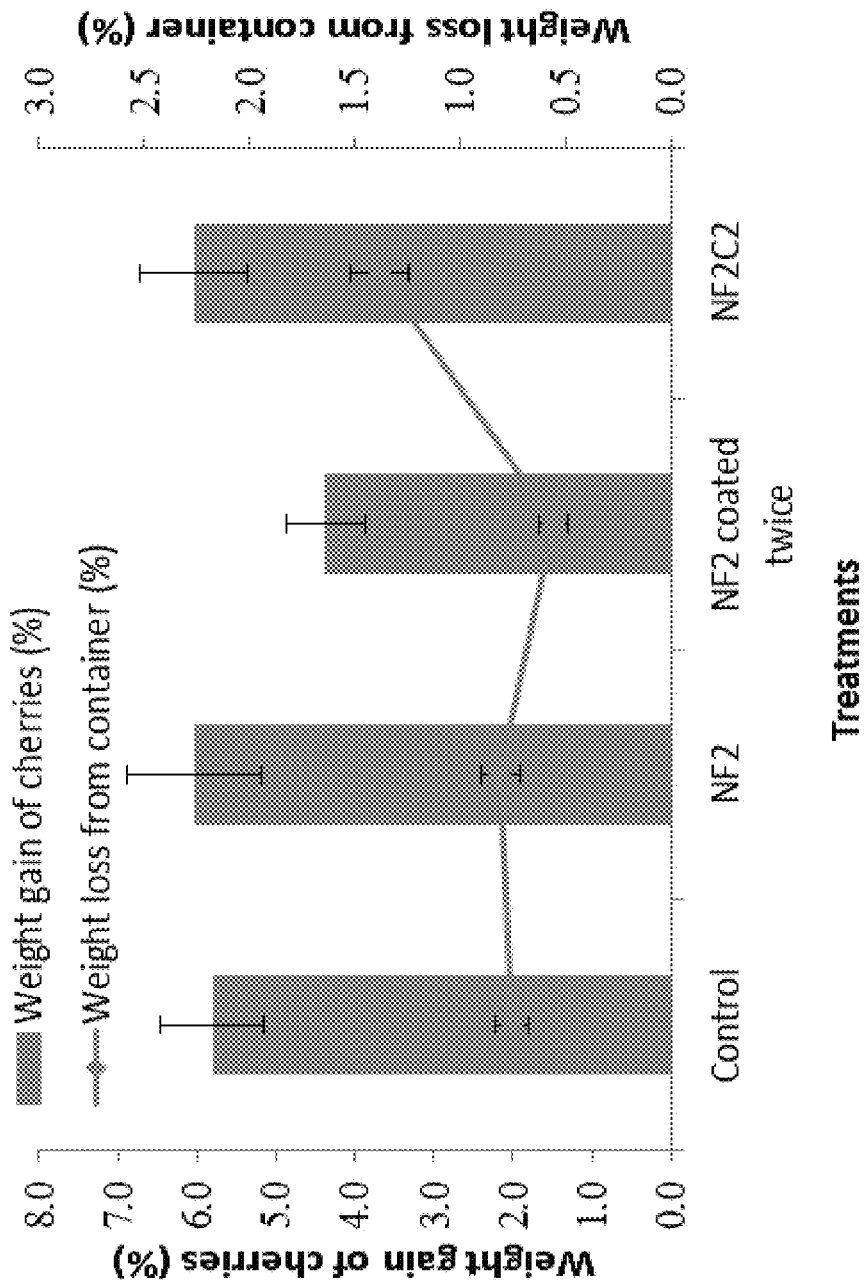
FIG. 18 is a graph of weight gain of cherries (%) and weight loss of water from a container (%) in which the cherries illustrated in FIGS. 17A-17D were soaked for 8 hours.
Figure 19E:
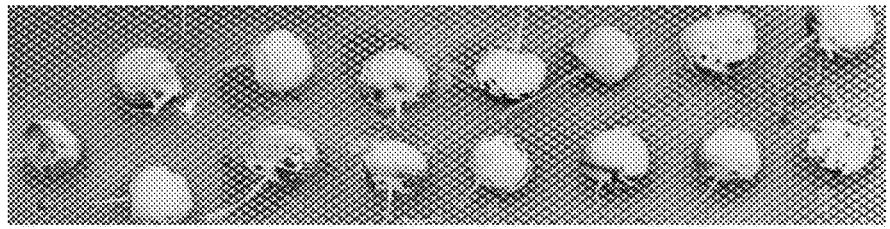
FIGS. 19A-19E are photographic images of cherries coated with 1.5% cellulose nanofibrils and different concentrations of CaCO$_3$.
Figure 19D:
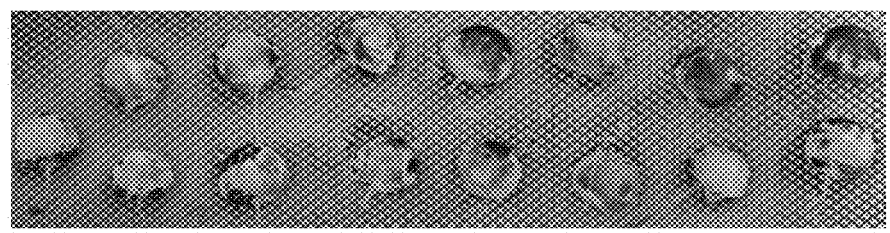
Figure 19C:
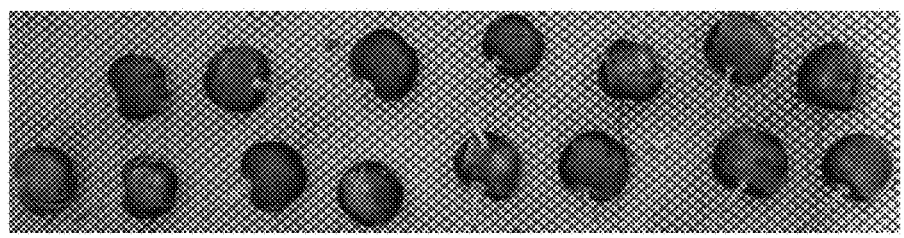
Figure 19B:
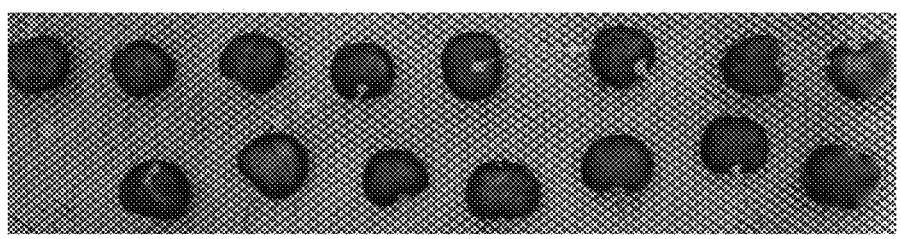
Figure 19A:
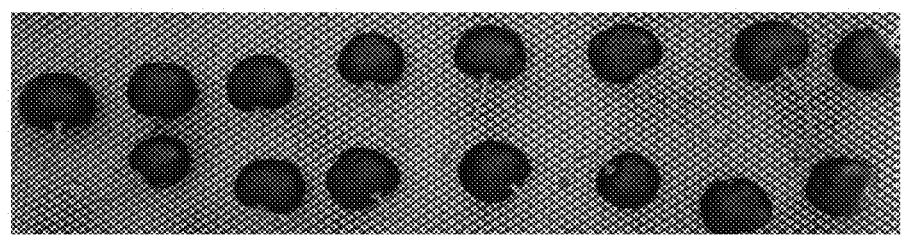
Figure 21E:
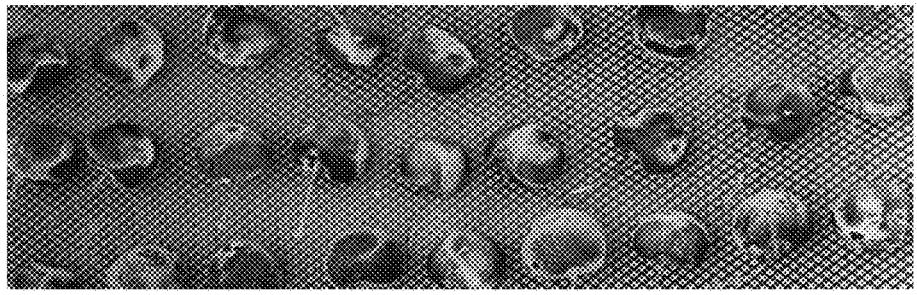
FIGS. 21A-21E are photographic images of cherries coated with 1.5% cellulose nanofibrils and different concentrations of nano calcium silicate (calcium:silicate=90%: 10%) (FIG. 21A, 1.5% cellulose nanofibrils and 0.17% nano calcium silicate.
Figure 21D:
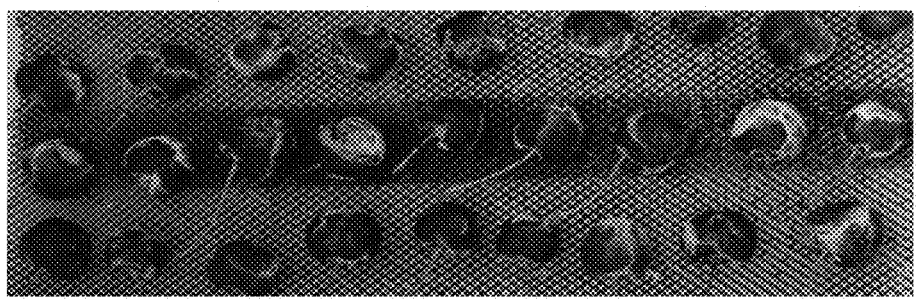
Figure 21C:
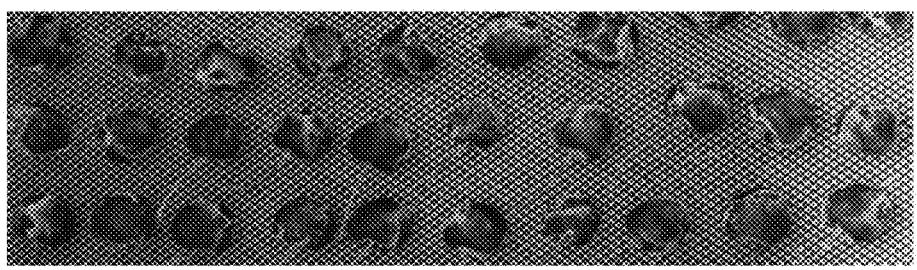
Figure 21B:
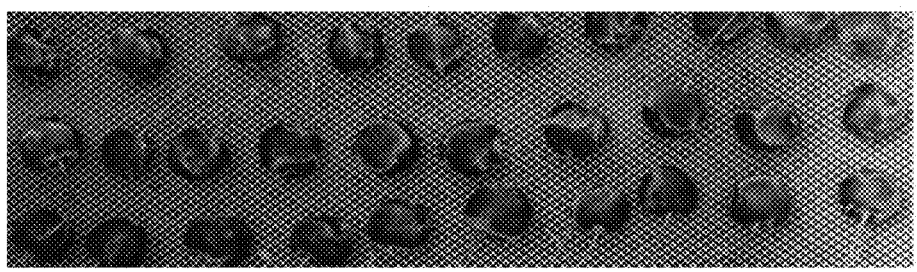
Figure 21A:
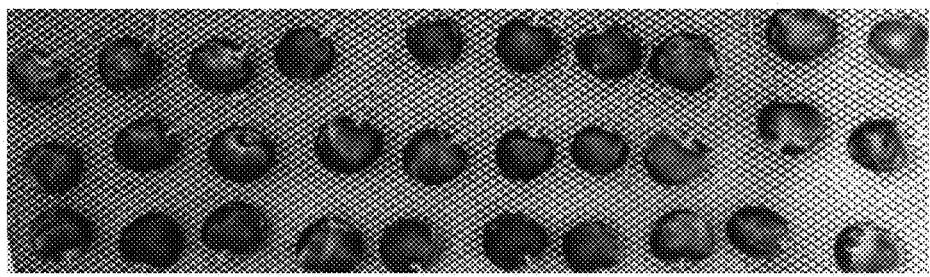

Weight gain of cherries and weight loss of soaking water are provided in FIG. 18. No significant difference in weight gain of cherries was observed between coated and uncoated cherries, but weight gain of cherries coated twice with the NF2 composition was significantly lower than that of control and other coated cherries. The significantly different higher loss of water from container was found in soaking solution treated for NF2C2 coated cherries. This result is likely caused by water absorption by the coating materials.

In yet additional examples, cherry cracking can be prevented using formulations comprising about 0.1% to about 0.75% CNF, about 0.01% to about 0.5% potassium sorbate, about 0.01% to about 0.5% of a surfactant (e.g., polyoxyethylene (80) sorbitan monolaurate, sorbitan monolaurate, or sorbitan monooleate), about 0.01% to about 0.5% of a plasticizer (e.g., glycerol, sorbitol, or PEG 400), or any combination thereof.

Example 8

In this example, methods for using aqueous suspension/slurries of fibrous or crystalline nano-cellulose that are capable of forming optimal concentration of micro calcium carbonate (micro $CaCO_3$) added to cellulose nanofibrils (CNF) to prevent cherry cracking (and increasing marketability) were examined.

For coating treatment, five compositions, including NF1.5 (1.5% CNF) added with different concentrations (0.01%, 0.05%, 0.1%, 0.5%, and 1%) of micro $CaCO_3$, were prepared and coated on cherries by using spray method (30 psi), and then dried for 1 hour under air-flow (fan) at room temperature (FIGS. 19A-19E). A formation of blooming/clouding on the surface of cherries clearly appeared at the concentration higher than 0.5% $CaCO_3$ (CNF:$CaCO_3$=75:25).

15 stem-on cherries for each treatment were subjected to water treatment for testing effective concentration of $CaCO_3$ adding to CNF on cherry cracking along with improvement of marketable acceptance. Coated cherries with five different coating solutions were soaked in water for 8 hours at room temperature. The numbers of non-cracked and cracked cherries were counted, and the cracking ratio was presented based on the total number of cherries (15 each).

As shown in Table 10, the cracking ratio of cherries reduced to 13% in cherries coated with a composition comprising the NF1.5C0.01 formulation and 0% in cherries coated with a composition comprising the NF1.5C0.05, NF1.5C0.1, NF1.5C0.5, and NF1.5C1 compositions. Based on the appearance and cracking ratio (%) of cherries, the optimal concentration of micro $CaCO_3$ ranges between from about 0.05% to about 0.10%.

TABLE 10

The number of cracked cherries after 8 hours soaking in distilled water.

| Treatments | Cracked cherries/Total number | Cracking ratio (%) |
| --- | --- | --- |
| NF1.5C0.01 | 2/15 | 13.33% |
| NF1.5C0.05 | 0/15 | 0.00 |
| NF1.5C0.1 | 0/15 | 0.00 |
| NF1.5C0.5 | 0/15 | 0.00 |
| NF1.5C1 | 0/15 | 0.00 |

Example 9

In this example, methods for using aqueous suspension/slurries of fibrous or crystalline nano-cellulose that are capable of forming optimal concentration of nano calcium silicate (wollastonite or calcium:silicate=90%:10%) added to CNF to prevent cherry cracking (and thereby increasing marketability) were examined.

30 stem-on cherries for each treatment (control and different CNF/calcium coatings) were subjected to water treatment for testing the control and CNF based coatings on cherry cracking. For coating treatment, five different solutions depending on the concentration of nano calcium silicate were prepared and coated on cherries by using spray method (30 psi), and then dried for 1 hour under air-flow (fan) at room temperature. FIGS. 20A-20E illustrate results from compositions comprising 1.5% CNF and different concentrations of wollastonite and FIGS. 21A-21E illustrate results from compositions comprising 1.5% CNF and different concentrations of nano calcium silicate (calcium:silicate=90%:10%). The same formulas disclosed in Example 7 were used to calculate weight gain (%) and weight loss (%).

Results

As shown in Table 11 below, the cracking ratio of cherries reduced 50% in cherries coated with the NF1.5C0.64 (70/30) composition (using wollastonite) and 63.33% in cherries coated with the NF1.5C1 (60/40) composition (using calcium and silicate as 90% and 10%). Blooming/clouding on the surface of cherries was apparent at the concentration higher than 0.64% nano calcium silicate (CNF:calcium silicate=70:30), thereby indicating that the optimal concentration of nano calcium carbonate or micro calcium carbonate is about 0.38% (CNF:calcium silicate=80:20).

TABLE 11

The ratio (%) of cracked cherries after 8 h soaking in distilled water.

| Treatments (CNF/Nano calcium silicate) | Wollastonite | Calcium:silicate = 90%:10% |
| --- | --- | --- |
| Uncoated cherries | 100.00 | 100.00 |
| NF1.5C0.17 (90/10) | 66.67 | 80.00 |
| NF1.5C0.38 (80/20) | 56.67 | 70.00 |
| NF1.5C0.64 (70/30) | 50.00 | 66.67 |
| NF1.5C1 (60/40) | 66.67 | 63.33 |
| NF1.5C1.5 (50/50) | 80.00 | 83.33 |

Example 10

In another embodiment described herein are the methods using aqueous suspension/slurries of fibrous or crystalline nano-cellulose that are capable of forming optimal concentration of cellulose nanofibrils (CNF)/calcium chloride ($CaCl_2$) coating for reducing cherry cracking.

19 stem-on cherries for each treatment (control or different CNF/$CaCl_2$ coatings) were subjected to water treatment for testing cherry cracking. For coating treatment, two compositions comprising 1.5% CNF containing 0.1% or 0.5% $CaCl_2$ were prepared and coated on cherries by using spray-coating method (30 psi), and then dried for 1 hour under air-flow (fan) at room temperature. As illustrated in FIGS. 22D and 22E, adding 0.1% or 0.5% $CaCl_2$ to the composition provided coatings that exhibited no blooming/clouding on the surface of cherries. Adding 0.1% or 0.5% $CaCl_2$ to the CNF-containing compositions resulted in significantly reduced cherry cracking, as well as an enhanced appearance and marketability, in comparison with CNF coating containing micro $CaCO_3$ (FIGS. 22B and 22C).

Results

As shown in Table 12, the cracking ratio of cherries coated with CNF/$CaCl_2$ was significantly lower than the control sample. FIGS. 22A-22E reflect the results reported in Table 12, the cracked and un-cracked cherries after soaked in water for 8 hours. Hence, adding 0.1% or 0.5% $CaCl_2$ to compositions comprising CNF significantly reduced cherry cracking.

TABLE 12

The number of cracked cherries after 8 hours soaking in distilled water.

| Treatments | Cracked cherries/Total number | Cracking ratio (%) |
|---|---|---|
| Control | 12/19 | 63.16 |
| NF1.5C0.1 | 0/19 | 0 |
| NF1.5C0.5 | 0/19 | 0 |

Example 11

In this example, the ability of the disclosed coating compositions and processing solutions were tested in various thermal processing method embodiments.

General Procedure: Fresh blueberries were sorted, washed using Environné™ fruit and vegetable wash (Consumer Health Research Inc., OR), and dipped in various different composition embodiments comprising 0.5-1% CNF, 0.1-0.5% MCC, 0-0.1% CMC, and 0-0.1% $CaCl_2$ for 10 min. Coated blueberries were placed inside a 30-35° C. oven for 3-4 hours to form dried coatings. Coated samples were then placed inside glass jars filled up with an aqueous solution of 0.25% sodium alginate and 18% table sugar. The jars were capped, thermally processed at 85° C. water bath for 20 minutes, and then moved into a cold water bath to cool to room temperature. After storing at ambient conditions for 7-8 days, the color of the packing solutions was observed.

The total monomeric anthocyanin content of fruit was determined using the pH-differential method and expressed as mg cyanidin-3-glucoside per 100 g dried matter (DM) of fruit with molecular weight of 449.2 g/mol and a molar absorptivity of 26,900. Percent polymeric color (PPC) was calculated as the sum of the absorbance at 420 nm and 520 nm of bisulfite-treated extract divided by the sum of the absorbance at 420 nm and 520 nm of berry extract.

During initial trials using these general experimental conditions, it was observed that blueberries coated with a CNF/MCC-containing composition further comprising CMC and/or $CaCl_2$ slowed the leaching of anthocyanin pigments. As illustrated in FIGS. 23A-23H, a variety of different compositions were tested—the results and compositions are provided below in Table 13. The compositions disclosed in Table 13 each comprise 1% CNF.

TABLE 13

Initial Thermal Processing Trials

Figure 23A:
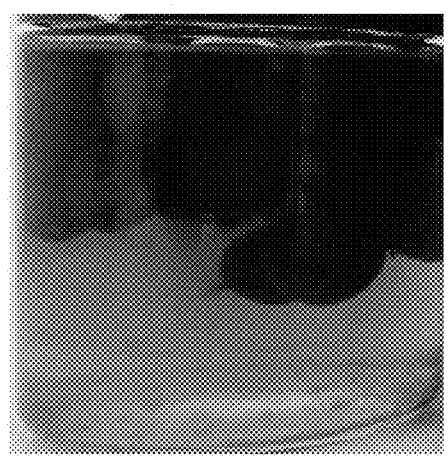
FIGS. 23A-23H are photographic images of blueberries coated with compositions of 1% cellulose nanofibrils (CNF) comprising different concentrations of carboxymethyl cellulose (CMC), micro calcium carbonate (MCC), and CaCl$_2$. The blueberries also were subjected to thermal processing using processing compositions comprising 0.25% sodium alginate (SA) and 18% sugar (FIG. 23A, 1% CNF composition further comprising 0% CMC, 0.1% MCC, and 0% CaCl$_2$.
Figure 23B:
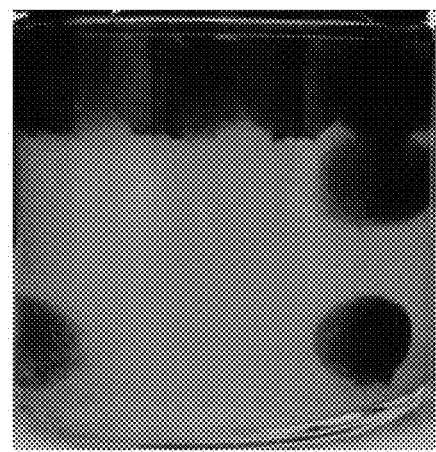
Figure 23C:
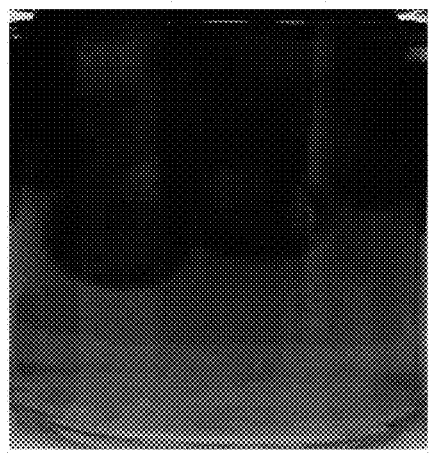

| Component | Component amount | Results |
|---|---|---|
| Test 1 - FIG. 23A | | Surrounding water tinted light pink |
| MCC | 0.1% | |
| CMC | 0% | |
| $CaCl_2$ | 0% | |
| Test 2- FIG. 23B | | Surrounding water substantially colorless |
| MCC | 0.1% | |
| CMC | 0.1% | |
| $CaCl_2$ | 0% | |
| Test 3- FIG. 23C | | Surrounding water tinted light red |
| MCC | 0.1% | |
| CMC | 0% | |
| $CaCl_2$ | 0.1% | |

TABLE 13-continued

Initial Thermal Processing Trials

Figure 23D:
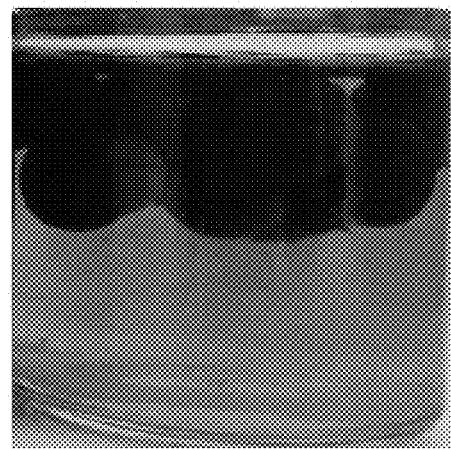
Figure 23E:
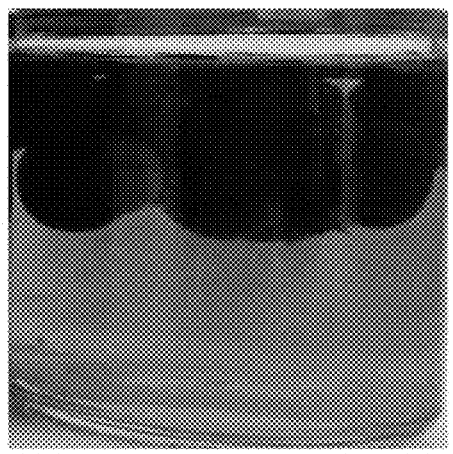
Figure 23F:
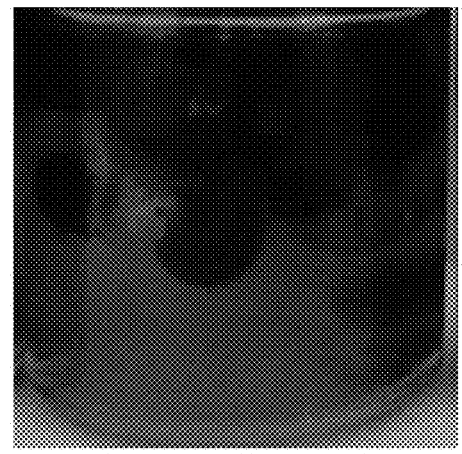
Figure 23G:
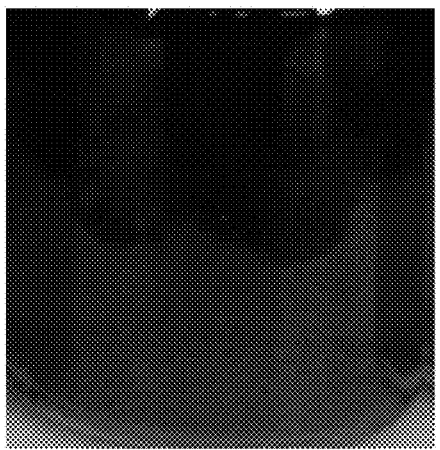
Figure 23H:
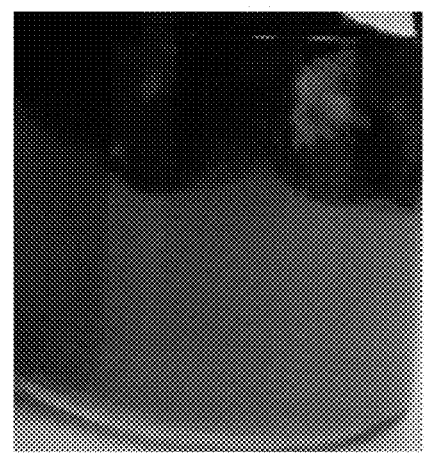

| Component | Component amount | Results |
|---|---|---|
| Test 4- FIG. 23D | | Surrounding water substantially colorless |
| MCC | 0.1% | |
| CMC | 0.1% | |
| $CaCl_2$ | 0.1% | |
| Test 5- FIG. 23E | | Surrounding water tinted red |
| MCC | 0.5% | |
| CMC | 0% | |
| $CaCl_2$ | 0% | |
| Test 6- FIG. 23F | | Surrounding water tinted faintly orange |
| MCC | 0.5% | |
| CMC | 0.1% | |
| $CaCl_2$ | 0% | |
| Test 7- FIG. 23G | | Surrounding water tinted red |
| MCC | 0.5% | |
| CMC | 0% | |
| $CaCl_2$ | 0.1% | |
| Test 8- FIG. 23H | | Surrounding water tinted light pink |
| MCC | 0.5% | |
| CMC | 0.1% | |
| $CaCl_2$ | 0.1% | |

The amount of the cellulose nanomaterial used in the compositions described above and illustrated in FIGS. 23A-23H were modified improve the physical appearance of the products comprising the compositions. For example, FIGS. 24A-24H illustrate results obtained from uncoated blueberries (FIG. 24A) and blueberries coated with a compositions comprising lower concentrations (0.5 and 0.75%) of CNF. Varied amounts of MCC, CMC, and $CaCl_2$ were used. Blueberries coated with compositions comprising CNF, MCC, and CMC only showed significant less anthocyanin leaching in comparison with those containing CNF, MCC, and $CaCl_2$. The results are illustrated in FIGS. 24A-24H, which also are described below in Table 14. Based on these initial trials, four different coating formulations (I: 0.5% CNF, 0.1% MCC, and 0.1% CMC, II: 0.75% CNF, 0.5% MCC, and 0.1% CMC, III: 1% CNF, 0.1% MCC, and 0.1% CMC, and IV: 1% CNF, 0.5% MCC, and 0.1% CMC) were further tested.

TABLE 14

Initial Thermal Processing Trials

Figure 24A:
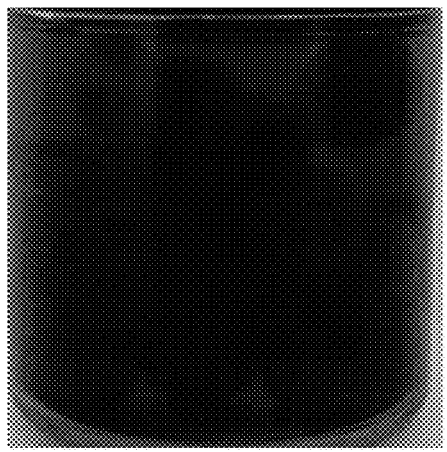
FIGS. 24A-24H are photographic images of blueberries coated with compositions comprising CNF and carboxymethyl CMC at different concentrations and further comprising different concentrations of micro calcium carbonate (MCC) and CaCl$_2$. The blueberries also were subjected to thermal processing using processing compositions comprising 0.25% sodium alginate (SA) and 18% sugar.
Figure 24B:
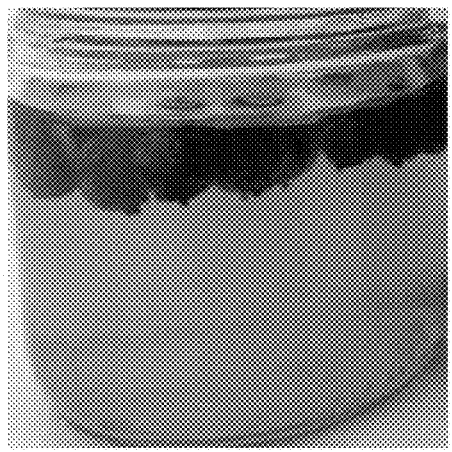
Figure 24C:
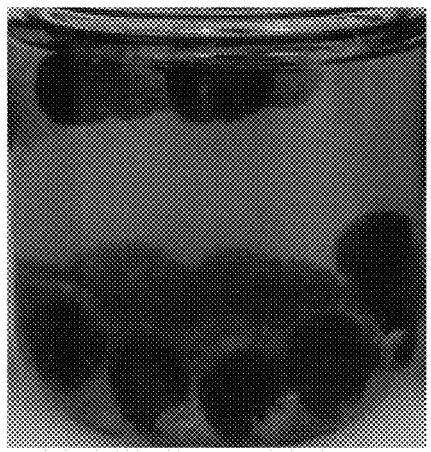
Figure 24D:
Figure 24E:
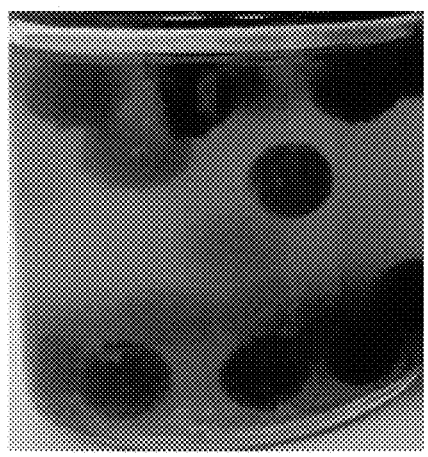

| Component | Component amount | Results |
|---|---|---|
| Control - FIG. 24A | | Surrounding water tinted light pink |
| Test 1 - FIG. 24B | | Surrounding water tinted light pink |
| CNF | 0.5% | |
| MCC | 0.1% | |
| CMC | 0.1% | |
| $CaCl_2$ | 0% | |
| Test 2- FIG. 24C | | Surrounding water substantially colorless |
| CNF | 0.5% | |
| MCC | 0.1% | |
| CMC | 0.1% | |
| $CaCl_2$ | 0.1% | |
| Test 3- FIG. 24D | | Surrounding water tinted light red |
| CNF | 0.5% | |
| MCC | 0.5% | |
| CMC | 0.1% | |
| $CaCl_2$ | 0% | |
| Test 4- FIG. 24E | | Surrounding water substantially colorless |
| CNF | 0.5% | |
| MCC | 0.1% | |
| CMC | 0.1% | |
| $CaCl_2$ | 0% | |

TABLE 14-continued

Initial Thermal Processing Trials

Figure 24F:
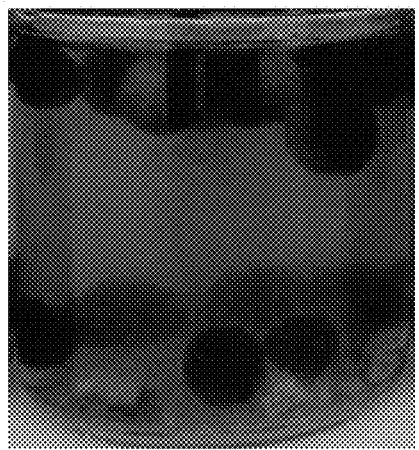
Figure 24G:
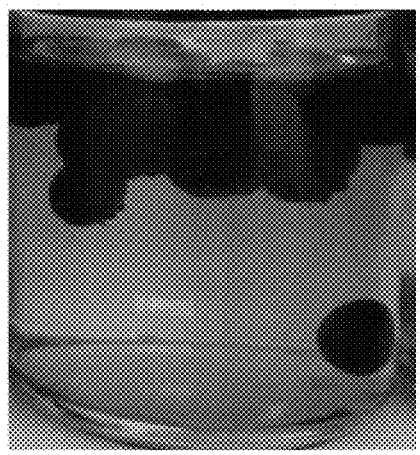
Figure 24H:
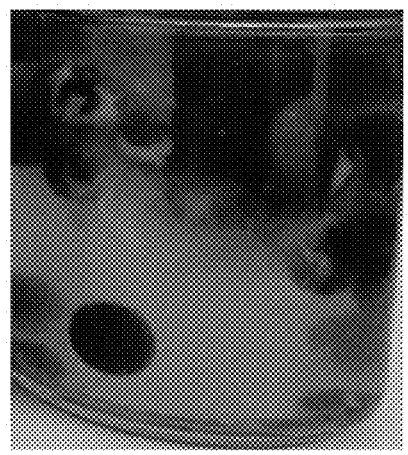

| Component | Component amount | Results |
|---|---|---|
| Test 5- FIG. 24F | | Surrounding water tinted red |
| CNF | 0.75% | |
| MCC | 0.1% | |
| CMC | 0.1% | |
| CaCl$_2$ | 0.1% | |
| Test 6- FIG. 24G | | Surrounding water tinted faintly orange |
| CNF | 0.75% | |
| MCC | 0.5% | |
| CMC | 0.1% | |
| CaCl$_2$ | 0% | |
| Test 7- FIG. 24H | | Surrounding water tinted red |
| CNF | 0.75% | |
| MCC | 0.5% | |
| CMC | 0.1% | |
| CaCl$_2$ | 0.1% | |

Example 12

Based on the result of the initial trials described above, four of these compositions, which exhibited significantly less leaching of anthocyanin pigments in the aqueous solution (in comparison to other composition embodiments and/or control embodiments) were selected to further evaluate the coating formulation and processing procedure. In these further embodiments, coated fruits were thermally processed in two different ways: 1) a one-step thermal process (OTP) at 91-93° C. in a water bath for 9-10 min; and 2) a repeated two-step thermal processes (TTP) at 91-93° C. for 9-10 min. Without being limited to a single theory of operation, it is currently believed that anthocyanins were polymerized and/or structurally modified under the layer of the film formed by the composition used to coat the fruit in the first thermal treatment. This polymerization and/or structural modification promoted the thermally stability of the fruits in aqueous solutions. The surface coating was then washed after the first thermal process step using water. This washing step was used to improve the appearance of the fruit surface. After rinsing in water, the fruit embodiments were repacked in an aqueous solution containing 0.25% sodium alginate, 0.25% CMC, or 10 mM CaCl$_2$ and 18% sugar (table sugar) at a pH ranging from about 4.5 to about 5.0. These embodiments were then again thermally treated at 91-93° C. in a water bath for 9-10 minutes to mimic the procedures/conditions applied for commercial canning processing of fruit to ensure product safety and shelf-life. The glass jars containing the fruit embodiments were then moved into a cold water bath to cool the jars to room temperature and subsequently stored at the ambient conditions. The color of the packing media and physicochemical properties of fruit were determined after each thermal process, and compared with those of fresh samples using the detection methods described above. Fruit embodiments were further stored at ambient condition for 7 days to determine change during storage.

Figure 25A:
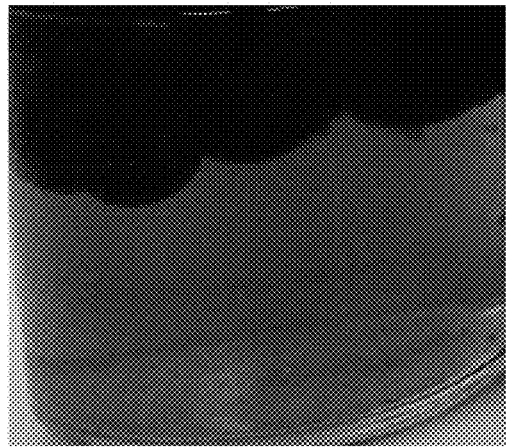
FIGS. 25A-25E are photographic images of blueberries coated with compositions comprising various different amounts of CNF, carboxymethyl cellulose, and micro calcium carbonate (CaCO$_3$) and further having been exposed (after being coated) to an aqueous solution of 0.25% sodium algiate (SA) and 18% sugar and two thermal processing steps.
Figure 25B:
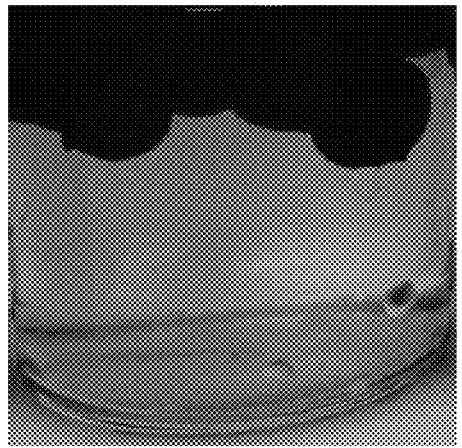
Figure 25C:
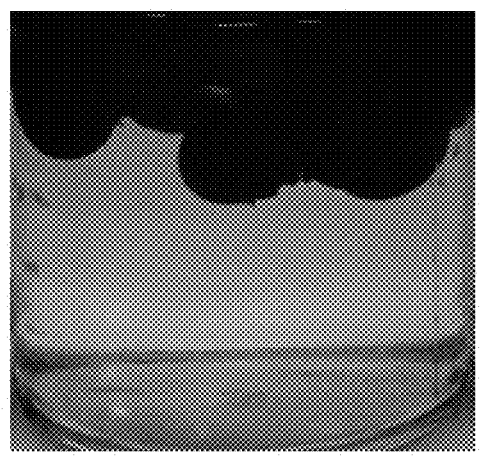
Figure 25D:
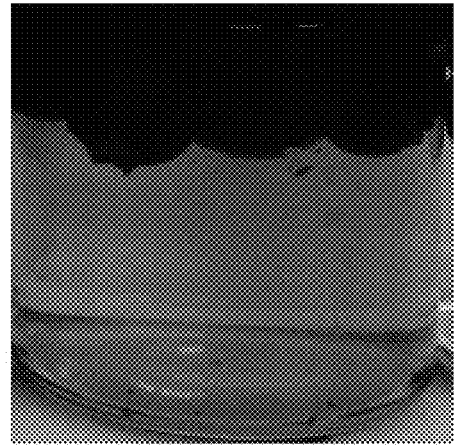
Figure 25E:
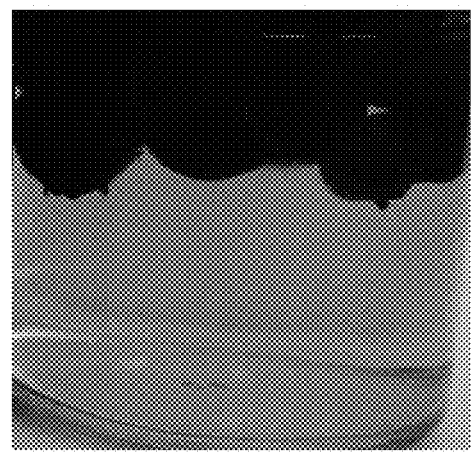

As illustrated in FIGS. 25A-25E, blueberries coated with compositions comprising 1% CNF, 0.1% CMC, and 0.5% MCC showed less leaching of anthocyanin pigments in the aqueous solution compared with other coating treatments. The monomeric anthocyanin pigment of the aqueous solution was measured. Significant reduction in pigment leaching were observed on blueberries coated with a composition embodiment comprising 1% CNF, 0.1% CMC, and 0.5% MCC (FIG. 25C), compared with the control (FIG. 25A) and other treatments (FIGS. 25B, 25D, and 25E).

Figure 26:
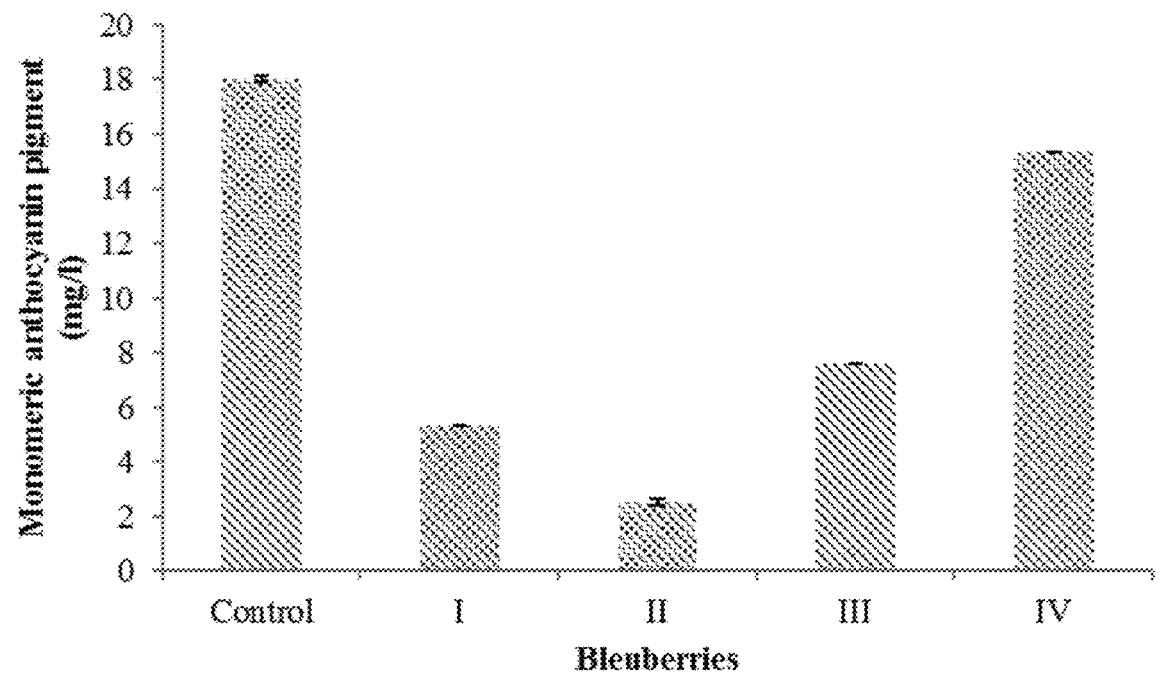
FIG. 26 is a graph of monomeric anthocyanin concentration (mg/L) and pigment absorbance (measured at 525 nm) leached from the coated or uncoated blueberries illustrated in FIGS. 25A-25E after processing using the 0.25% sodium alginate and 18% sugar processing composition and two steps of thermal processing at 91-93° C. for 9-10 minutes. Treatment I, 1% CNF/0.1% CMC/0.1% MCC; Treatment II, 1% CNF/0.1% CMC/0.5% MCC; Treatment III, 0.5% CNF/ 0.1% CMC/0.1% MCC; and Treatment IV, 0.75% CNF/ 0.1% CMC/0.5% MCC.
Figure 27:
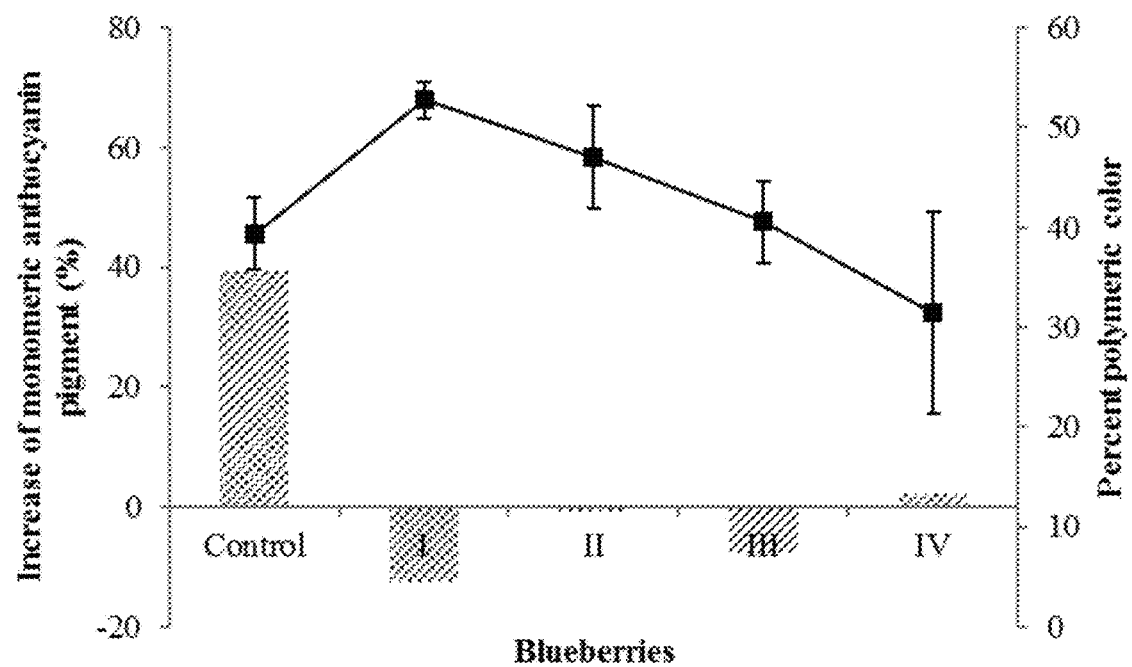
FIG. 27 is a graph illustrating changes of monomeric anthocyanin pigment in the blueberries illustrated in FIGS. 26A-26E after being subjected to the second thermal process step; data are reported as the % change in comparison with the first thermal process at 91-93° C. for 9-10 minutes; and the bars of the graph represent the % increase in unstable monomeric anthocyanin pigments, whereas the curve represents the percent polymeric color of the fruit. Treatments I-IV are as indicated in FIG. 26.

To determine the impact of the first step thermal treatment on potential polymerization and structural modification of anthocyanin pigment, the changes in the monomeric anthocyanin pigment (unstable anthocyanin pigment) and percent polymeric color of blueberries between the first and second thermal processes were evaluated in uncoated and coated blueberries (FIG. 26). Uncoated blueberries had about a 40% increase in monomeric anthocyanin pigments after the second thermal process in comparison with the first thermal process. Without being limited to a single theory of operation, it is currently believed that this difference is due to the thermal destruction of polymerized anthocyanins into unstable monomeric anthocyanins, whereas the monomeric anthocyanin pigments in coated blueberries decreased or only slightly increased by thermal process as the compositions used to coat the blueberries was able to not only prevent polymerized anthocyanin destruction, but also induce the polymerization and/or structural modifications of anthocyanins thereby forming more stable forms of anthocyanins. Furthermore, the percent polymeric color of coated blueberries showed significantly higher values than control embodiments, as illustrated in FIG. 27. These results further corroborate that less thermal destruction of polymerized anthocyanin pigments occurred in blueberries coated with embodiments of the disclosed composition that were also treated with an aqueous solution comprising sodium alginate due to the polymerization and/or structural modifications of anthocyanin, thus improving the thermal stability of anthocyanin pigment in thermally processed blueberries.

Figure 28A:
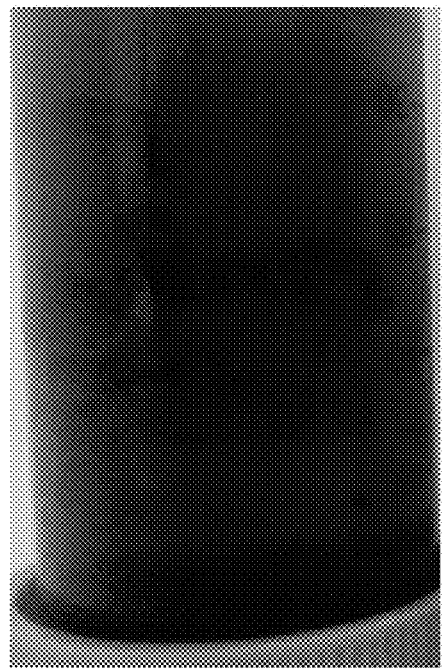
FIGS. 28A-28C are photographic images of the aqueous solution obtained after thermal processing of a control sample (FIG. 28A) after two thermal processing steps, and a sample wherein the fruit was coated with a composition comprising 1% celluose nanofibrils (CNF)/0.1% carboxymethyl (CMC)/0.5% micro calcium carbonate (MCC) and subjected to a first thermal processing step (FIG. 28B) and then a second thermal processing step (FIG. 28C).
Figure 28B:
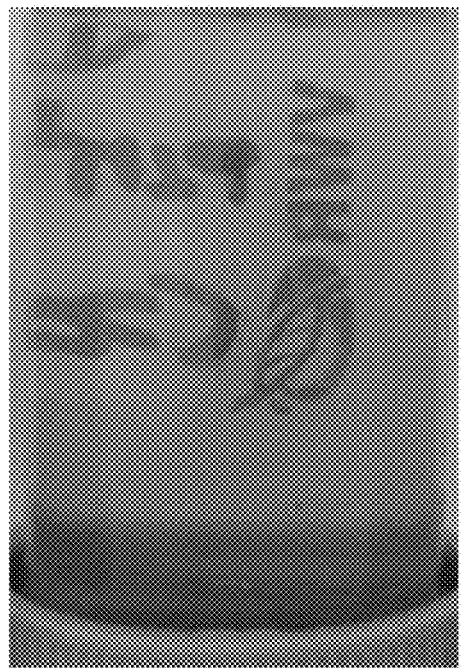
Figure 28C:
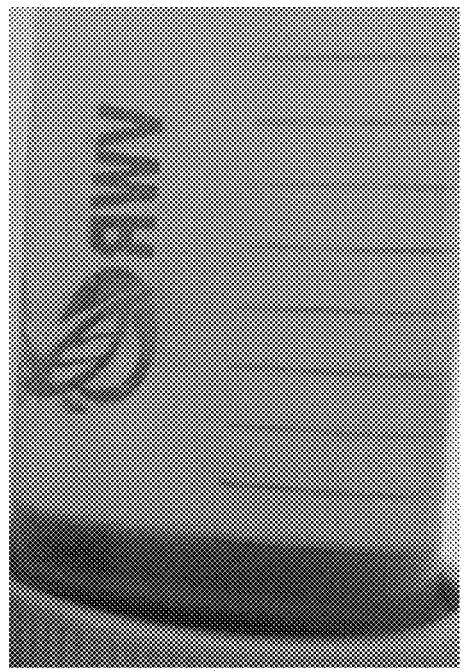

Based on the result from previous study, the composition comprising 1% CNF, 0.1% CMC, 0.5% MCC was selected for storage tests. Blueberries coated with this composition embodiment were stored in a processing composition comprising 0.25% sodium alginate and 18% sugar. These embodiments showed less leaching after 7 days of storage at ambient conditions in comparison with blueberries that were not coated with the composition (FIGS. 28A-28C).

Other processing composition embodiments were also test. Results from embodiments where blueberries coated with a composition comprising 1% CNF, 0.1% CMC, and 0.5% MCC were added to these other processing compositions are illustrated in FIGS. 29A-29E and are also summarized in Table 15, below. The processing compositions comprised 0.25% CMC and 18% sugar or 0.25% CMC, 18% sugar, and 10 mM CaCl$_2$. The blueberries were treated using the two-step of thermal process, and stored at the ambient condition for 7 days. No leaching of anthocyanin pigments was observed at day zero, whereas anthocyanin pigments were leached during storage under ambient conditions. Acidic pH (4.5) condition of aqueous solution showed more leaching of anthocyanin pigments than neutral pH (FIG. 29E).

TABLE 15

Sequential Thermal Processing Steps

Figure 29A:
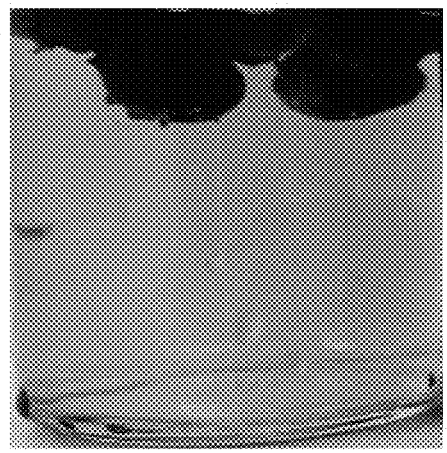
FIGS. 29A-29E are photographic images of blueberries coated with a composition comprising 1% CNF/0.1% CMC/ 0.5% MCC, wherein the blueberries are added to a processing solution comprising 0.25% carboxymethyl cellulose (CMC) and 18% sugar at various pH values.
Figure 29B:
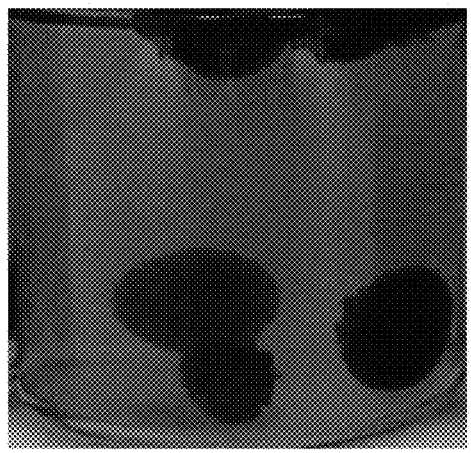
Figure 29C:
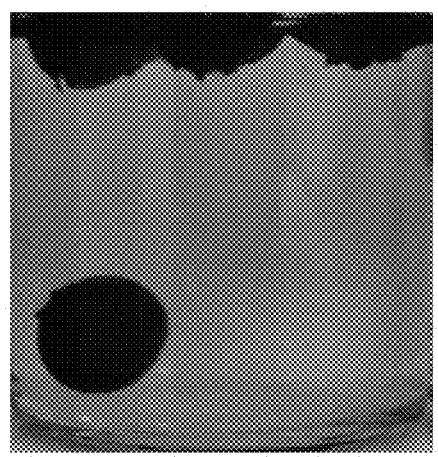
Figure 29D:
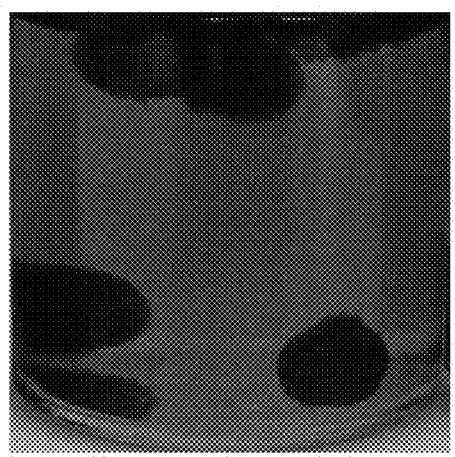
Figure 29E:
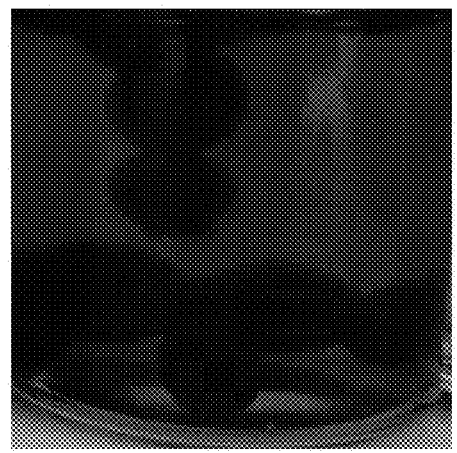

| Composition | 1st Thermal Processing | 2nd Thermal Processing | Results |
| --- | --- | --- | --- |
| 1% CNF/0.1% CMC/0.5% MCC | 0.25% CMC/ 18% sugar | 0.25% CMC/18% sugar at neutral pH | FIG. 29A: No leaching - solution remained colorless |
| 1% CNF/0.1% CMC/0.5% MCC | 0.25% CMC/ 18% sugar | 0.25% CMC/18% sugar and stored for 7 days at neutral pH | FIG. 29B: Leaching observed - solution turned red |
| 1% CNF/0.1% CMC/0.5% MCC | 0.25% CMC/ 18% sugar | 0.25% CMC/18% sugar/ 10 mM $CaCl_2$ at neutral pH | FIG. 29C: No leaching observed - solution remained colorless |
| 1% CNF/0.1% CMC/0.5% MCC | 0.25% CMC/ 18% sugar | 0.25% CMC/18% sugar/ 10 mM $CaCl_2$ stored for 7 days at neutral pH | FIG. 29D: Leaching observed - solution turned red |
| 1% CNF/0.1% CMC/0.5% MCC | 0.25% CMC/ 18% sugar | 0.25% CMC/18% sugar/ 10 mM $CaCl_2$ stored for 7 days at pH 4.5* | FIG. 29E: Leaching observed - solution turned red |

*pH adjusted using acetic acid

Figure 30:
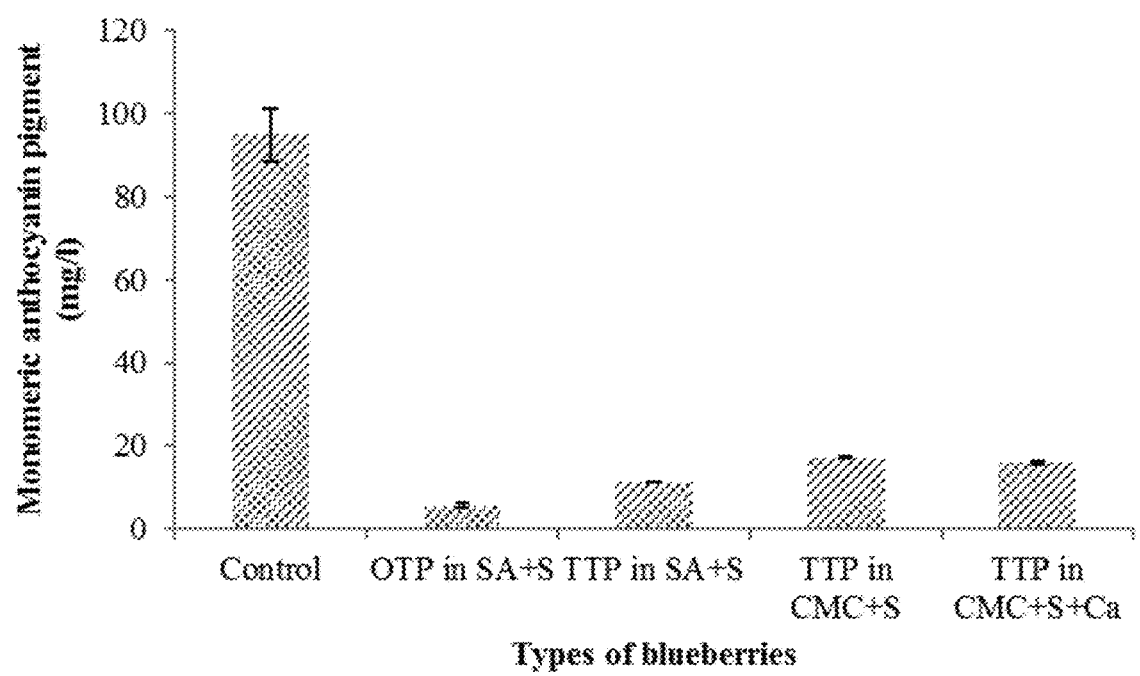
FIG. 30 is a graph of monomeric anthocyanin pigment concentration (mg/L) of the various different blueberry embodiments described in FIGS. 29A-29E.

As illustrated in FIG. 30, the monomeric anthocyanin pigment of blueberries coated with 1% CNF, 0.1% CMC, and 0.5% MCC was significantly reduced (as compared to controls wherein the fruit was not coated with the composition). In addition, the processing compositions comprising sodium alginate used with coated blueberries and that were subjected to a one-step thermal process exhibited the lowest monomeric anthocyanin pigment concentration (FIG. 30).

Example 13

High hydrostatic pressure (HHP) is a novel non-thermal food processing technology that has shown its effectiveness for retaining the nutritional and sensory qualities of processed fruits while killing harmful microorganisms and inactivating enzymes for ensuring food safety and quality of processing fruit products. This technology has been used in commercial food processing, including processing fruits and vegetables. This technology is suitable for use with the compositions and methods disclosed herein. In some embodiments, compositions comprising any of the components disclosed herein can be used to effectively prevent anthocyanin leaching from fruit packed in aqueous media that is subjected to an HHP process. Exemplary compositions include those comprising CNF, nano-$CaCO_3$, and CMC. Using the disclosed HHP processing methods disclosed herein, fruits are processed at a suitable pressure for a suitable time, such as at a pressure and for a time that is capable of inactivating harmful microorganisms and enzymes that may lead to quality deterioration and food safety concern of fruit during storage. Exemplary pressures include pressures ranging from about 400 to about 800 MPa, such as from about 400 to about 500 MPa. Exemplary time ranges include from greater than about 5 minutes to about 20 minutes, such as about 10 minutes to about 15 minutes using a high pressure unit, such as that available at the OSU Food Science pilot plant.

In some embodiments, fruits, such as blueberries, cherries and other anthocyanin rich fruits, will be coated using the composition embodiments disclosed herein. The fruits are then packed in a suitable container, such as polyethylene terephthalate (PET) retort bowls or other types of containers that can be subjected to HHP treatment, such as polymer cups, glass jars, metal cans, or flexible pouches and/or bags of polymer or composite manufacture) with any one of the processing compositions disclosed herein. In one embodiment, the samples are sealed and subjected to a first thermal processing step as disclosed herein, followed by an HHP processing step. In another embodiment, the samples are first subjected to a first thermal processing step prior to being packaged in the container. The samples may then be separated from the first processing composition used in the first thermal processing step and placed into a fresh processing composition, which is the same or different from the first processing composition. This embodiment may further comprise removing (using methods disclosed herein) the films or coatings formed on the fruit samples after the first thermal processing step. The samples are then processed using an HHP processing step. Any of these embodiments can be modified to include a second thermal processing step after the samples have undergone HHP treatment. The fruit samples can be removed from the packaging before or after this second thermal processing step, and any residual film or coating present on the fruit samples may also be removed before or after this second thermal processing step.

Figure 31:
FIG. 31 is an image of uncoated blueberries that have undergone high hydrostatic pressure treatment.

Standard tests for fruit color, soluble anthocyanins, and brown index of packing solutions are performed to determine the performance of the disclosed compositions. The results are then evaluated to determine suitable composition embodiments and pressure/time ranges for different fruit products. FIG. 31 illustrates a photographic image of uncoated blueberries packed in a polyethylene terephthalate (PET) retort bowl that was subjected to HHP processing. As illustrated in FIG. 31, anthocyanin was leached from the fruits into the packing solution. The compositions disclosed herein are used to prevent the leaching of anthocyanin from HHP-processed fruits.

Example 14

Figure 32:
FIG. 32 is an image of mixed fruit samples that may be coated with the coating compositions disclosed herein.

The compositions disclosed herein also may be used to with multi-colored fruit products packed in clearly visual containers to promote well retained natural fruit pigments, nutrients and extended shelf-life. In some embodiments, composition embodiments disclosed herein can be used to coat mixed fruits, such as blueberries, cherries, and other anthocyanin rich fruits, that are then processed in clear PET cups or glass jars (FIG. 32) except the fruits have been thermally or on-thermally (HHP) processed for ensuring food safety, quality and shelf-life).

Example 15

This example describes use of the disclosed compositions on apples, grapes, and certain tropical fruits. The fruits described below were coated with an embodiment of the composition and stored under ambient conditions.

Figure 33:
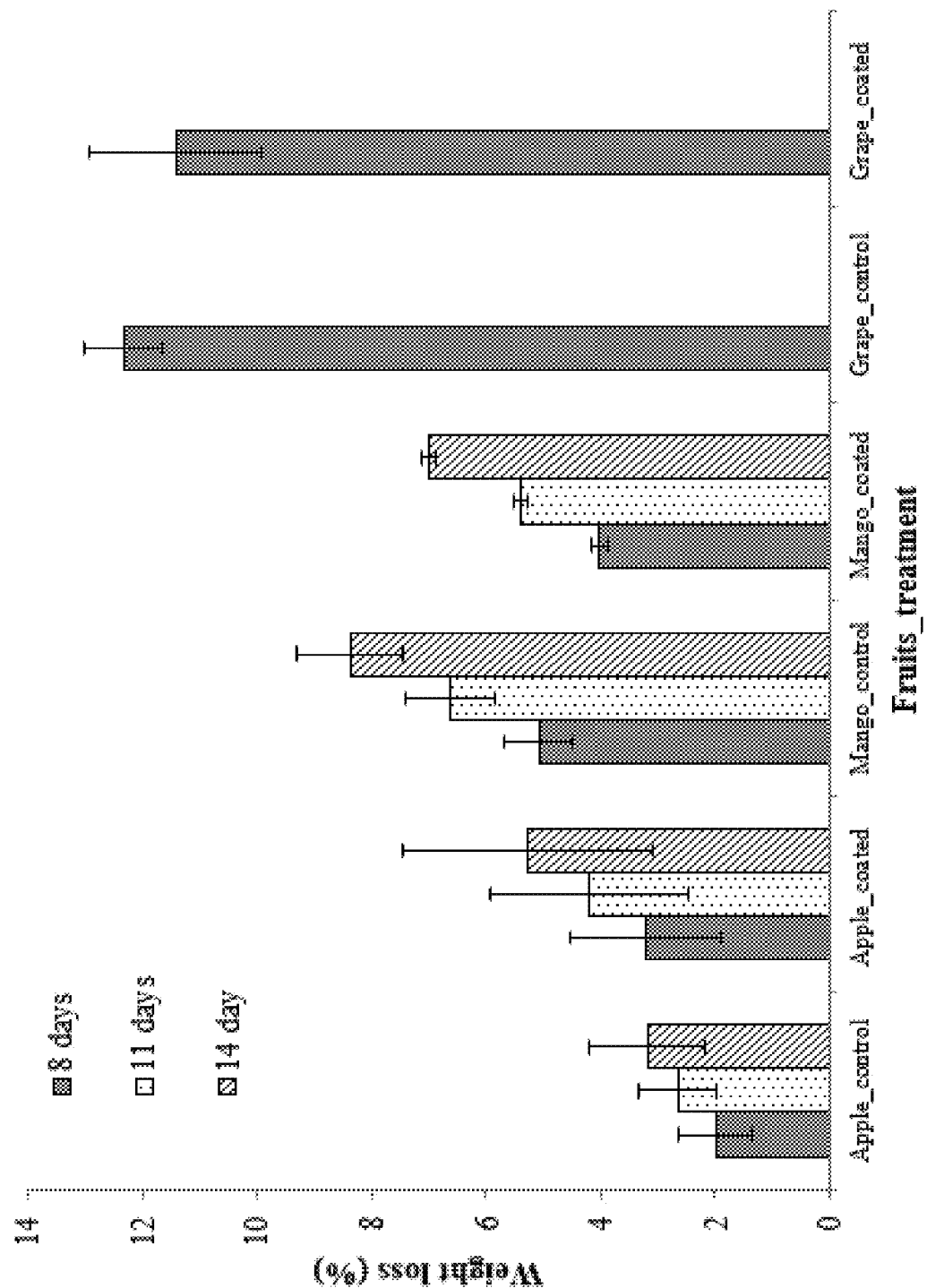
FIG. 33 is a graph illustrating the weight loss of uncoated and coated fruits (the coated fruits coated with a composition comprising 1.5% CNF and 0.1% MCC applied by spraying) during 14 days of storage.
Figure 34A:
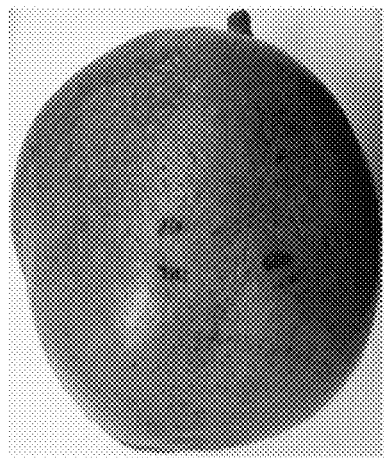
FIGS. 34A-34F is a series of photographic images of uncoated and coated mangoes after 14 days of storage at the ambient conditions.
Figure 34B:
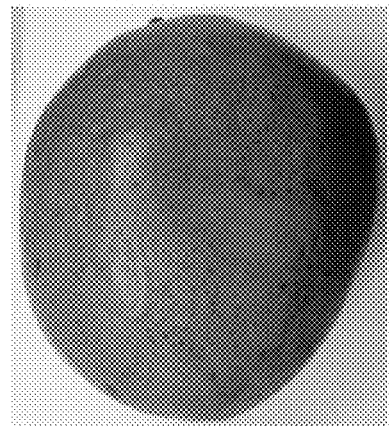
Figure 34C:
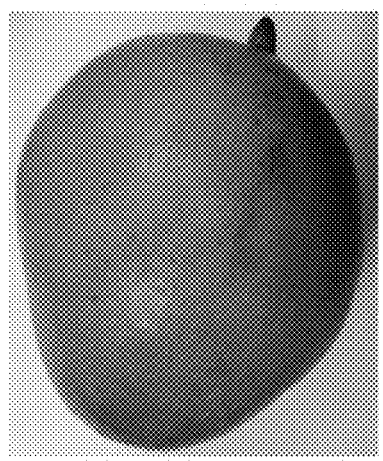
Figure 34D:
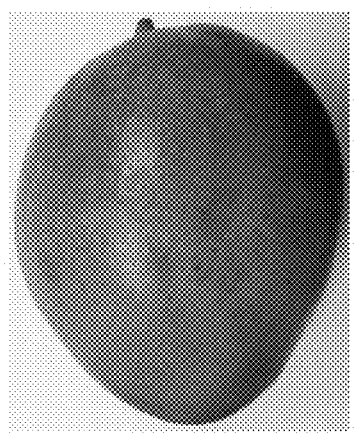
Figure 34E:
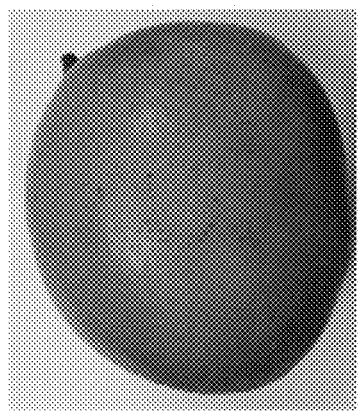
Figure 34F:
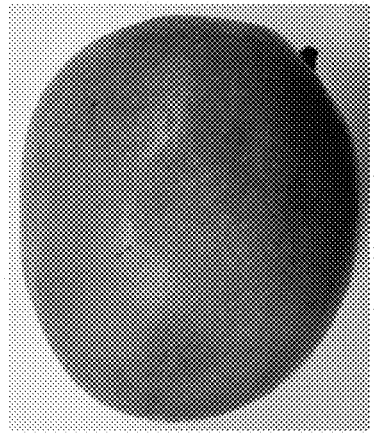

FIG. 33 illustrates the weight loss of uncoated (control) and 1.5% cellulose nanofibrils (CNF)/0.1% micro calcium carbonate (MCC) coated apples, mangoes, and grapes during 14 days of storage under ambient conditions. There was no significant difference of weight loss (%) between uncoated and coated-apples and grapes, whereas the weight loss of coated-mango was significantly reduced in comparison with that of uncoated mango in 8, 11, and 14 days of storage.

Figure 35:
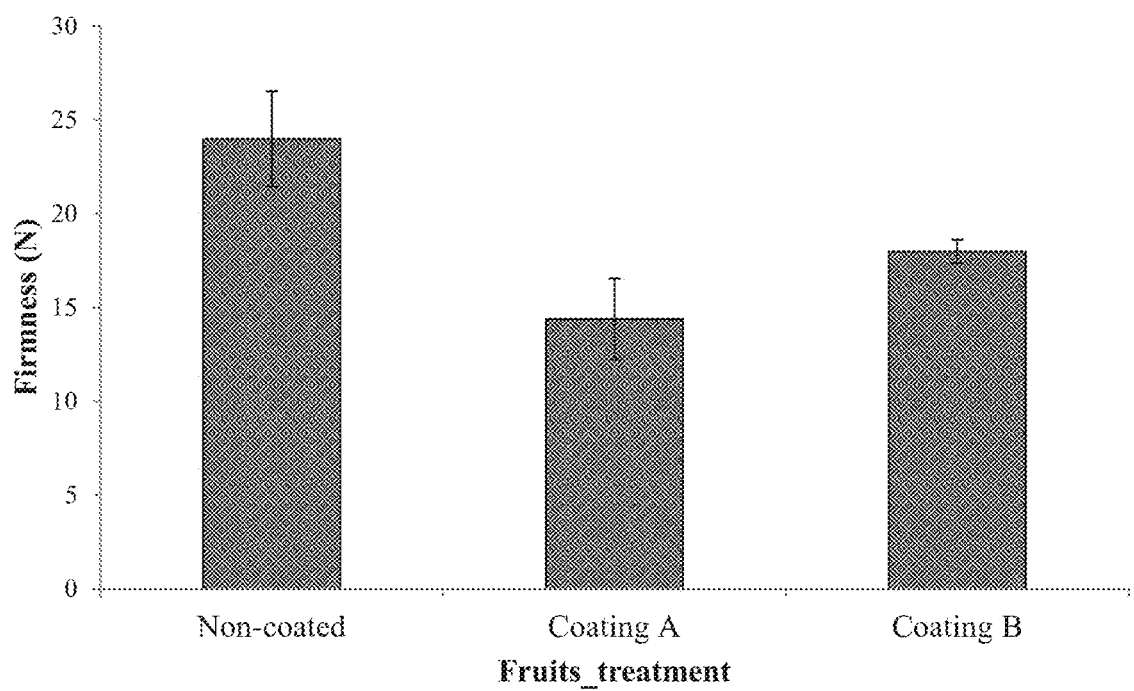
FIG. 35 is a graph of the firmness (expressed in Newtons, "N") of the mangoes illustrated in FIGS. 34A-34F.

After 14 days of storage at the ambient conditions, uncoated mango became more reddish (dark yellow and brown) color along with wrinkles and shrinkage due to the water loss and possible high respiration, whereas less changes in fruit color and water loss were observed in coated mango (See FIGS. 34A-34F. The coated mangoes were covered with a film made from two different coating compositions, 1.5% cellulose nanofibrils (CNF)/0.1% micro calcium carbonate (MCC) or 1.5% CNF/0.1% MCC/0.1% carboxymethyl cellulose (CMC). Each coating composition was applied by spray coating. The texture of these mango samples was determined by a texture analyzer (TA.XT2, Stable MicroSystems Ltd., Surrey, UK) with a 5 kg load cell and a 50 mm cylindrical flat head probe (P50). Firmness was measured by compression at 50% strain and a compression rate of 1 mm s$^{-1}$. The maximum peak force was expressed as firmness (N). Average (n=3) was calculated by excluding the highest and the lowest values. Results show that coated mango exerts significantly lower firmness than non-coated mango (FIG. 35), and this result can be closely related to the high dehydration of non-coated mango. Hence, coating was able to retain the original texture of mango by preventing water loss and delay post-harvest respiration.

For determining the effect of cinnamon leaf essential oil in combination with CNF/MCC coating for inhibition of gray molds grown on grapes, about 100 g of grapes was put into plastic bag with 100 mL of distilled water, and stored at the ambient conditions. After 3 days of storage, it was observed that mold appeared on non-coated grapes (FIG. 36A), but not on grapes comprising a film obtained from the disclosed coating composition. However, the changes in the color of grapes were observed in coated grapes, probably due to the formation of brown condensation products from the reactions between anthocyanin and phenolic acids from cinnamon leaf essential oil (FIG. 36B, which illustrates grapes coated with a composition comprising 1.5% CNF, 0.1% MCC, and 2.5% CLE, and 36 C, which illustrates grapes coated with a composition comprising 1.5% CNF, 0.1% MCC, 0.1% CMC, and 2.5% CLE). The white materials observed in the film of the coated grapes can be removed by a suitable washing process.

In yet additional examples, mold growth can be prevented using compositions comprising about 0.1% to about 0.75% CNF, about 0.01% to about 0.5% potassium sorbate, about 0.05% to about 0.5% micro calcium carbonate or nano titanium dioxide, about 0.01% to about 0.5% of a surfactant (e.g., polyoxyethylene (80) sorbitan monolaurate, sorbitan monolaurate, or sorbitan monooleate), about 0.01% to about 0.5% of a plasticizer (e.g., glycerol, sorbitol, or PEG 400), or any combination thereof.

Figure 37:
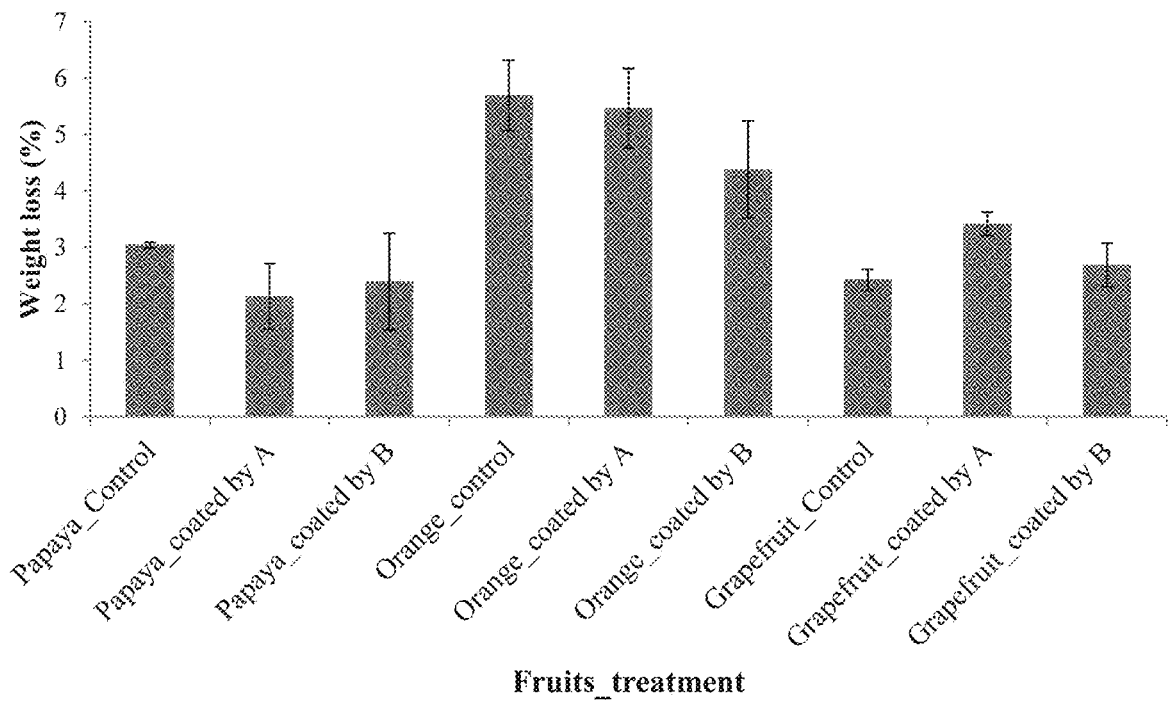
FIG. 37 is a graph illustrating weight loss of uncoated and coated papayas after 3 days of storage under ambient conditions, and exemplary citrus fruits after 5 days during storage under ambient conditions. "A" refers to a coating composition comprising 1.5% cellulose nanofibrils (CNF)/ 0.1% micro calcium carbonate (MCC) with 2.5% cinnamon leaf essential oils (CLE); "B" refers to a coating composition of CNF/MCC/carboxymethyl cellulose (CMC) with 2.5% CLE.

Another example included coated papayas, oranges, and grapefruits and two different coating compositions, "Treatment A" using 1.5% CNF, 0.1% MCC, and with 2.5% cinnamon leaf essential oils (CLE), and "Treatment B" using 1.5% CNF, 0.1% MCC, and 0.1% CMC with 2.5% CLE. Coated papaya (treatment A,) showed significantly lower weight loss in comparison with a control papaya (no coating) after 3 days of storage under ambient conditions. No significant decrease of weight loss was observed in coated citrus fruits after 5 days of storage at the ambient condition (FIG. 37).

Example 16

Cellulose nanofiber (CNF) was obtained from University of Maine (USA). The following chemical reagents were used for the experiments: Folin-Ciocalteu's phenol reagent (EMP Biomedicals, LLC., CA, USA), gallic acid (Sigma-Aldrich Co. LLC., MO, USA), acetic acid (Avantor Performance Materials International, Inc., PA, USA), L-Ascorbic acid (Avantor Performance Materials International, Inc., PA, USA), 2,2-diphenyl-1-picrylhydrazyl (DPPH) (95%) (Alfa Aesar, MA, USA), hydrochloric acid (HCl) (EMD Chemicals Inc., Gibbstown, USA), sodium acetate (EMD Chemicals Inc. Gibbstown, USA), potassium chloride (KCl) (EMD Chemicals Inc., Gibbstown, USA), sodium carbonate (EMD Chemicals Inc., Gibbstown, USA), and trifluoroacetic acid (EMD Chemicals Inc., Gibbstown, USA). Analytical grade methanol, ethanol, and acetone were used for the extraction of anthocyanins. Carboxymethyl cellulose (CMC), methyl-cellulose (MC), and sodium alginate (SA) were obtained from Sigma-Aldrich (MO, USA), Hercules Inc. (DE, USA), and TIC Gums, Inc. (MD, USA), respectively.

Sample Preparation

Figure 38:
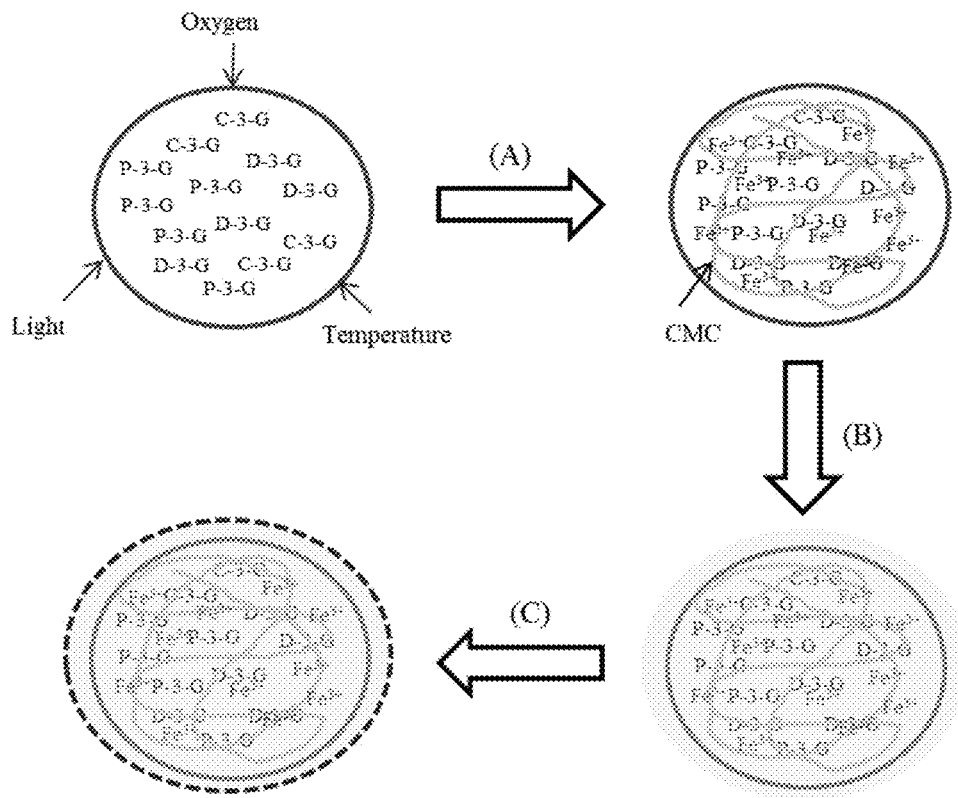
FIG. 38 is a schematic diagram illustrating steps of an embodiment of a disclosed thermal processing method, wherein step (A) involves polysaccharide (carboxymethyl cellulose, CMC)-metal ($FeCl_3$)-anthocyanin complexation; step (B) involves forming a cellulose nanofiber (CNF) coating containing $CaCl_2$ and/or methyl cellulose (MC); and step (C) involves using a sodium alginate treatment to form a second layer coating (referred to as a layer-by-layer (LBL) coating system).

The sample preparation procedures from complexation to LBL coating are illustrated in FIG. 38. Fresh blueberries (Californian Giant, Inc., CA, USA and Hurst Berry Farm, OR, USA) were soaked in ENVIRONNE™ (Consumer Health Research Inc., OR, USA) for 10 minutes to wash out remained substances (pesticides and waxes) on fruit surfaces, and dried at the ambient temperature. Two different complexation compositions were applied at ambient conditions: 1) $Fe^{3+}$-anthocyanin and 2) CMC-$Fe^{3+}$-anthocyanin. For $Fe^{3+}$-anthocyanin complexation, blueberries were soaked in 1% $FeCl_3$ solution for 30 minutes and then dried under air-flow fan. For CMC-$Fe^{3+}$-anthocyanin complexation, fruits were soaked in 1% $FeCl_3$ solution for 30 minutes, followed by soaking in 0.1% CMC at pH 6.5 phosphate buffer for another 30 minutes, and then dried under air-flow fan.

Two different CNF coating formulations were prepared: 1) 0.75% CNF containing 0.5% $CaCl_2$ and 2) 0.75% CNF containing 0.5% $CaCl_2$ and 0.5% MC in distilled water (w/w). Coating formulations were sprayed onto fruit surfaces using an air-spray gun (25-30 psi), and dried at the ambient temperature under air-flow fan. For further applying SA-based hydrogel coating onto CNF coating layer, coated fruits were put into 0.5% SA bath for 5 minutes, and then transferred to a 3% $CaCl_2$ bath for 5 minutes to form reverse and basic spherifications, respectively. After washing by distilled water to remove the residual $CaCl_2$ compounds, prepared fruit samples were put into glass jars containing 15% sucrose solution with pH 4.0 (adjusted by 1% formic acid), and then thermally processed at a 93° C. water bath (Precision, Winchester, Va., USA) for 7 minutes to stimulate canning process conditions for berry fruits. The hot jars were cooled in a cold water bath to reach ambient temperature, and stored at the ambient conditions for 2 days before analysis. Anthocyanins, total phenolics content, percent polymeric color, color, total soluble solid, pH, and texture property of fruits, as well as total monomeric anthocyanin, percent polymeric color, and total phenolic contents of the packing solutions were all analyzed.

Extraction of Phenolic Compounds from Fruits

Samples were extracted using 60% methanol at 1:10 (sample:methanol) ratio for 20 minutes using a sonication unit (B-200H, Branson, USA) in 50 mL of centrifuge tubes (VWR International LLC., PA, USA) based on the optimized extraction conditions developed from our laboratory (data not shown). The obtained extracts were centrifuged (International Equipment Co., Boston, Mass., USA) at 10,000 g at 4° C. for 10 minutes and filtrated through the Whatman No. 1 filter paper. Methanol was evaporated at a vacuum rotary evaporator (Brinkmann Instruments, Westbury, N.Y., USA) at 40° C., and resulting extracts were redissolved in citric buffer (pH 3.5) at a 25 mL of volumetric flask. The extracts were stored at −80° C. freezer (VWR International LLC., PA, USA) till the further analysis on TPC, TMA, and PPC.

Analysis of Monomeric Anthocyanins, Total Phenolics Content, and Percent Polymeric Color of Fruit and Packing Solution TMA content was determined using a pH-differential method. The aqueous extracts were appropriately diluted with 0.025 mol/L potassium chloride buffer (pH=1.0) and 0.4 mol/L sodium acetate buffer (pH=4.5), respectively. The mixture was homogenized at room temperature for 15 min. The absorbance difference between pH 1.0 and pH 4.5 for the diluted extracts was determined at both $\lambda_{vis\text{-}max}$ and 700 nm, respectively. TMA value was calculated using the following formula:

$$A = [(A_{\lambda vis\text{-}max} - A_{700\ nm})_{pH\ 1.0} - (A_{\lambda vis\text{-}max} - A_{700\ nm})_{pH\ 4.5}]$$

$$TMA = (A \times MW \times DF \times Ve \times 1000)/(\varepsilon \times 1 \times M)$$

where $\lambda_{vis\text{-}max}$ was the maximal wavelength where the absorbance peak showed the highest value within the visible range, MW was the molecular weight of cyanidin 3-glucoside (449.2 g/mol), DF was the dilution factor, Ve was the extract volume, ε was the molar extinction coefficient of cyanidin 3-glucoside (26,900 L/mol·cm), and M was the mass of the fruit powders. The results were expressed as cyanidin 3-glucoside equivalent (Cy-3-Glu) mg/100 g FW. TPC was measured using the Folin-Ciocalteu (FC) reagent-based colorimetric assay. Briefly, a 0.5 mL of diluted extract or 0.5 mL of 0.1, 0.3, 0.5, and 0.7 mg/mL gallic acid solution (used as standard) was mixed with 0.5 mL of FC reagent and 7.5 mL of DI water, respectively. A 0.5 mL of DI water was used as control. The mixtures were vortexed at room temperature for 10 min, and then transferred into a 40° C. water bath with the addition of 3 mL of 20% sodium carbonate (w/v) for another 20 min. Samples were then immediately cooled to room temperature in an ice bath for 3 minutes, and the absorbance of samples and standards were measured at 765 nm using a Shimazu UV160U spectrometer (Shimazu Corp., Kyoto, Japan). The results are expressed as gallic acid equivalent (GAE) mg/g fresh material (FW).

Percent polymeric color (PPC) of the fruits was determined using the method of Cao et al. Briefly, 0.2 mL of 0.2 g/mL potassium metabisulfite was added into 2.8 mL of diluted sample (bleached sample), whereas 0.2 mL of distilled water was also added to 2.8 mL of diluted sample (control sample). After equilibrating for 30 minutes at ambient conditions, the absorbance of the bleached and control sample was evaluated at wavelength of 420 nm, $\lambda_{vis\text{-}max}$, and 700 nm, respectively using a UV/Vis spectrophotometer (Shimadzu, Japan). Color density of control sample and polymeric color of thermally processed sample were calculated using the following equations, respectively.

$$\text{Color density or polymeric color} = [(A_{420\ nm} - A_{700\ nm}) + (A_{\lambda vis\text{-}max} - A_{700\ nm})] \times \text{dilution factor}$$

Percent polymer color was further calculated as: (polymeric color/color density)×100%.

By considering the possible leaching of anthocyanin pigments from fruits into packing solution during thermal process and storage, TPC, TMA, and PPC of packing solutions were also analyzed using the same methods described above.

Physicochemical Properties of Blueberries

Color and total soluble solid content (TSS, °Brix) of fruits were measured using a colorimeter (HunterLab LabScan® XE Spectrophotometer, VA, USA) and a refractometer (Brix RA-250 HE, Kyoto Electronics Manufacturing Co. Ltd., Kyoto, Japan), respectively. Fruit pH and titratable acidity (TA) were determined using the following procedure. Briefly, five berries were randomly collected, weighed, mixed with distilled water at 1:9 (w/w) ratio, and blended for 1 minute using a homogenizer (Osterizer, Jarden Corp., Mexico). The mixture was filtered through qualitative filter paper to remove insoluble materials. The filtrate was titrated with a standardized 0.1 N aqueous NaOH solution up to an endpoint of pH 8.2 by using a pH meter (Corning 125, Corning Science Products, MA, USA). TA values were calculated based on the assumption that citric acid was the predominant acid in blueberries. Firmness was measured using a Texture Analyzer (TA.XT2, Stable Micro Systems, Inc., UK), where individual fruit was compressed for a total deformation of 3 mm between two parallel plates at a speed of 0.5 mm/s. The stem-calyx axis of blueberries was placed in parallel onto the compression plates. Firmness index was calculated as the slope of force/deformation curves between 0.5 and 2.5 mm of displacements, and represented as N/mm.

To determine the effect of complexation and coating on fruit weight after thermal treatment and storage, the weight change (%) of fruits was calculated as the weight of processed fruits subtracted with the initial weight of fresh fruits divided by the initial fruit weight, and multiplied by 100.

Microscopic Analysis

For evaluating adhesion of coatings onto fruit surface, images on the cross-sections of non-coated and coated fruits (CNF/$CaCl_2$ and CNF/$CaCl_2$/MC coatings) before thermal process were taken using a stereomicroscope (Leica Microsystems AG, Heerbrugg, Switzerland) equipped with an extended digital camera (Q imaging, Surrey, British Columbia, Canada).

The morphology of CNF film incorporating with $CaCl_2$ and/or MC were analyzed using the AmRay 3300 FE Field emission scanning electron microscope (SEM) (AmRay, Bedford, Mass., USA). To determine the LBL coating system, CNF/$CaCl_2$ and CNF/$CaCl_2$/MC films were treated at 0.5% SA bath for 10 minutes, dried at 50° C. for 24 hours, and then stored in a desiccator for 1 day. Prepared film pieces were mounted on aluminum stubs with the cross section oriented up, and coated by a gold-palladium alloy sputter coater (Edwards model S150B sputter coater; BOC Edwards Vacuum, Ltd., West Sussex, UK) to improve the interface conductivity. Digital images were collected at an accelerating voltage of 5 kV.

To quantify the amount of $CaCl_2$ released from the CNF/$CaCl_2$ and CNF/$CaCl_2$/MC films, Ca and Cl contents in the films before and after the films were soaked in water were measured using dispersive X-ray analysis (EDXA). The result would show the reactions of $CaCl_2$ released from CNF with SA to help interpret the adhesion of SA based second layer of hydrogel coating onto the CNF coating based on the crosslinking between $Ca^{2+}$ and alginic acid within the short reaction time.

Experimental Design and Statistical Analysis

A randomized factorial design with 2 treatment factors was applied in this study. Factor A (complexation type, CT) had three levels: non-complexation, $Fe^{3+}$-anthocyanin complexation, and CMC-$Fe^{3+}$-anthocyanin complexation. Factor B (coating formulation, CF) included three types: non-coated, coated by 0.75% CNF containing 0.5% $CaCl_2$, and coated by 0.75% CNF containing 0.5% $CaCl_2$ and 0.5% MC. Replication was also considered as the main effect due to the large variations among individual fruits. Non-complexed and non-coated blueberries subjected to the same thermal process and fresh blueberries without any treatment were considered as controls. All experiments were performed in duplicate, and the results were analyzed for statistical significance via multi-way analysis of variance (ANOVA), with post hoc testing using least significant difference (LSD) by means of statistical software (SAS v 9.2, The SAS Institute, USA). Results were considered to be significantly different at $p<0.05$.

The Effect of Complexation and CNF/SA LBL Coatings

Figure 39A:
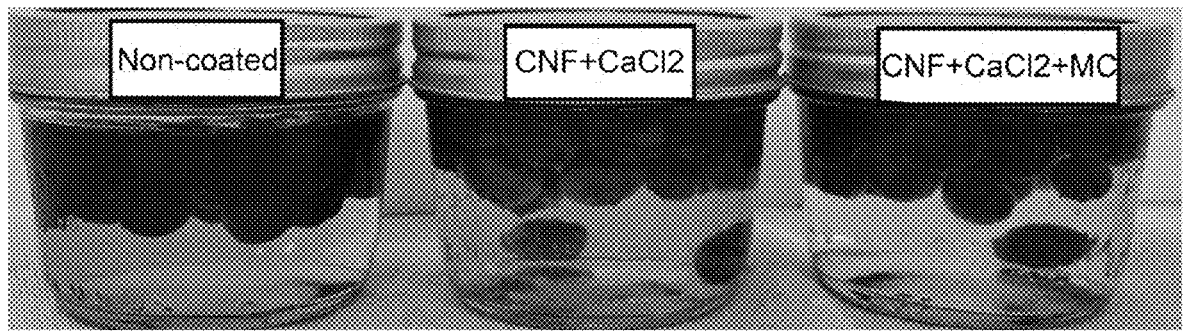
FIGS. 39A-39C are photographs of pretreated samples after being subjected to thermal processing at about 93° C. for approximately 7 minutes and ambient storage for two days and wherein a second layer coating with sodium alginate was applied on the samples comprising a CNF coating.
Figure 39B:
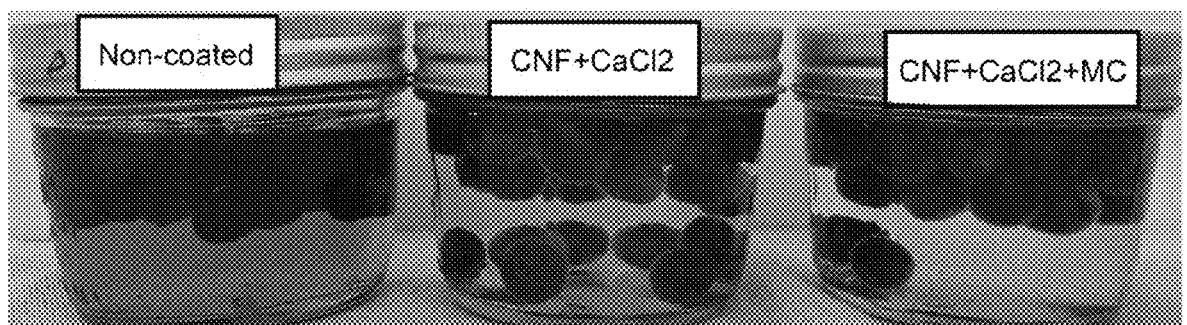
Figure 39C:
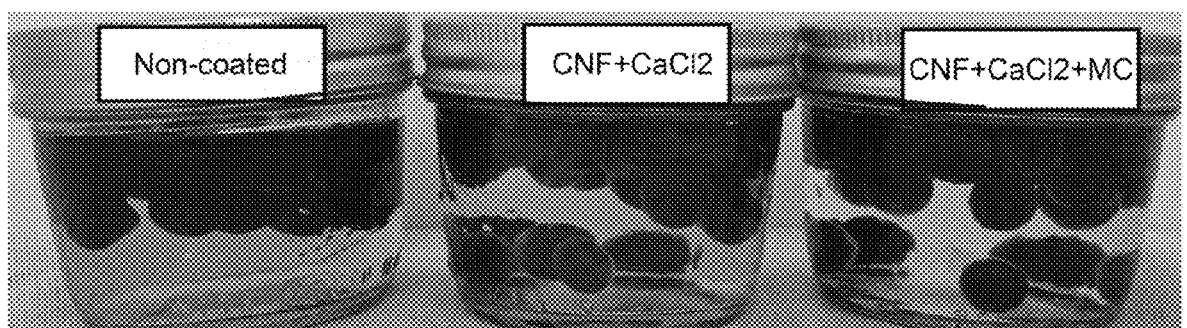

Fruit samples subjected to different complexation and/or CNF/SA LBL coating, followed by thermal process and storage at the ambient conditions for 2 days, are illustrated in FIGS. 39A-39C. For non-coated fruits, it was observed that anthocyanin pigments were leached from fruits into the packing media regardless of complexation types ("non-coated" embodiment of FIG. 39A, FIG. 39B, and FIG. 39C). Moreover, $Fe^{3+}$-anthocyanin complexation (FIG. 39B) resulted in more pigment leaching than both non-complexation (FIG. 39A) and $Fe^{3+}$-CMC-anthocyanin complexation (FIG. 39C). Heating can cause dissociation of the copigmented anthocyanins and a $Fe^{3+}$-anthocyanin complex can be dissociated in acidic media. Hence, thermally processed fruits packing in the acidic media (pH of 4.0 in this study) could exert the dissociation of $Fe^{3+}$-anthocyanin complex, and some embodiments led to pigment loss with a similar rate to that of control (non-complexation) or even worse. In some embodiments, it was found that fruits subjected to CMC-$Fe^{3+}$-anthocyanin complexation had less pigment leach than that of $Fe^{3+}$-anthocyanin complexed one (FIG. 39C). Nonetheless, both $Fe^{3+}$-anthocyanin and CMC-$Fe^{3+}$-anthocyanin complexation did not prevent leaching of anthocyanin pigments into the aqueous media since both were dissociated and/or degraded by heat and acid.

The effect of each treatment factor and their interactions on the anthocyanin retention and physicochemical properties of fruits are reported in Table 16. Color, TA, TMA, and PPC of processed fruits were significantly ($p<0.05$) affected by the replication factor due to large variations among individual fruits. Weight change (%), firmness index (N/mm), and TTS of fruits were significantly affected by CF. For these three measurements, post hoc testing using least significant difference (LSD) was conducted and is reported in Table 17. The weight of CNF/SA LBL coated fruits were significantly ($p<0.05$) increased (10.7-14.0% increase) after thermal treatment and storage, whereas those of non-coated fruits lost weight (0.5-2.7% decrease). The weight loss in non-coated fruits could be due to the hydrolyzation of pectin in fruit skin and pigment leaching into packing solution during thermal treatment and storage. The weight gain in CNF/SA LBL coated fruits might be contributed by the weight of both hydrogel type of SA coating and CNF coating. This CNF/SA LBL coating system also significantly ($p<0.05$) improved the firmness index and TSS of fruits in comparison with non-coated ones.

TABLE 16

Analysis of Variance (ANOVA) Table (P = 0.05) for Analyzing the Significance of Each Treatment Factor Including Replication, Complexation Types (CT), and Coating Formulations (CF), and the Interactive Effect between TC and CF in Thermally Processed Blueberries Stored at the Ambient Conditions for 2 Days

| | df | wt change | firmness index | Chroma | ΔE | pH | TA[a] | TSS[b] | TPC[c] | TMA[d] | PPC[e] |
|---|---|---|---|---|---|---|---|---|---|---|---|
| | | | | | | P-value | | | | | |
| | | | | | Main effects | | | | | | |
| Replications | 1 | 0.0665 | 0.7927 | 0.0007 | 0.0001 | 0.5685 | 0.0008 | 0.7523 | 0.4929 | 0.0025 | 0.0413 |
| Complexation type (CT) | 2 | 0.3639 | 0.2168 | 0.2720 | 0.6170 | 0.9521 | 0.9914 | 0.0446 | 0.6564 | 0.3817 | 0.0805 |
| Coating formulstions (CF) | 2 | <.0001 | 0.0032 | 0.7468 | 0.0969 | 0.5294 | 0.1381 | 0.0037 | 0.1748 | 0.2126 | 0.7920 |
| | | | | | Interaction effects | | | | | | |
| CT × CF | 4 | 0.1375 | 0.2138 | 0.1558 | 0.3576 | 0.9969 | 0.6738 | 0.7146 | 0.9254 | 0.5951 | 0.2157 |
| Model | 9 | <.0001 | 0.0297 | 0.0218 | 0.0058 | 0.9819 | 0.0362 | 0.0314 | 0.6731 | 0.0646 | 0.1282 |
| Error | 8 | | | | | | | | | | |
| Corrected total | 17 | | | | | | | | | | |

[a]Titratable acidity;

[b]Total soluble solid;

[c]Total phenolic content.

[d]Total monomeric anthocyanin;

[e]Percent polymeric color

TABLE 17

The Effect of Complexations and Cellulose Nanofiber (CNF) Coating Treatments on Weight Change (%), Firmness Index (N/mm), and Total Soluble Solid (TSS, ° Brix) of Thermally Processed Blueberries Stored at the Ambient Conditions for 2 Days+

| Complexation types (CT) | Coating formulations (CF) [a] | Weight change (%) | Firmness index (N/mm) | TSS (° Brix) |
|---|---|---|---|---|
| Non-complexation | Non-coated | $-1.95^{A}$ [c] | $65.30^{CDE}$ | $12.22^{BCD}$ |
|  | $CNF/CaCl_2$ | $13.00^{A}$ | $79.19^{ABCD}$ | $14.29^{AB}$ |
|  | $CNF/CaCl_2/MC$ [b] | $11.37^{A}$ | $109.75^{A}$ | $14.54^{AB}$ |
| $FeCl_3$ complexation | Non-coated | $-2.69^{B}$ | $38.08^{E}$ | $11.90^{CD}$ |
|  | $CNF/CaCl_2$ | $13.56^{A}$ | $90.24^{ABC}$ | $14.30^{AB}$ |
|  | $CNF + CaCl_2 + MC$ | $13.93^{A}$ | $97.79^{AB}$ | $15.76^{A}$ |
| $FeCl_3 + CMC$ complexation | Non-coated | $-0.51^{B}$ | $51.98^{DE}$ | $10.32^{D}$ |
|  | $CNF/CaCl_2$ | $10.87^{A}$ | $81.73^{ABCD}$ | $13.25^{BC}$ |
|  | $CNF/CaCl_2/MC$ | $10.71^{A}$ | $71.37^{BCD}$ | $12.96^{BC}$ |

[a] All coated fruits were also subjected to SA second layer coatings. Weight change (%) was calculated as the weight of processed fruits subtracted with the initial weight of fresh fruits divided by the initial fruit weight, and multiplied by 100.
[b] MC = methylcellulose.
[c] Means followed by the capital letter in the same column were not significantly different (P > 0.05).

Figure 40:
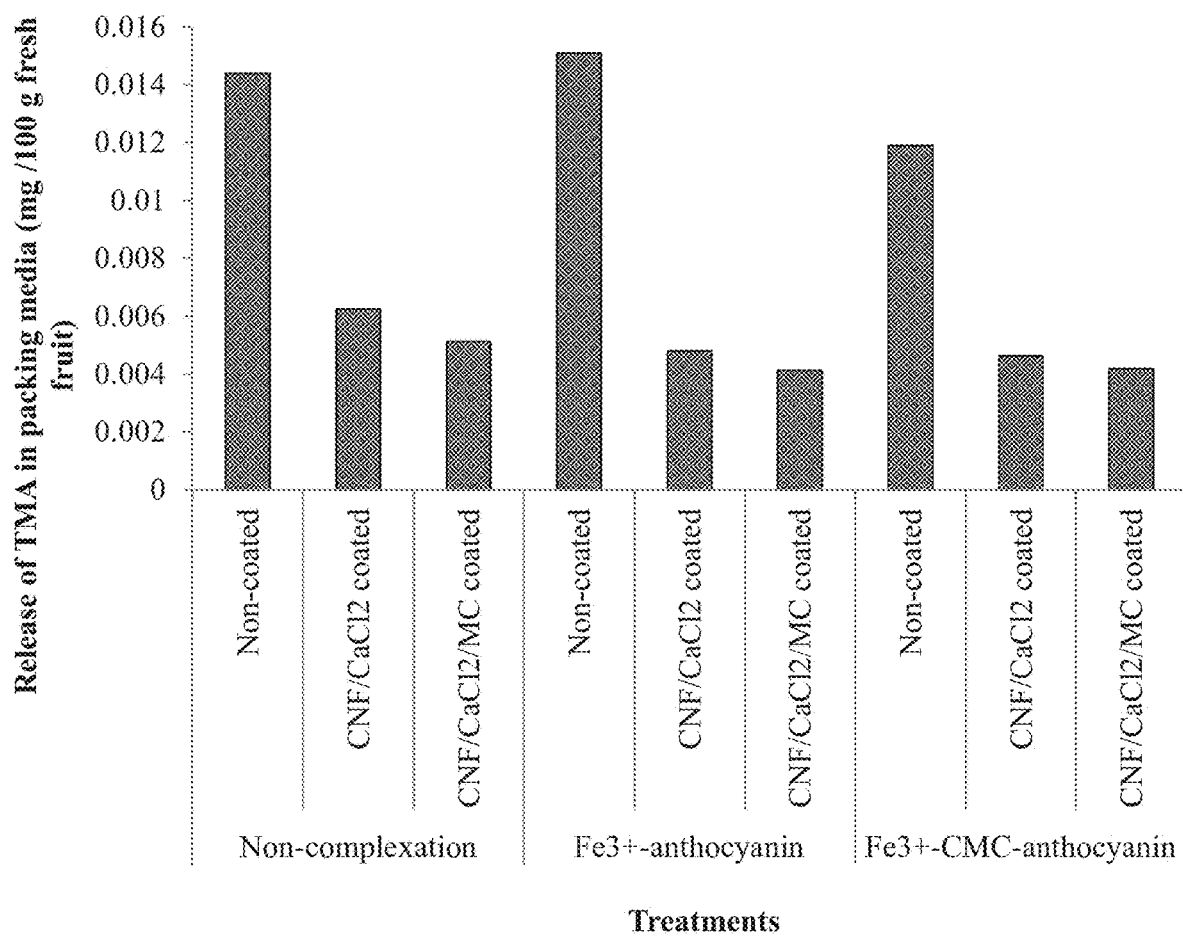
FIG. 40 illustrates results obtained from the analysis of variance (ANOVA) results (P=0.05) for analyzing independence or interactions among various treatment factors (described in Table 18) and the amount of released total monomeric anthocyanins (TMA, mg cyanidin 3-glucoside/ 100 g fresh fruit) in the packing media from thermally processed blueberries subjected to different treatments and stored at the ambient conditions for 2 days. Second layer sodium alginate coating was applied on all samples coated by CNF.

The ANOVA of TPC, TMA, and PPC of the packing solution along with post hoc testing results of TMA are presented in FIG. 40 and Table 18. CF showed significant (p<0.05) effect on TPC and TMA. Due to the significant (p<0.05) effect of the replication factor on TPC, post hoc testing was only conducted for TMA (FIG. 40). CNF/SA LBL coatings significantly (p<0.05) prevented TMA leaching from fruits into the packing media in comparison with non-coated ones. These results demonstrated that CNF/SA LBL coating system was successful in retaining anthocyanin pigments in thermally processed fruits packing in aqueous media.

TABLE 18

The ANOVA of TPC, TMA, and PPC of the packing solution along with post hoc testing results of TMA P-value

|  | df | TPC+ | TMA | PPC++ |
|---|---|---|---|---|
| Main effects |  |  |  |  |
| Replication | 1 | <.0001 | 0.6394 | 0.0005 |
| Complexation type (CT) | 2 | 0.6206 | 0.5823 | 0.7938 |
| Coating formulations (CF) | 2 | <.0001 | 0.0007 | 0.0916 |
| Interaction effects |  |  |  |  |
| CT × CF | 4 | 0.6128 | 0.9152 | 0.9159 |
| Model | 9 | 0.0001 | 0.0175 | 0.0258 |
| Error | 8 |  |  |  |
| Corrected total | 17 |  |  |  |

The Stability of $Fe^{3+}$-Anthocyanin and $Fe^{3+}$-CMC-Anthocyanin Complexes

Figure 41:
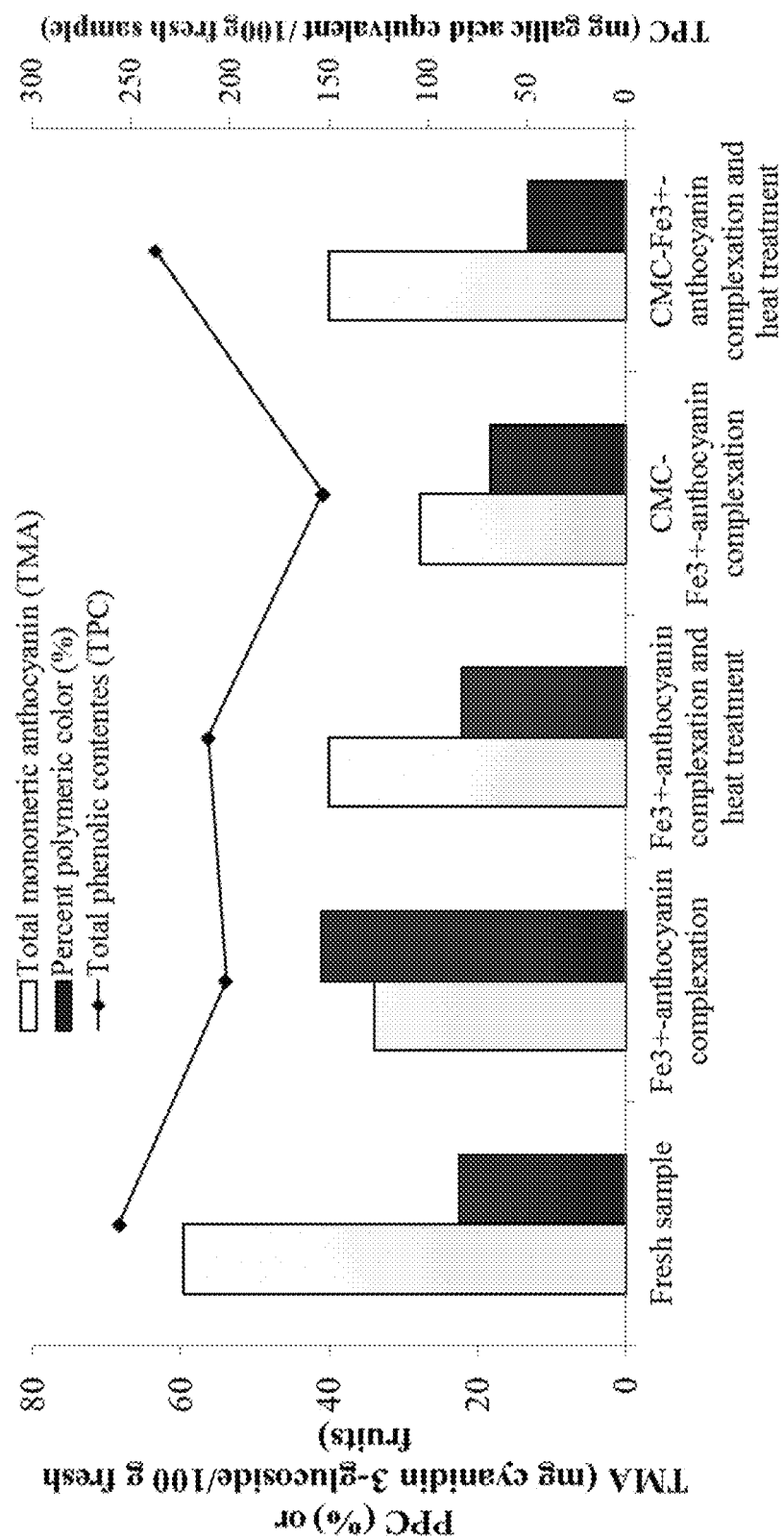
FIG. 41 illustrates results obtained from analyzing the total monomeric anthocyanin (TMA, mg cyanidin 3-glucoside/100 g fresh fruits), total phenolic content (mg gallic acid equivalent/100 g fresh sample), and percent polymeric color (polymeric color/color density*100) of fresh fruits, fruit subjected to complexation, and fruits subjected to complexation then heat treatment at 93° C. for 7 min.

To determine the stability of complexation ($Fe^{3+}$-anthocyanin and $Fe^{3+}$-CMC-anthocyanin) on the thermally processed blueberries packed in aqueous media, TMA, TPC, and PPC of fresh fruits, fruit subjected to complexation, and complexation plus heat treatment at 93° C. for 7 minutes were quantified (FIG. 41). $Fe^{3+}$-anthocyanin complexation induced the polymerization of anthocyanin compounds, led to significantly increase in PPC (41.13%) compared with that of fresh sample (22.49%). Consistently, $Fe^{3+}$-anthocyanin complexation resulted in significantly lower TMA (38.89 mg cyanidin 3-glucoside/100 g fresh fruits) of fruit in comparison with that of fresh sample (59.73 mg cyanidin 3-glucoside/100 g fresh fruits). After the thermal process, however, PPC of fruits subjected to $Fe^{3+}$-anthocyanin complexation was significantly reduced (22.15%), reached to the similar level to that of fresh sample (22.49%). These results indicated that the thermal process dissociated polymerized $Fe^{3+}$-anthocyanin complex in fruits packing in the aqueous media, consistent to the previous report that metal-anthocyanin complex was dissociated by heating process. CMC-$Fe^{3+}$-anthocyanin complexation was not able to induce further polymerization (PPC of 18.26%) in comparison with $Fe^{3+}$-anthocyanin complexation (PPC of 41.13%) even without the thermal treatment. Without being limited to a particular theory of operation, it is currently believed that this result might be related to the stability of $Fe^{3+}$-anthocyanin complexation in aqueous media. While the fruits subjected to $Fe^{3+}$-anthocyanin complexation were soaked in CMC solution, the complex was dissociated before associating with CMC. However, the pigment leaching of fruits treated by CMC-$Fe^{3+}$-anthocyanin complexation was less than that from $Fe^{3+}$-anthocyanin complexation treatment (FIGS. 39A-39C), which might be more related to the cation ($Fe^{3+}$) bridges between fruit pectin and anionic CMC.

Pigment Retention Mechanisms of CNF/SA LBL Coatings

Figure 42A:
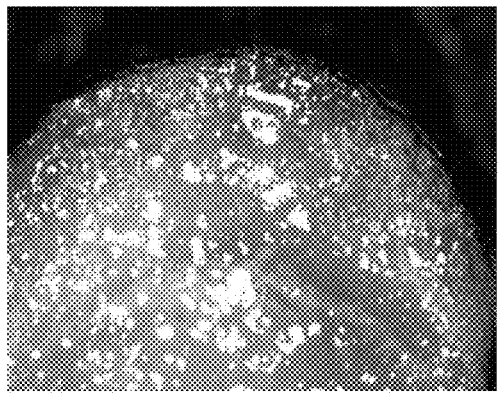
FIGS. 42A-42C are stereomicroscopic images on the cross-sections of fresh or coated blueberries before thermal processing, which illustrate the effect of methyl cellulose (MC) modified CNF on adhesion properties between CNF and fruit surface.
Figure 42B:
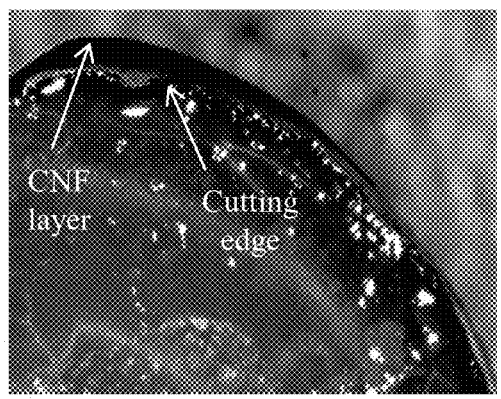
Figure 42C:
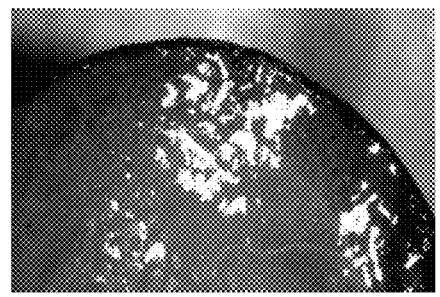

From ANOVA results for fruits and packing media (Tables 16 and 17, and FIG. 40), CF only showed the significant effect on weight change (%), firmness index (N/mm), and TTS of fruits and TPC and TMA of packing media. To determine retention mechanisms of different types of CNF-based coatings and to demonstrate the principal of CNF/SA based LBL coating system, stereomicroscope and SEM were illustrated in FIGS. 42A-42C and FIGS. 43A-43C, respectively. Stereomicroscopic images on the cross-sections of non-coated, $CNF/CaCl_2$-coated, and MC modified CNF/$CaCl_2$-coated fruits without thermal process are illustrated to demonstrate the adhesion of CNF coating onto hydrophobic fruit surface as the first layer of LBL system (FIGS. 42A-42C). Blueberries have visible, white or bluish colored epicuticular wax layer on the surface, which limits the diffusion of hydrophilic coating materials. Although a washing process was applied to remove wax layer on fruit surface in this example, some white substance were still visibly remained after washing. It was observed that MC modified $CNF/CaCl_2$ coating improved the adhesion of the coating onto fruit surface (FIG. 42C) due to modified CNF surface by less hydrophilic methoxyl groups of MC. Two strategies have been commonly applied for enhancing adhesion of coating solutions onto fruit surface. One was to apply surface-active agents, such as emulsifiers and other amphiphilic chemicals, for reducing the surface tension of the coating solution and for decreasing the solid surface energy. Another approach was by means of chemical modifications of biopolymers, introducing hydrophobic groups into their structures. MC modified surface characteristics of CNF coating became more hydrophobic, thus enhancing the adhesion between CNF coating and hydrophobic fruit surface.

Figure 43A:
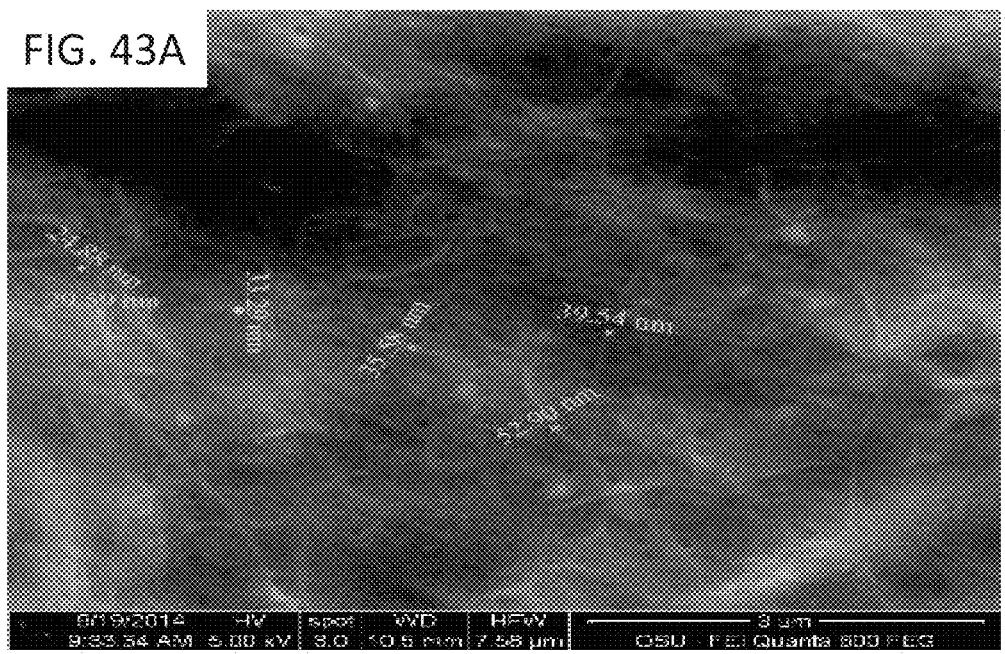
Figure 43D:
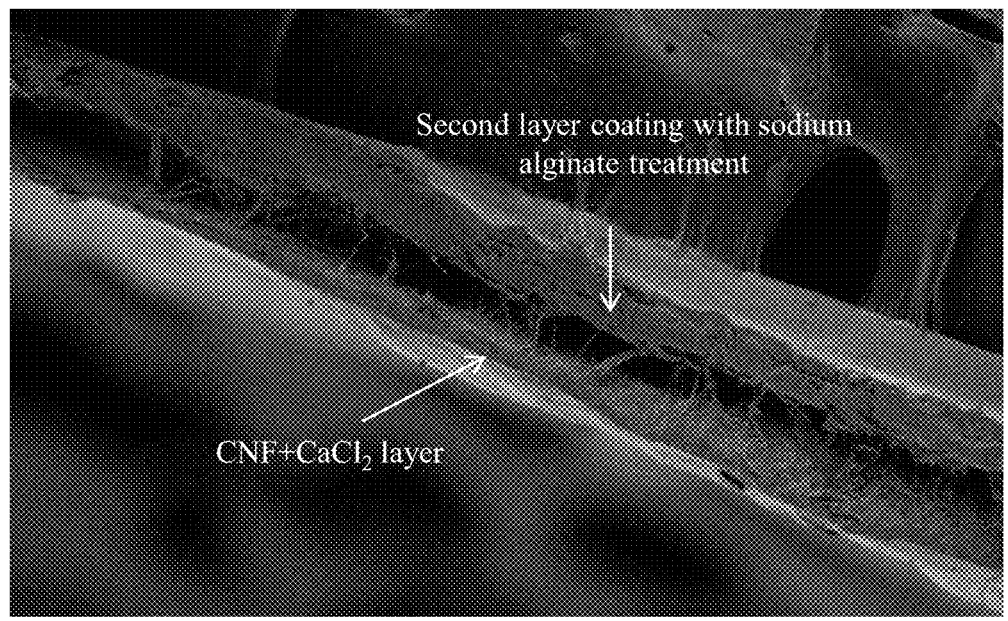
Figure 43E:
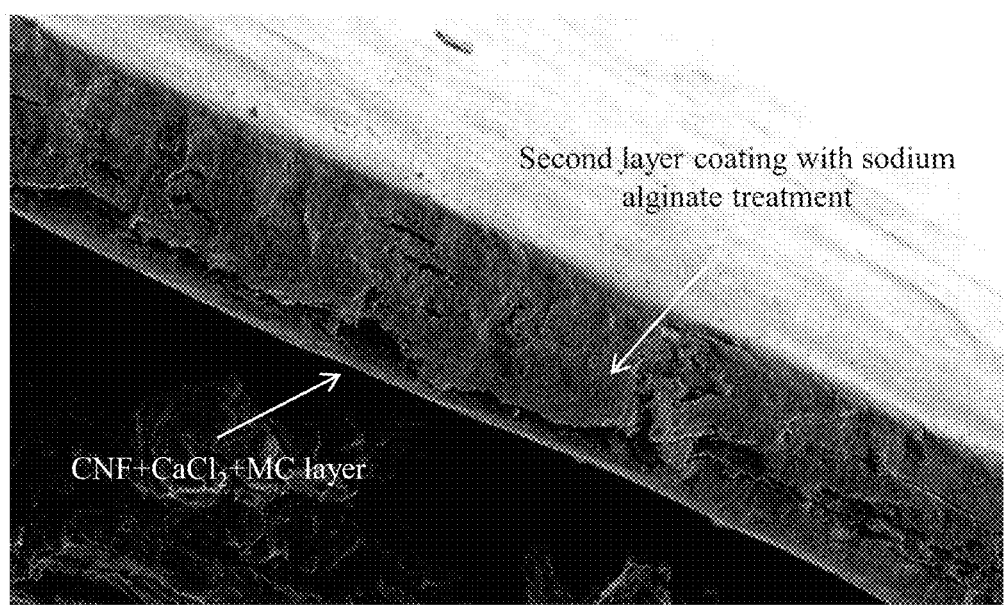

SEM analysis illustrated the CNF morphology incorporating with $CaCl_2$ and/or MC to demonstrate anthocyanin retaining mechanisms of simulated CNF/SA LBL coating system (FIGS. 43A-43C). EDXA evaluated released $CaCl_2$ contents of CNF films after soaking in water, and supported the principal of forming hydrogel SA layer with released $Ca^{2+}$ as the crosslinking agent onto CNF layer. The cross-sectioned sample of simulated CNF/SA LBL film was prepared to demonstrate the development of hydrogel SA layer onto CNF and the effect of MC modified CNF on the interaction with fruit surface and SA layer. It was confirmed that $CaCl_2$ crystals were assimilated on the CNF film matrix (FIG. 43B), and MC modified $CNF/CaCl_2$ film made the surface more homogenous (FIG. 43C) in comparison with CNF and $CNF/CaCl_2$ films (FIGS. 43A and 43B). $CNF/CaCl_2$ coating subjected to SA was able to form impermeable layer of $Ca^{2+}$ crosslinked alginic acid onto CNF since $Ca^{2+}$ was rapidly released from CNF structure. MC modified $CNF/CaCl_2$ induced closer attachment with SA hydrogel than $CNF/CaCl_2$ (FIGS. 43D and 43E) due to the presence of $Ca^{2+}$ as a crosslinking agent between MC and SA. Hence, $CaCl_2$ and MC incorporated CNF was able to develop versatile CNF/SA LBL system, and to improve the association with both fruit surface and SA hydrogel layer, thus prevented leaching of anthocyanin pigments and fruits damages from thermally processed fruit.

$Fe^{3+}$-anthocyanin complexation successfully induced polymerization of anthocyanin pigments in blueberries, but was readily dissociated by heat in the aqueous media. Adding CMC did not enhance the stability of $Fe^{3+}$-anthocyanin complex, probably due to the dissociation of $Fe^{3+}$-anthocyanin complex in CMC solution. Whereas the complexation did not achieve the expected result due to poor stability of $Fe^{3+}$-anthocyanin or $CMC$-$Fe^{3+}$-anthocyanin complex under heat and acidic aqueous media, the cellulose nanofiber (CNF)/sodium alginate (SA) based layer-by-layer (LBL) coating system was successful to prevent leaching of anthocyanin pigments from the thermally processed blueberries. Also, no combined effect between complexation and coating on anthocyanin pigments retention was observed.

For developing water resistant CNF/SA based LBL coating system, $CaCl_2$ and methyl cellulose (MC) were incorporated into CNF coatings. The rapid release of $Ca^{2+}$ from CNF coating helped quick formation of SA hydrogel layer onto the CNF layer through $Ca^{2+}$ crosslinking when CNF coated fruits were soaked in the SA bath. MC further enhanced the quality of LBL coating system by improving the adhesion of CNF coating onto the hydrophobic fruit surface and the interaction with SA layer. The developed coating system was also able to increase firmness index (N/mm) and total soluble solid (TSS, °Brix) of the thermally processed fruits.

Example 17

Figure 44A:
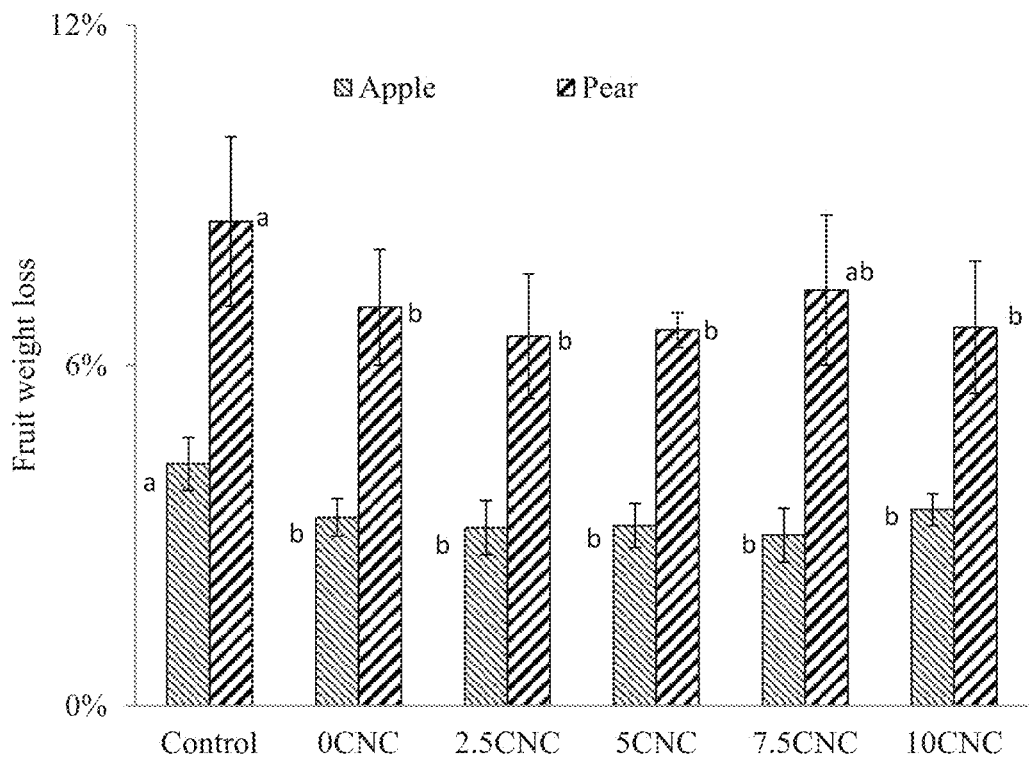
FIGS. 44A and 44B are bar graphs illustrating results obtained from analysis of apples and pears after being coated with a coating composition described herein and being stored for three weeks at ambient temperature.
Figure 44B:
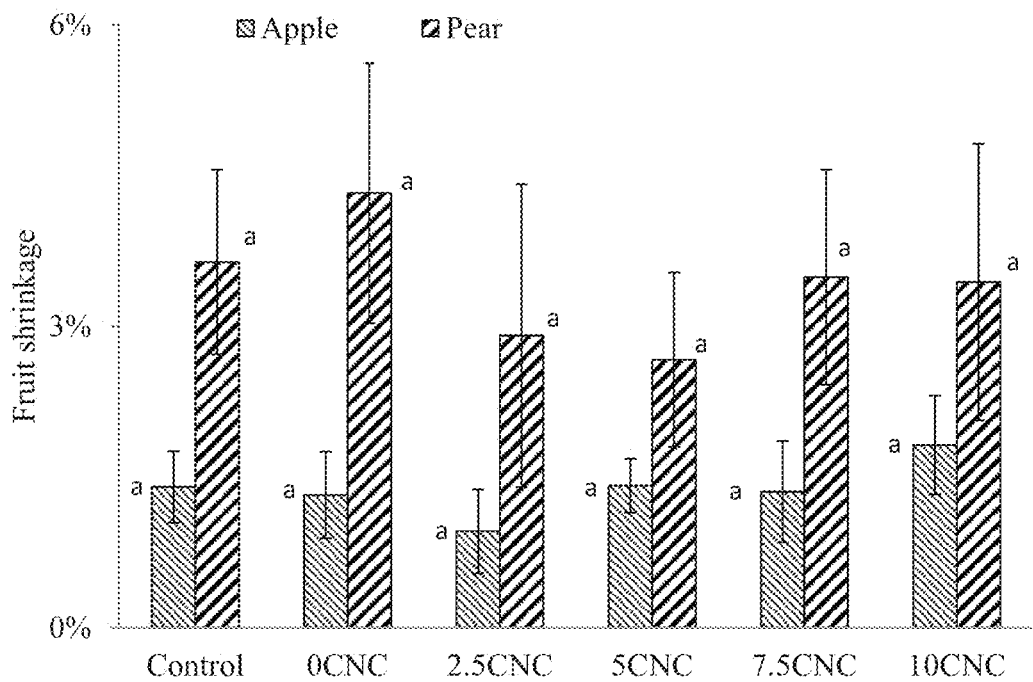

The effect of 2% chitosan coating containing different concentrations (0, 2.5, 5, 7.5, and 10%) of cellulose nanocrystal (CNC, w/w, chitosan dry base) and 10% surfactant (w/w, chitosan dry base) on weight loss (FIG. 44A) and shrinkage (FIG. 44B) was determined for apples and pears after 3-weeks of storage at ambient temperature (20±2° C. and 30±2% RH). With reference to FIGS. 44A and 44B, the same letter placed above each column within same fruit were not significantly different (p>0.05). In some examples, such as for apples and pears, coating treatments significantly reduced weight loss in comparison with non-coated fruits, except for 7.5CNC in pears (FIG. 44A). No difference was observed in fruit shrinkage among coated and uncoated apples and pears (FIG. 44B).

Figure 45:
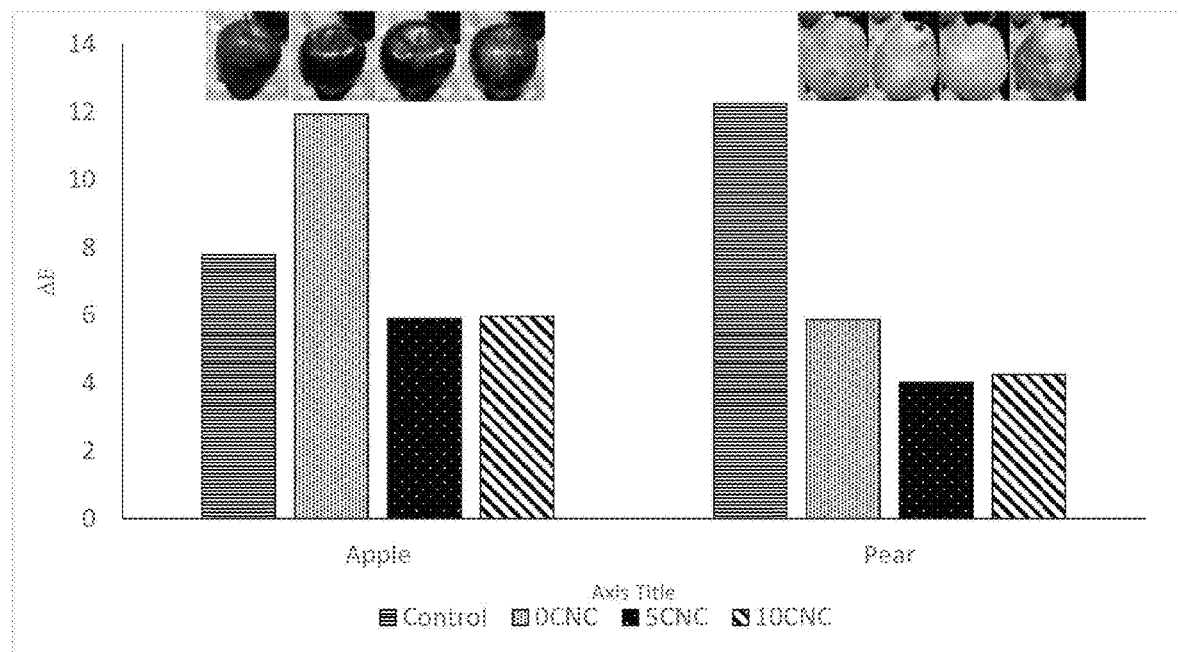
FIG. 45 is a bar graph illustrating the effects of a coating composition comprising 2% chitosan, different concentrations of CNC, and 10% surfactant on fruit color difference (ΔE) and appearance, wherein "Control" represents uncoated fruit; and "OCNC," "5CNC" and "10CNC" represent fruits coated with 2% chitosan containing 0%, 5% or 10% of CNC, respectively.
Figure 46:
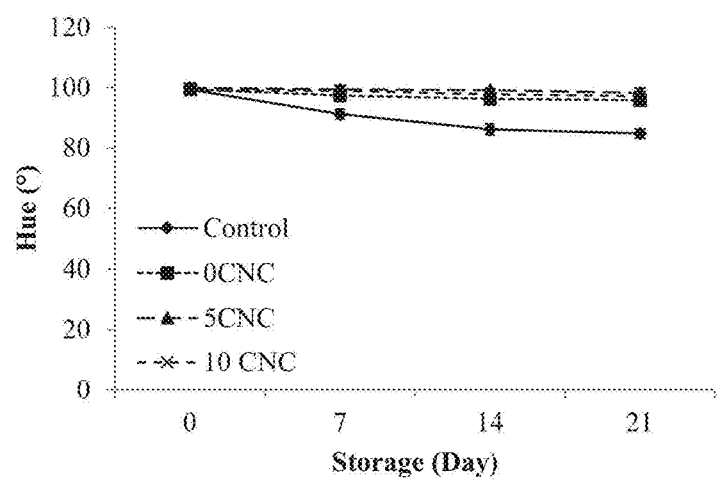
FIG. 46 is a graph of Hue angle as a function of storage (days) for pears coated with a coating composition embodiment, wherein "Control" represents uncoated fruit; and "OCNC," "5CNC" and "10CNC" represent fruits coated with 2% chitosan containing 0%, 5% or 10% of CNC, respectively.

FIG. 45 illustrates the effect of 2% chitosan coatings containing different concentrations (0, 5, and 10%) of cellulose nanocrystal (CNC, w/w, chitosan dry base) and 10% surfactant (w/w, chitosan dry base) on color difference ($\Delta E$) and appearance (pictures) of apples and pears after 3-weeks of storage at ambient temperature (20±2° C. and 30±2% RH). In these embodiments, $\Delta E = \sqrt{(L^*-L_0^*)^2+(a^*-a_0^*)^2+(b^*-b_0^*)^2}$; wherein $L^*$ represents lightness, $a^*$ represents redness, and $b^*$ represents yellowness; $L_0^*$, $a_0^*$, and $b_0^*$ represent the value at day 0 and $L^*$, $a^*$, and $b^*$ represent the value at 7-day, 14-day, and 21-day. FIG. 46 illustrates the effect of 2% chitosan coatings containing different concentrations (0, 5, and 10%) of cellulose nanocrystal (CNC, w/w chitosan in dry base) on Hue angle of pears after 3-weeks of storage at ambient temperature (20±2° C. and 30±2% RH). The Hue angle was calculated as arctan ($b^*/a^*$), wherein $b^*/a^*$ are as described for FIG. 45 above. In some embodiments, coated fruits showed significantly lower $\Delta E$ by retaining green color (pictures, FIG. 45) of fruit skin than non-coated fruits. Notably, Hue (°) of non-coated pears was significantly decreased, showing that green pear skins turned into yellow, while coated pears retained bright green color during the storage (FIG. 46).

Figure 47:
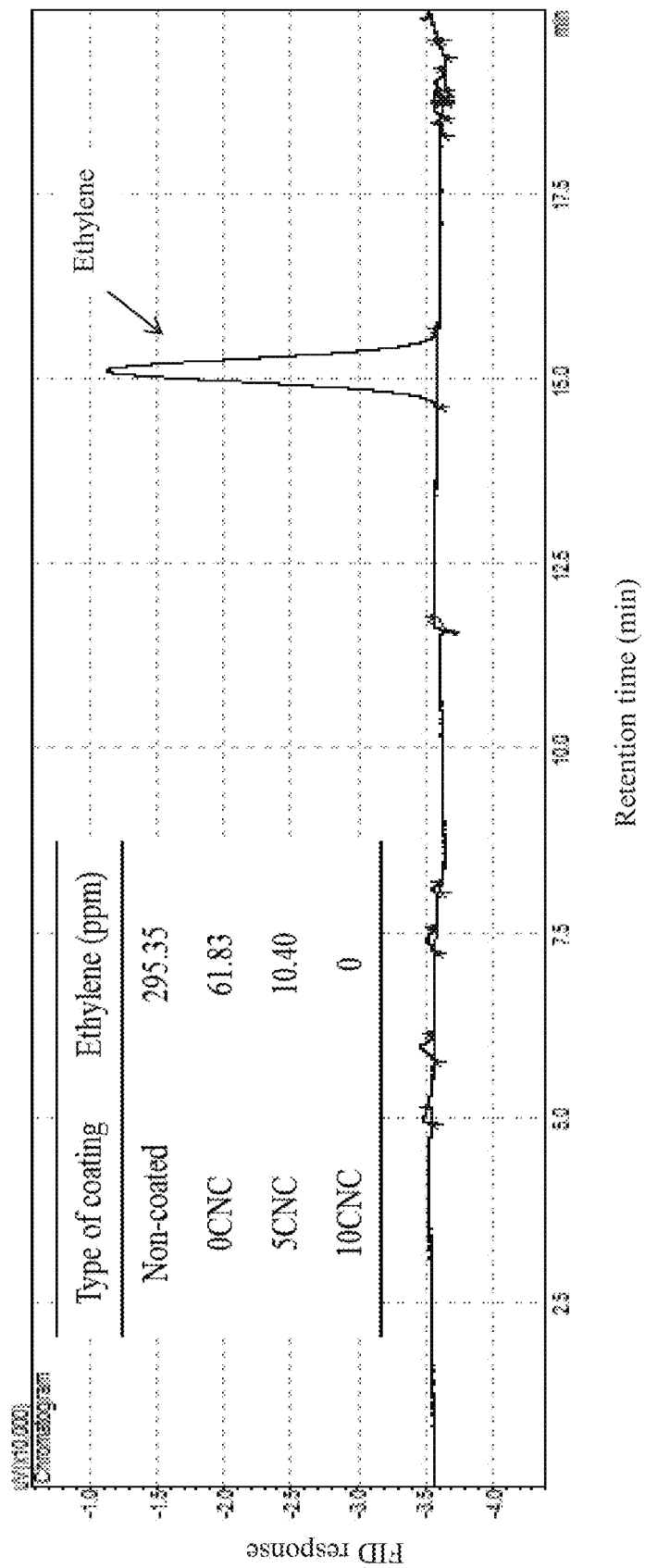
FIG. 47 is a chromatogram illustrating results obtained from analyzing the effect of different coating compositions on ethylene gas production of pears after one day at ambient temperature, wherein "Control" represents uncoated fruit; and "OCNC," "5CNC" and "10CNC" represent fruits coated with 2% chitosan containing 0%, 5% or 10% of CNC, respectively.

FIG. 47 illustrates the effect of 2% chitosan coating containing different concentrations of cellulose nanocrystal (CNC, w/w chitosan in dry base) and 10% surfactant (w/w chitosan in dry base) on ethylene gas production of pears after one day at ambient temperature (20±2° C. and 30±2% RH). With reference to FIG. 47, "FID" means flame ionization detector. Ethylene gas production measurement for non-coated and coated fruits was implemented to monitor the effect of coating on pear ethylene gas production (FIG. 47). Coating treatment dramatically slowed down ethylene gas production, compared to non-coated pears, as a proof of superior gas barrier property of coating treatment. Moreover, CNC addition into chitosan coatings led to significantly lower ethylene gas production compared with chitosan alone coating. Therefore, 5CNC or 10CNC can be incorporated into a chitosan matrix to enhance gas barrier to delay fruit ripening.

Figure 48A:
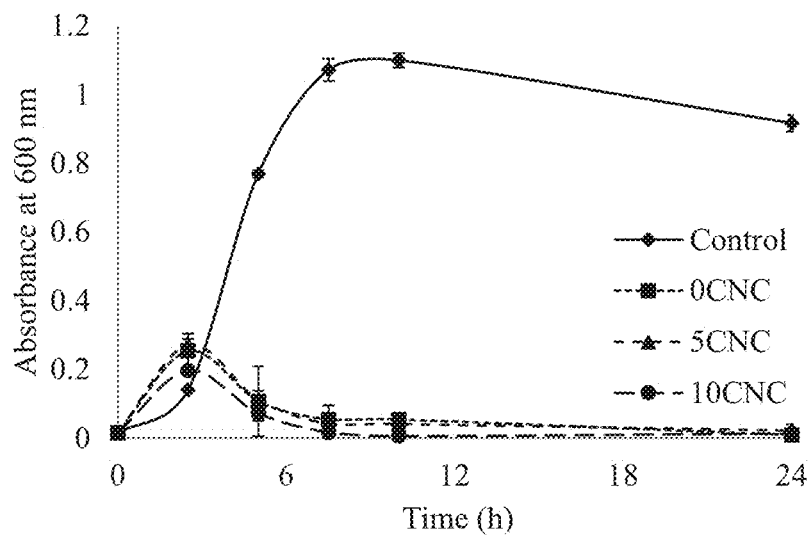
FIGS. 48A and 48B are graphs of absorbance as a function of time illustrating results obtained from analyzing the ability of coating compositions described herein to inhibit microbial growth, wherein "Control" represents inoculated specimens without any film treatment; and "OCNC," "5CNC" and "10CNC" represent films derived from 2% chitosan containing 0%, 5% or 10% of CNC, respectively.
Figure 48B:
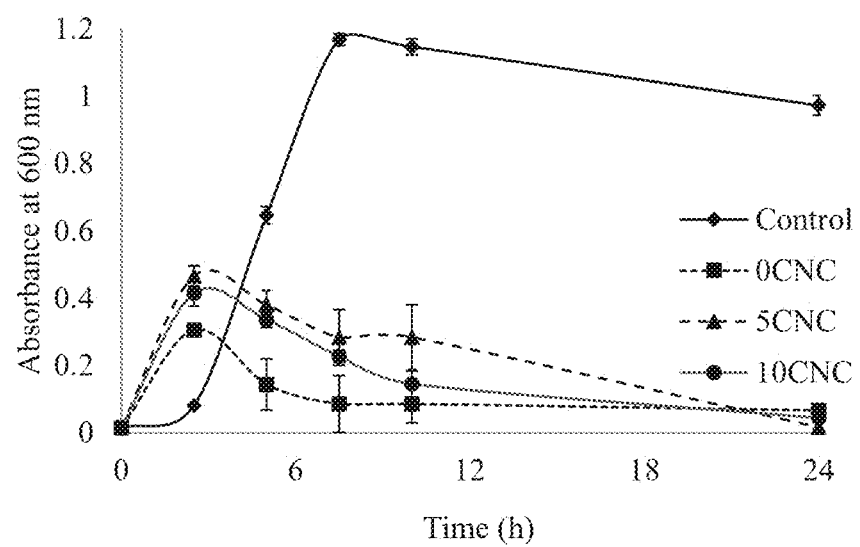
Figure 49A:
FIGS. 49A-49D illustrate results obtained from coating cherries with a representative embodiment of a coating composition comprising a surfactant.
Figure 49B:
Figure 49C:
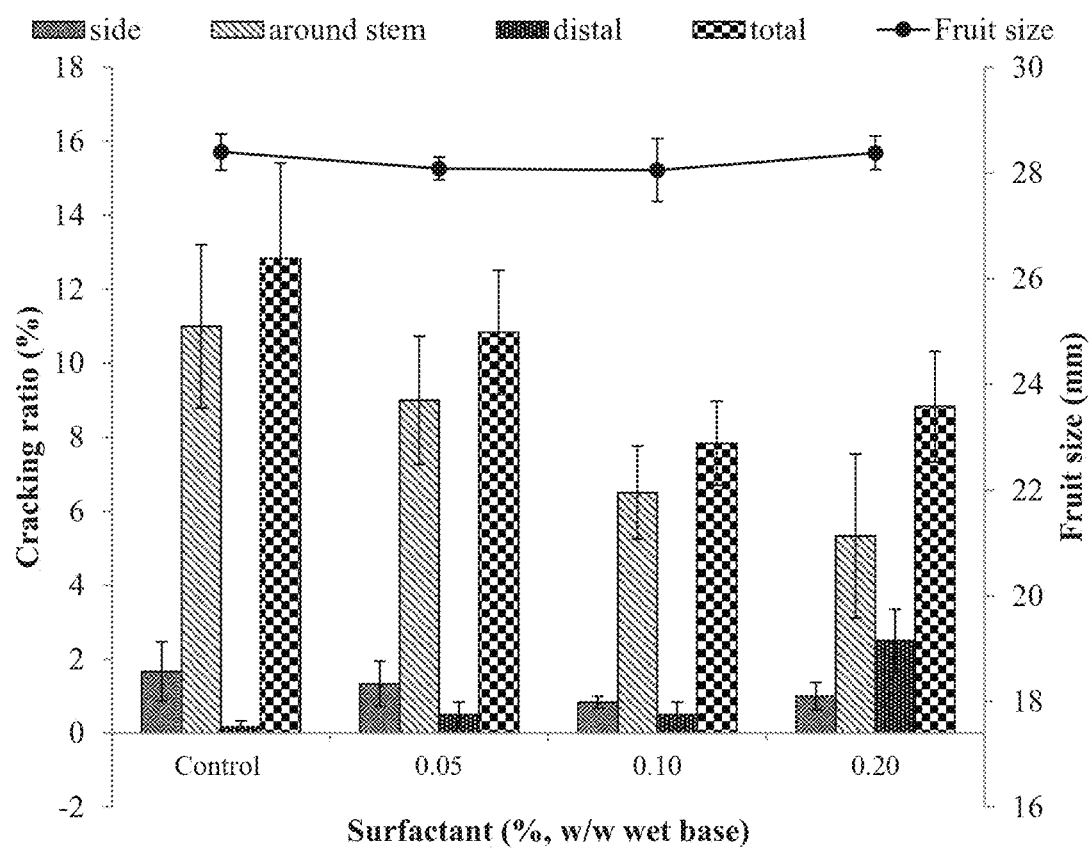
Figure 49D:
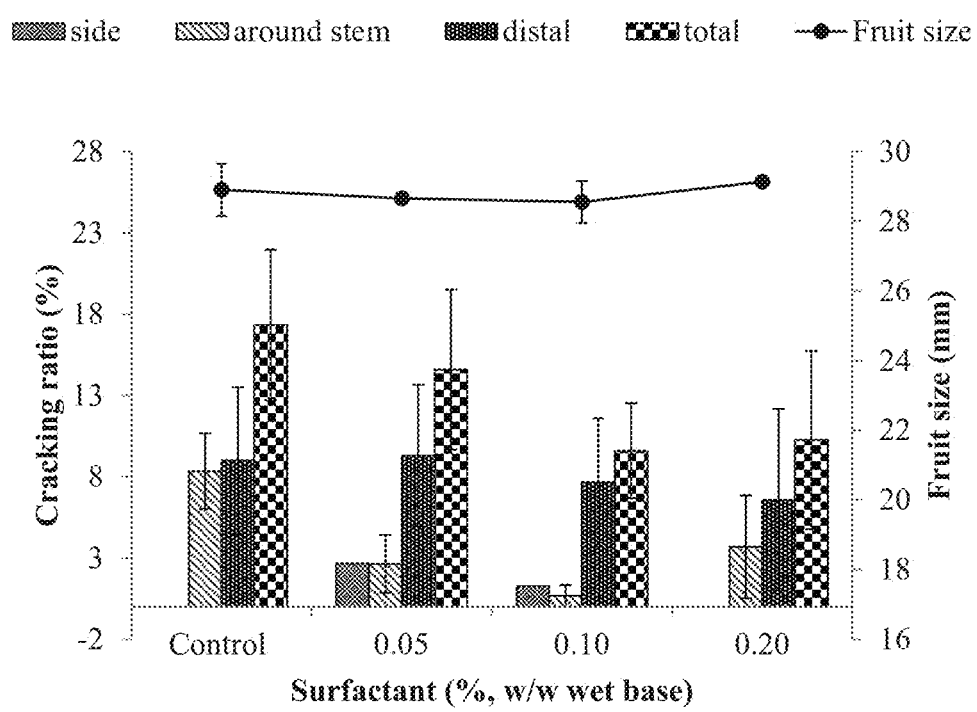

Two non-pathogenic bacterial strains (Gram-positive strain *L. innocua* and Gram-negative strain *E. coli*) were incubated at 37° C. for 16 to 24 hours. A film specimen (1×1 mm) was immersed into test tubes with 10 mL of sterilized BHI and TSB and then inoculated with 100 μL activated bacterial suspension. Inoculated test tubes (~107 CFU/mL) without film treatments were used as a control. All test tubes were incubated at 37° C. The optical density at 600 nm indicating bacterial growth was measured at 0, 2.5, 5, 7.5 and 10 h by using the UV-Vis spectrophotometer. In FIGS. 48A and 48B, all coating formulations significantly decreased the UV absorbance (turbidity) of the supernatant from 5 hours to 24 hours against both *L. innocua* and *E. coli*, indicating great suppression of microbial growth by the films (coating materials).

Example 18

In this example, the effects of an exemplary coating comprising a surfactant were determined. FIGS. 49A-49D illustrate results from this example. All formulations included 0.5% (w/w wet base) of cellulose nanofiber, 0.5% (w/w wet base) of potassium sorbate, and 0.1% (w/w wet base) of glycerol. The surfactant contained a mixture of Tween 80 and Span 80 at a ratio of 1:1. The developed coating formulation was well-dispersed, well-attached on fruit skin, and did not significantly change fruit visual aspect. Cherry rain-cracking percentage including side, around stem, distal, and total are provided in FIGS. 49C and 49D along with fruit size (mm). Coating formulations containing 0.1% and 0.2% surfactant mixture showed great reduction in total rain-cracking in comparison with non-coated cherries in both locations. Cherry rain-cracking around the stem where water can accumulate results in the most common splitting. A significant reduction was observed in this type of splitting in the coated fruits with 0.1% and 0.2% surfactant mixture at both locations, Coihueco (sprinkler system set-up) and Angol. In addition, all coating formulations had no negative effect on fruit growth, showing similar fruit size with non-coated fruits.

In another example, cherry firmness, size (mm), soluble sugar (%), stem pull (g), and color (inside and outside) were evaluated (Table 19) and showed no significant differences between non-coated and coated fruits. Unfortunately, no rain occurred at any time during the period of fruit development due to insufficient amount of rainfall in Oregon, 2015. Even though no evaluation of the formulations for their ability to reduce rain cracking from this example was conducted, the fact that there was no phytotoxicity of any kind and no detrimental effects from the treatment on fruit quality shows the great potential of developed coating formulations.

TABLE 19

The effect of coating formulations on fruit quality of "Skeena" cherries grown in The Dalles, 2015 (Oregon, US)

| Coating formulations | Firmness (g/mm) | Size (mm) | Soluble Sugar (%) | Stem pull (g) | Color (out) | Color (inside) |
|---|---|---|---|---|---|---|
| Control* | 366.20$^a$ | 29.45$^a$ | 21.13$^a$ | 903.30$^a$ | 5.88$^a$ | 5.25$^a$ |
| 0.1% surfactant** | 373.41$^a$ | 29.10$^a$ | 22.39$^a$ | 952.37$^a$ | 6.04$^a$ | 5.43$^a$ |
| 0.2% surfactant** | 395.33$^a$ | 28.80$^a$ | 23.17$^a$ | 925.37$^a$ | 5.96$^a$ | 5.40$^a$ |
| 0.2% surfactant without potassium sorbate** | 363.81$^a$ | 29.13$^a$ | 21.89$^a$ | 977.92$^a$ | 5.80$^a$ | 5.41$^a$ |

*Non-coated
**All formulations included 0.5% (w/w wet base) cellulose nanofiber, 0.1% (w/w wet base) glycerol, and 0.5% (w/w wet base) potassium sorbate.
Surfactant contains the mixture of Tween 80 and Span 80 at a ratio of 1:1.

Example 19

In this example, blueberries were thermally processed using an exemplary method disclosed herein. Fruit weight inside a can was 210 to 230 g of non-coated fruits and 310 to 330 g of coated fruits and the syrup weight was about 141 g. The packing light syrup was 15° to 20° Brix. Packed fruits were processed under 97° C. to 99° C. for about 8 minutes, and exhausted for approximately 12 to 18 minutes. The center temperature of cooled fruits was 35 to 38° C. The packing syrup in non-coated fruits turned dark red as a result of leaching of anthocyanin pigments from the fruits during the thermal process, whereas coated fruits had preserved anthocyanin pigments during the thermal process, showing minimal or no color leaching in the packing syrup. Hence, the coating technology prevented anthocyanin leaching out from blueberries during the commercial canning process.

TABLE 20

Comparison of quality characteristics of thermally processed (canned) blueberries (with and without coating treatment) packing in light syrup after 1-week storage at 4° C. refrigerator

| | | Treatments | | |
|---|---|---|---|---|
| | Quality characteristics | Not-coating | Pretreatment + coating | Coating without pretreatment |
| Fruits | Titratable acidity (%) | 0.35 b | 0.45 a | 0.49 a |
| | ° Brix | 15.0 a | 13.0 b | 13.3 ab |
| | TPC* (mg/g fresh fruit) | 2.28 a | 1.93 a | 2.13 a |
| | TMA** (mg cyanidin 3-glucoside/100 g fresh fruit) | 74.81 a | 62.83 a | 61.02 a |
| | Firmness (N) | 24.51 b | 59.10 a | 57.69 a |
| | Total bacterial count | Non-detected | Non-detected | Non-detected |

TABLE 20-continued

Comparison of quality characteristics of thermally processed
(canned) blueberries (with and without coating treatment) packing
in light syrup after 1-week storage at 4° C. refrigerator

|  | | Treatments | | |
| --- | --- | --- | --- | --- |
|  | Quality characteristics | Not-coating | Pretreatment + coating | Coating without pretreatment |
| Packing syrup | Titratable acidity (%) | 0.20 b | 0.24 a | 0.26 a |
|  | ° Brix | 20.70 a | 15.87 b | 15.13 c |
|  | TPC (mg/g fresh fruit) | 0.57 a | 0.28 c | 0.37 b |
|  | TMA (mg cyanidin 3-glucoside/100 g fresh fruit) | 0.04 a | 0.01 c | 0.02 b |
|  | Chroma value++ | 39.76 a | 26.32 b | 38.34 a |
|  | Haziness+++ | 27.02 a | 6.09 b | 3.13 b |

Values in a given row with the different letters ("a" or "b") are statistically different per ANOVA with Tukey's HSD post-hoc testing at p < 0.05
*Total phenolic content
**Total monomeric anthocyanins
***Polyphenol oxidase
+Peroxidase
++Chroma value indicates color intensity
+++Light going through a solution containing large size soluble molecules can be scattered, which gives a "haze" perception.

After the thermal processing, titratable acidity (%) and firmness of coated fruits were significantly higher than those of non-coated fruits. No bacteria growth was detected in all three processed products. Titratable acidity of packing syrup containing coated fruits was significantly higher than that containing non-coated fruits, whereas soluble solid content (°Brix), TPC, and TMA showed significantly lower in packing syrup containing coated fruits, compared to packing syrup containing non-coated fruits since the coating prevented the loss of soluble compounds, phenolic compounds, and anthocyanin from blueberries into packing syrup. Consistently, the results in Chroma value (color intensity) and haziness of packing syrup further confirmed that coating prevented anthocyanin pigments leaching from fruits, showing less color intensity with clear packaging syrup, in comparison with non-coated fruits.

TABLE 21

Comparison of consumer acceptance (n = 75) on sensory attributors
in processed blueberries (thermal process at 97° C. for
7 min or high hydrostatic pressure process at 414 MPa for 10
min) packing in 20 ° Brix syrup with or without coating treatment

|  | Thermal process | | High hydrostatic pressure process | |
| --- | --- | --- | --- | --- |
| Sensory attributors | Control | Treatment | Control | Treatment |
| Overall Appearance Liking* | 5.77 a | 5.79 a | 6.76 a | 6.76 a |
| Color Liking* | 5.99 a | 5.72 a | 6.84 a | 6.75 a |
| Aroma Liking* | 5.75 b | 6.40 a | 5.45 b | 5.84 a |
| Texture Liking* | 4.71 b | 5.97 a | 5.89 b | 6.48 a |
| Firmness/Softness** | 1.88 b | 2.67 a | 2.57 b | 2.96 a |

Values in a given row with the different letters ("a" or "b") within the same process are statistically different per ANOVA with Tukey's HSD post-hoc testing at p < 0.05
*Rating Scale: 1 = dislike extremely, 2 = dislike very much, 3 = dislike moderately, 4 = dislike slightly, 5 = neither like or dislike, 6 = like slightly, 7 = like moderately, 8 = like very much, and 9 = like extremely.
**Just about right (JAR) scale: 1 = much too soft, 2 = somewhat too soft, 3 = just about right, 4 = somewhat too firm, 5 = much too firm.

Blueberries were packed in 20 Brix syrup and subjected to thermal or HHP processing as stated in Table 21. After 1 day of storage in a refrigerator, fruits were taken out and put inside Mason jars. Each jar contained 5-6 blueberries with 20 Brix syrup, and was labeled with 3-digit random numbers.

There was no significant difference in overall appearance and color liking between non-coated (control) and coated blueberries in both thermally processed and high hydrostatic processed blueberries in the light syrup, whereas consumers ranked coated fruits with significantly higher aroma liking and texture liking scores than uncoated (control) fruits.

Figure 50:
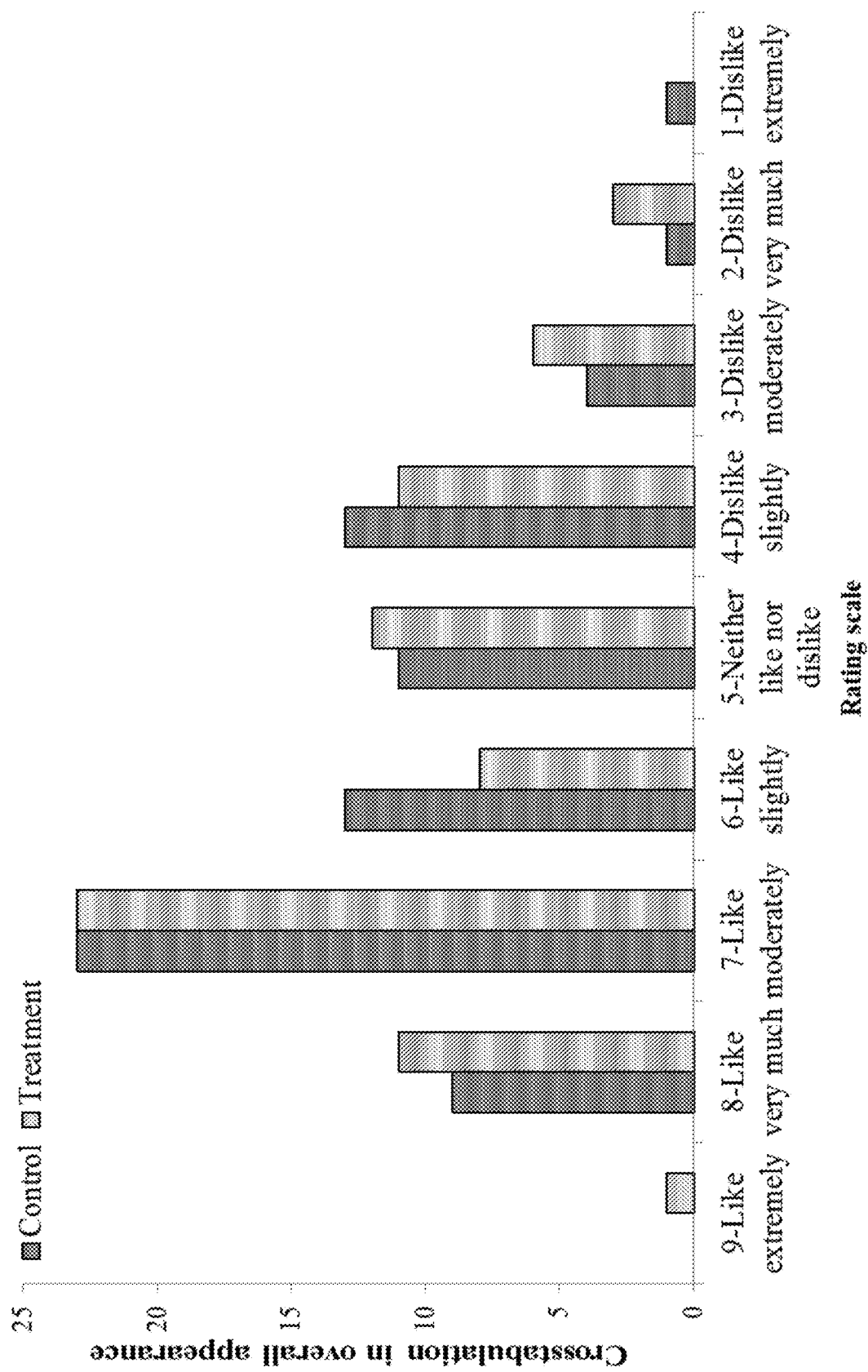
FIG. 50 is a bar graph illustrating results from a cross-tabulation in consumer acceptance (in terms of overall appearance) of thermally processed blueberries obtained from using a representative method disclosed herein and a representative coating composition ("treatment") in comparison to fruit thermally processed without the coating composition ("control").

FIG. 50 illustrates results obtained from the comparison of cross-tabulation results obtained from consumer acceptance data (based on overall appearance) of thermally processed blueberries with (treatment) and without (control) coating treatment. The branching question ("You indicated that you neither liked nor disliked or disliked the overall appearance of this product. If you knew this product preserved natural color, flavor and texture in processed fruits without the use of chemical color additives, how would this influence your liking or disliking of the overall appearance of the product?") was further posed to consumers who rated 5 (neutral) or 1-4 (disliking) for the treatment. In the cross-tabulation, the number of panelists who chose the rating "like" was slightly higher in treatment samples (45) than control samples (43) in thermally processed blueberries in the sugar syrup. To investigate the commercial potentiality of the treatment sample, the branching question was asked to the panelists who chose the rating 5-1 (neutral or disliking) from the overall appearance. Additional results are summarized in Table 22.

TABLE 22

| The number of panelists answered | | | | | |
| --- | --- | --- | --- | --- | --- |
|  | 5 | 4 | 3 | 2 | 1 |
| Neutral multiple choice | 2 | 6 | 4 | 0 | 0 |
| Disliking multiple choice | 7 | 12 | 1 | 0 | 0 |

Figure 51:
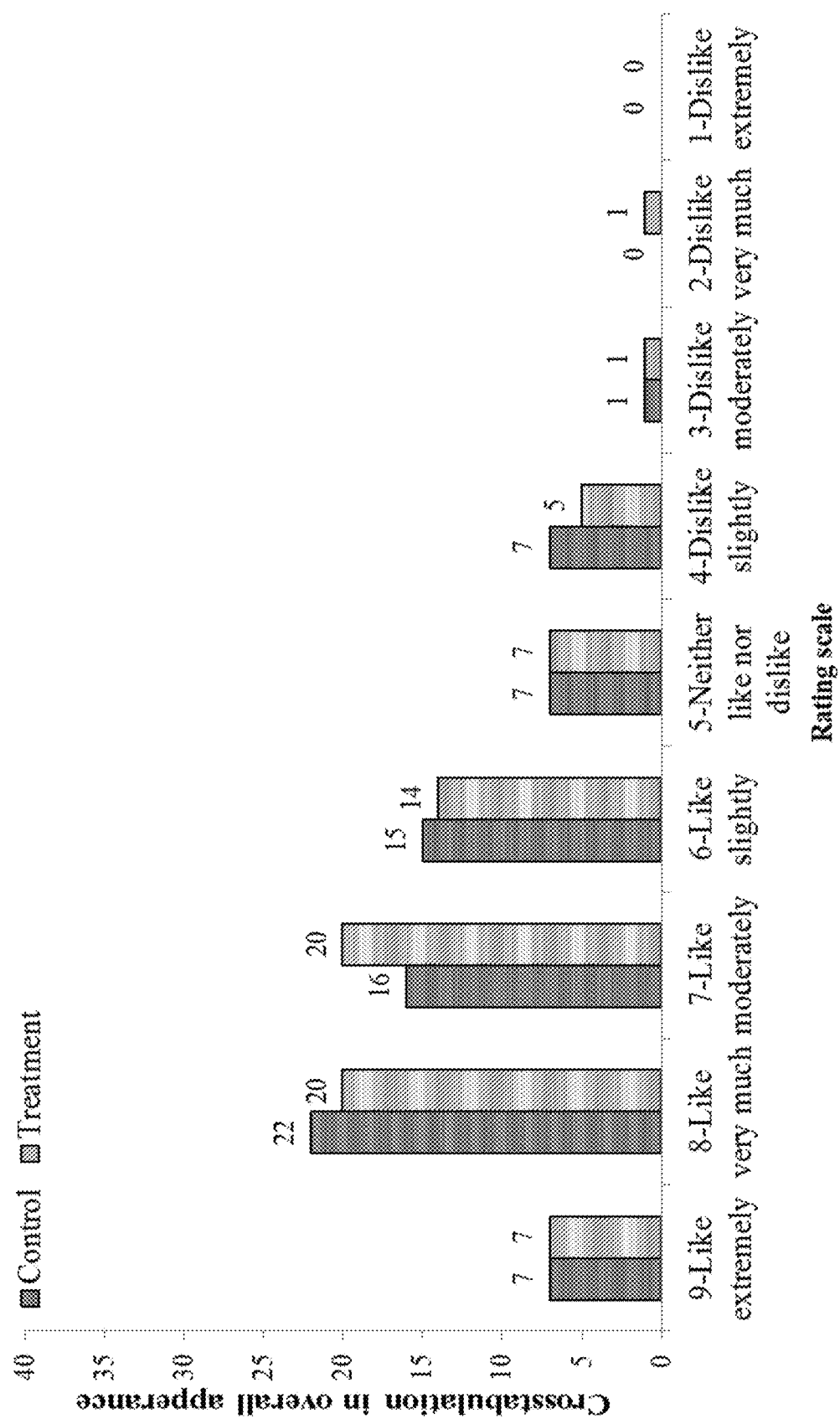
FIG. 51 is a bar graph illustrating results from a cross-tabulation in consumer acceptance (in terms of overall appearance) of thermally processed blueberries obtained from using a representative method using high hydrostatic pressure treatment and a representative coating composition ("treatment") in comparison to fruit thermally processed without the coating composition ("control").

5 = I would like the overall appearance much more
4 = I would like the overall appearance somewhat more
3 = This statement would not influence my liking or disliking of the overall appearance
2 = I would like the overall appearance somewhat less
1 = I would like the overall appearance much less FIG. 51 illustrates results obtained from the comparison of cross-tabulation results obtained from consumer acceptance data (overall appearance) of high hydrostatic pressure (HHP, 60 ksi for 10 min) processed fruits packing in 20 Brix syrup with ("treatment") and without ("control") a coating treatment. The branching question (as indicated above) was further posed to consumers who rated 5 (neutral) or 1-4 (disliking) for treatment. In cross-tabulation, the number of panelists who chose the rating "like" was slightly higher in treated samples (61) than control samples (60) obtained from high hydrostatic pressure processed blueberries in the syrup. Additional results are summarized in Table 23.

TABLE 23

| The number of panelists answered | | | | | |
|---|---|---|---|---|---|
| | 5 | 4 | 3 | 2 | 1 |
| Neutral multiple choice | 1 | 3 | 3 | 0 | 0 |
| Disliking multiple choice | 0 | 4 | 3 | 0 | 0 |

5 = I would like the overall appearance much more
4 = I would like the overall appearance somewhat more
3 = This statement would not influence my liking or disliking of the overall appearance
2 = I would like the overall appearance somewhat less
1 = I would like the overall appearance much less In view of the many possible embodiments to which the principles of the present disclosure may be applied, it should be recognized that the illustrated embodiments are only preferred examples of the present disclosure and should not be taken as limiting the scope of the disclosure or claimed invention. Rather, the scope of the present disclosure is defined by the following claims. We therefore claim all that comes within the scope and spirit of these claims.

We claim:

1. A composition, comprising:
   a cellulose nanomaterial in an amount ranging from 0.1 wt/v % to 5 wt/v %; and
   a surfactant in an amount ranging from 0.1 wt/v % to 5 wt/v %, wherein a portion of the composition comprises cellulose microfibrils, cellulose microcrystals, or a combination thereof.

2. The composition of claim 1, wherein the composition comprises the cellulose nanomaterial in an amount ranging from 0.1 wt/v % to 3 wt/v %, and wherein the composition further comprises a crosslinking agent, a film forming material, an inorganic salt, or a combination thereof.

3. The composition of claim 1, wherein the cellulose nanomaterial is selected from cellulose nanofibrils, cellulose nanocrystals, or a combination thereof.

4. The composition of claim 1, wherein the cellulose nanomaterial is present in an amount of 0.1 w/v %, 0.2% w/v %, 0.3 w/v %, 0.5% w/v %, 0.75 wt/v %, 1 w/v %, or 3 w/v %.

5. The composition of claim 1, wherein the surfactant is selected from a polysorbate surfactant, a sorbitan surfactant, or a combination thereof.

6. The composition of claim 1, wherein the composition further comprises a plasticizer, an antimicrobial agent, or a combination thereof.

7. The composition of claim 6, wherein the plasticizer is selected from glycerol, sorbitol, polyethylene glycol 400, a polyoxyethylene-fatty ester, a sorbitan-fatty acid ester, a polyglyceryl-fatty acid ester, or a combination thereof; and the antimicrobial agent is selected from potassium sorbate, a quaternary ammonium salt, chitosan, or a combination thereof.

8. A method, comprising coating a plant part with a composition comprising a cellulose nanomaterial in an amount ranging from 0.1 wt/v % to 5 wt/v %, and a surfactant in an amount ranging from 0.1 wt/v % to 5 wt/v % before or after the plant part is harvested by spraying, dipping, or enrobing the plant part with or in the composition, and wherein a portion of the composition comprises cellulose microfibrils, cellulose microcrystals, or a combination thereof.

9. A plant part, comprising a film formed from the composition of claim 1.

10. The plant part of claim 9, wherein the plant part is a fruit or vegetable and wherein the plant part exhibits reduced anthocyanin leaching, moisture loss, gas exchange, or nutrients loss compared to an equivalent plant part that does not comprise a film formed from the composition.

11. The method of claim 8, wherein the method further comprises drying the plant part at ambient temperature after it has been coated to form a film on the plant part.

12. The method according to claim 8, wherein the method further comprises drying plant or plant part after it has been coated to form a film on the plant or plant part, wherein drying involves heating the plant or plant part at a temperature of 30° C. to 35° C.

13. The method according to claim 8, wherein the method further comprises drying plant or plant part after it has been coated to form a film on the plant or plant part, wherein drying involves heating the plant or plant part at a temperature of 60° C. to 90° C.

14. The method according to claim 13, wherein the drying is for a time period ranging from 2 minutes to 10 minutes.

15. The method according to claim 8, wherein the drying further comprises thermally processing the film-coated plant part by heating the film-coated fruit or vegetable at a temperature of 80° C. to 100° C., using high hydrostatic pressure to process the fruit or vegetable, or combinations thereof.

16. A method, comprising:
   coating a fruit or vegetable after it is harvested with a composition comprising a cellulose nanomaterial in an amount ranging from 0.1 wt/v % to 1 wt/v %, and a surfactant in an amount ranging from 0.1 wt/v % to 5 wt/v %, wherein a portion of the composition comprises cellulose microfibrils, cellulose microcrystals, or a combination thereof; and
   drying the composition coating the fruit or vegetable to form a film-coated fruit or vegetable.

17. The method according to claim 16, wherein the method further comprises drying plant or plant part after it has been coated to form a film on the plant or plant part, wherein drying involves heating the plant or plant part at a temperature of 30° C. to 35° C.

18. The method according to claim 16, wherein the method further comprises drying plant or plant part after it has been coated to form a film on the plant or plant part, wherein drying involves heating the plant or plant part at a temperature of 60° C. to 90° C.

19. The method according to claim 18, wherein the drying is for a time period ranging from 2 minutes to 10 minutes.

20. The method according to claim 16, wherein the drying further comprises thermally processing the film-coated fruit or vegetable by heating the film-coated fruit or vegetable at a temperature of 80° C. to 100° C., or using high hydrostatic pressure to process the fruit or vegetable, or combinations thereof.

* * * * *